(12) United States Patent  (10) Patent No.: US 9,143,730 B2
Nagase et al.  (45) Date of Patent: Sep. 22, 2015

(54) INFORMATION PROCESSING APPARATUS, TRANSMISSION SYSTEM AND PROGRAM

(71) Applicants: Tatsuya Nagase, Kanagawa (JP); Yoshinaga Kato, Kanagawa (JP)

(72) Inventors: Tatsuya Nagase, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 6 days.

(21) Appl. No.: 14/174,054

(22) Filed: Feb. 6, 2014

(65) Prior Publication Data

US 2014/0253676 A1  Sep. 11, 2014

(30) Foreign Application Priority Data

Mar. 11, 2013  (JP) ................................. 2013-048496

(51) Int. Cl.
  *H04N 7/14*  (2006.01)
  *H04N 7/15*  (2006.01)
(52) U.S. Cl.
  CPC ..................... *H04N 7/152* (2013.01)
(58) Field of Classification Search
  CPC ....................................................... H04N 7/14
  USPC ........... 348/14.01, 14.07, 14.03, 14.12, 14.13
  See application file for complete search history.

(56) References Cited

U.S. PATENT DOCUMENTS

| 2008/0158337 A1* | 7/2008 | Richardson ................ 348/14.09 |
| 2013/0038676 A1 | 2/2013 | Tanaka et al. |
| 2014/0247318 A1* | 9/2014 | Tucker et al. .............. 348/14.05 |

FOREIGN PATENT DOCUMENTS

JP  2011-254453  12/2011

* cited by examiner

*Primary Examiner* — Olisa Anwah
(74) *Attorney, Agent, or Firm* — Oblon, McClelland, Maier & Neustadt, L.L.P.

(57) ABSTRACT

An information processing apparatus, communicatively connectable to a first transmission terminal, and communicatively connectable with a second transmission terminal via a network and to a first display device, includes a display control unit that displays a region in a screen of a second display device; a bandwidth determination unit that determines whether bandwidth for communication between the transmission terminals is less than or equal to a predetermined threshold; an acquisition region reception unit that receives a selection for selecting at least one of first display data displayed in an entire region of the screen and second display data displayed in an active region in the screen, according to the determination; a resolution conversion unit that converts a resolution of the selected display data based on resolutions of the first and second display devices; and a display data transmission unit that transmits the display data to the first transmission terminal.

9 Claims, 34 Drawing Sheets

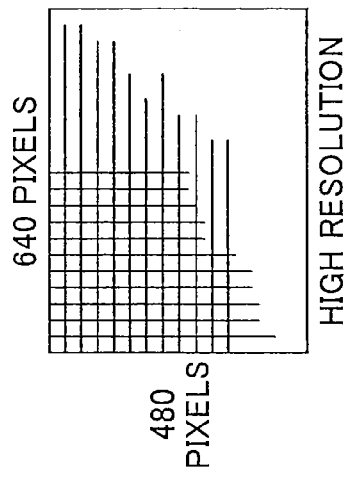
FIG.5C  640 PIXELS  480 PIXELS  HIGH RESOLUTION
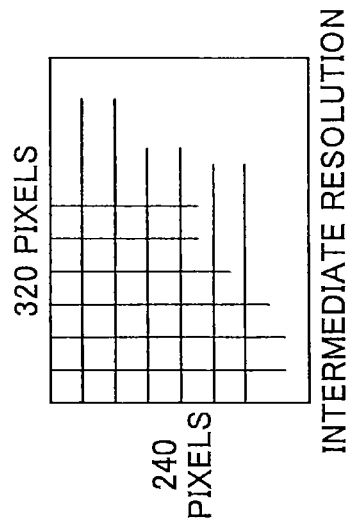
FIG.5B  320 PIXELS  240 PIXELS  INTERMEDIATE RESOLUTION
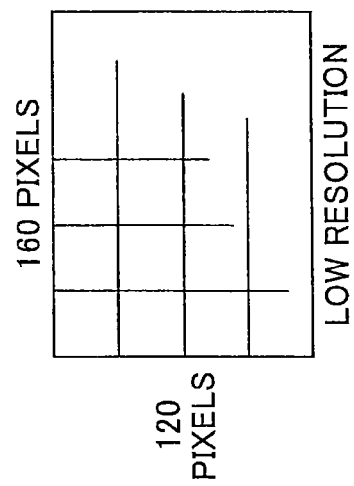
FIG.5A  160 PIXELS  120 PIXELS  LOW RESOLUTION

FIG.6

<CHANGE QUALITY MANAGEMENT TABLE>

| IP ADDRESS OF DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.4.3 | INTERMEDIATE IMAGE QUALITY |
| ... | ... |

FIG.7

<RELAY APPARATUS MANAGEMENT TABLE>

| RELAY APPARATUS ID | OPERATIONAL STATUS | RECEPTION TIME | IP ADDRESS OF RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.8

<TERMINAL AUTHENTICATION MANAGEMENT TABLE>

| TERMINAL ID | PASSWORD |
|---|---|
| 01aa | aaaa |
| 01ab | abab |
| 01ba | baba |
| ... | ... |

FIG.9

<TERMINAL MANAGEMENT TABLE>

| TERMINAL ID | OPERATIONAL STATUS | RECEPTION TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.10

<DESTINATION LIST MANAGEMENT TABLE>

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.11

<SESSION MANAGEMENT TABLE>

| SESSION ID FOR SELECTION | RELAY APPARATUS ID | REQUEST SOURCE TERMINAL ID | DESTINATION TERMINAL ID | DELAY TIME (ms) | DELAY INFORMATION RECEPTION TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.12

<QUALITY MANAGEMENT TABLE>

| DELAY TIME (ms) | IMAGE QUALITY OF IMAGE DATA (QUALITY OF IMAGE) |
|---|---|
| 0~100 | HIGH IMAGE QUALITY |
| 100~300 | INTERMEDIATE IMAGE QUALITY |
| 300~500 | LOW IMAGE QUALITY |
| 500~ | (INTERRUPTION) |

FIG.14

| RESOLUTION (WIDTH) | RESOLUTION (HEIGHT) |
|---|---|
| 1024 | 768 |

FIG.15A

| TRANSMISSION | 300Mbps |
|---|---|
| RECEPTION | 700Mbps |

FIG.15B

| NARROW-BANDWIDTH MODE | TRUE |
|---|---|

ENTIRE REGION

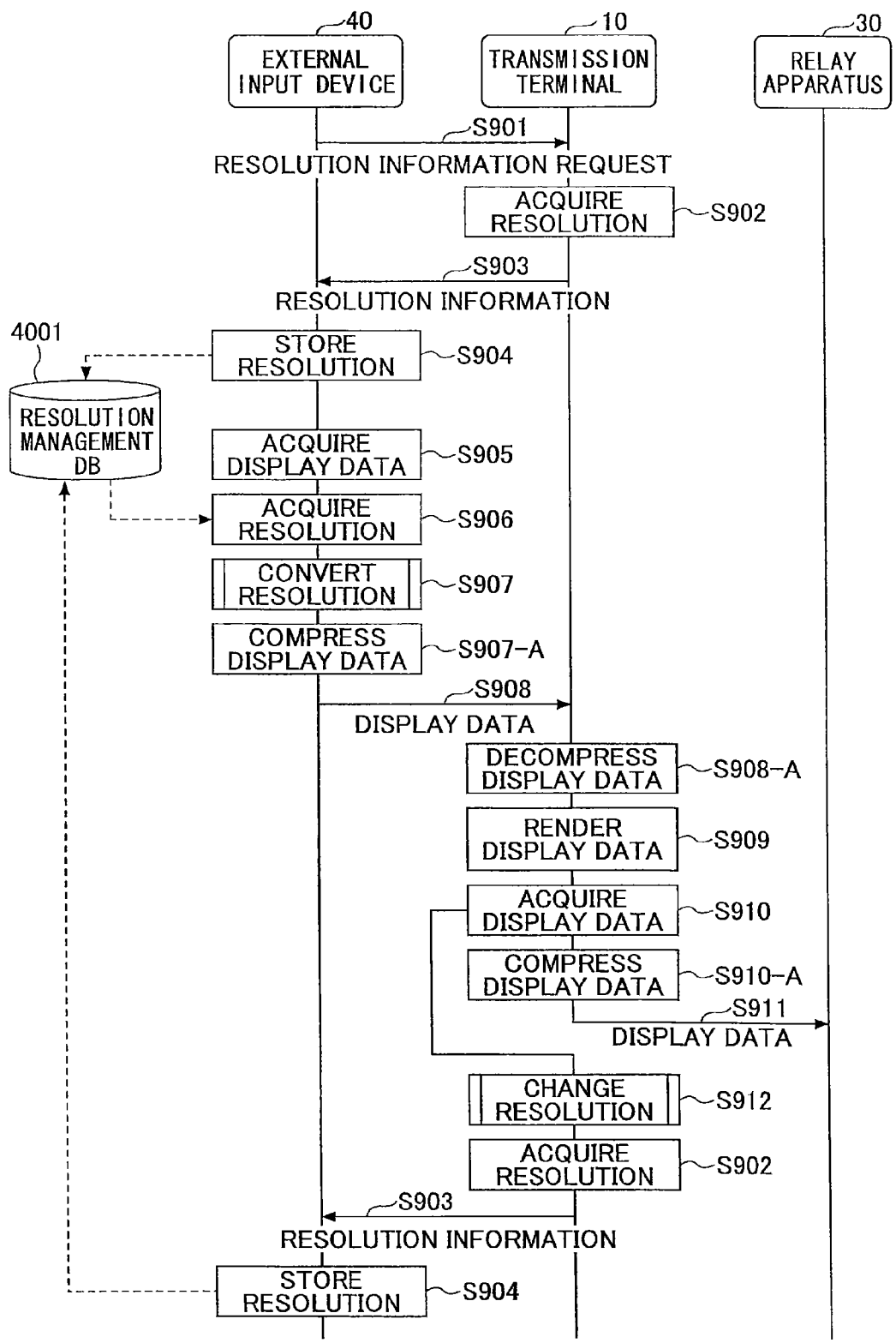

ENTIRE REGION

INFORMATION PROCESSING APPARATUS, TRANSMISSION SYSTEM AND PROGRAM

BACKGROUND OF THE INVENTION

1. Field of the Invention

The disclosures herein generally relate to an information processing apparatus, a transmission system and a program, and especially relate to an information processing apparatus connected to a transmission terminal, which is connected to other transmission terminals communicably via a network and connected to a display device.

2. Description of the Related Art

Recently, a transmission system to conduct a video conference between remote locations via a communication network, such as the Internet, has become popular. In such a transmission system, by sending and receiving image data and voice data between plural transmission terminals, the video conference is realized. Moreover, according to recent enhancements of the broadband environment, high-quality image data and voice data can be sent and received, understanding the status of the other party in the video conference becomes easier, and the fulfillment of communications by a video conference has been improved.

Moreover, on conducting the video conference using the transmission terminal, a participant of the video conference may connect an external input device other than the transmission terminal, such as a personal computer (PC) of his/her own. The participant displays an image of conference materials or the like on a display unit of the external input device, and discusses the conference materials with the other party viewing them. The external input device in the related art sends the image data of the conference materials or the like, displayed on the display unit of the external input device, to the transmission terminal used by the other party in the video conference via the communication network.

The participants in the video conference share not only the voice data and the image data sent/received by the transmission terminal but also the display data displayed on the display unit of the external input device with the other party in the video conference.

Some external input devices can execute multitasking processes. On a display unit of such an external input device plural regions (called "windows" in the following) generated by different tasks are displayed. Japanese Published Patent Application No. 2011-254453 discloses selecting data to be sent to the transmission terminal used by the other party in the video conference from the data displayed on the display unit of the external input device.

FIG. 38 is a diagram illustrating an example of a screen displayed on the external input device, disclosed in Japanese Published Patent Application No. 2011-254453. The remote communication terminal, disclosed in Japanese Published Patent Application No. 2011-254453, shares a region, which the user selects using a mouse, with a transmission terminal of the other party from the plural regions displayed on the display unit of the remote communication terminal.

In the case where there isn't sufficient bandwidth in the communication network, in order to continue the conference, a function of reducing the resolution of image data or lowering the frame rate is required. Such an operational procedure in the transmission terminal is called a "narrow bandwidth mode".

However, the Japanese Published Patent Application No. 2011-254453 does not disclose, in the case of low bandwidth in the communication network, determination for whether data displayed on the whole screen is shared or data displayed in a specific region of the screen is shared. When the data displayed on the whole screen is in the narrow bandwidth mode, there is a problem regarding detail, such that small characters, displayed during narrow bandwidth mode are illegible.

SUMMARY OF THE INVENTION

It is a general object of at least one embodiment of the present invention to provide an information processing apparatus, a transmission system and a program that substantially obviate one or more problems caused by the limitations and disadvantages of the related art.

In one embodiment of the present invention, an information processing apparatus is communicably connectable to a first transmission terminal, which is communicably connected with a second transmission terminal via a network and to which a first display device is connected. The information processing apparatus includes a display control unit that displays a region of a program component on a screen of a second display device, which is connectable to the information processing apparatus; a bandwidth determination unit that determines whether bandwidth for a communication between the first transmission terminal and the second transmission terminal is less than or equal to a predetermined threshold; an acquisition region reception unit that receives a selection for selecting at least one of display data displayed in an entire region of the screen of the second display device or display data displayed in an active region in the screen, according to a result of determination by the bandwidth determination unit, the active region being an object of a user's operation; a display data acquisition unit that acquires the display data of the entire region of the screen or the display data of the active region, whichever is selected by the selection, which is received by the acquisition region reception unit; a resolution information reception unit that receives first resolution information of the first display device, which is sent from the first transmission terminal; a resolution conversion unit that converts a resolution of the display data acquired by the display data acquisition unit to produce resolution-converted display data, based on the first resolution information received by the resolution information reception unit and second resolution information, which represents a resolution of the second display device; and a display data transmission unit that transmits the resolution-converted display data to the first transmission terminal.

In another embodiment of the present invention, a transmission system includes a first transmission terminal communicably connected with a second transmission terminal via a network, a first display device being connected to the first transmission terminal; an external input device that sends display data to the first transmission terminal; a resolution acquisition unit that acquires a resolution, with which the first display device performs a display process; a bandwidth status monitoring unit that monitors a communication status of communication between the first transmission terminal the second transmission terminal; a resolution transmission unit that sends first resolution information, which represents the resolution of the first display device, to the external input device; a display control unit that displays a region of a program component on a screen of a second display device, which is connectable to the external input device; a bandwidth determination unit that acquires the communication status monitored by the bandwidth status monitoring unit and determines whether bandwidth for the communication between the first transmission terminal and the second transmission terminal is less than or equal to a predetermined threshold; an acquisition region reception unit that receives a selection for selecting at least one of display data displayed in an entire region of the screen of the second display device or display data displayed in an active region of the screen, according to a result of determination by the bandwidth determination unit, the active region being an object of a user's operation; a display data acquisition unit that acquires the display data of the entire region of the screen or the display data of the active region, whichever is selected by the selection, which is received by the acquisition region reception unit; a resolution information reception unit that receives the first resolution information of the first display device, which is sent from the first transmission terminal; a resolution conversion unit that converts a resolution of the display data acquired by the display data acquisition unit to produce resolution-converted display data, based on the first resolution information received by the resolution information reception unit and second resolution information, which represents a resolution of the second display device; and a display data transmission unit that transmits the resolution-converted display data to the first transmission terminal.

In yet another embodiment of the present invention, a transmission system includes a first transmission terminal, which includes a communication unit that communicates with a second transmission terminal via a network; a display control unit that displays information on a first display device, connected to the first transmission terminal; a resolution acquisition unit that acquires a resolution, with which the first display device performs a display process; a bandwidth status monitoring unit that monitors a communication status of communication between the first transmission terminal the second transmission terminal; and a resolution transmission unit that sends first resolution information, which represents a resolution of the first display device, to the external input device; and a program for causing an external input device to perform a process of sending display data to the first transmission terminal. The process includes a display control step of displaying a region of a program component on a screen of a second display device, which is connectable to the external input device; a bandwidth determination step of acquiring the communication status monitored by the bandwidth status monitoring unit and determining whether bandwidth for the communication between the first transmission terminal and the second transmission terminal is less than or equal to a predetermined threshold; an acquisition region reception step of receiving a selection for selecting at least one of display data displayed in an entire region of the screen of the second display device or display data displayed in an active region of the screen, according to a result of determination in the bandwidth determination step, the active region being an object of a user's operation; a display data acquisition step of acquiring the display data of the entire region of the screen or the display data of the active region, whichever is selected by the selection, which is received in the acquisition region reception step; a resolution information reception step of receiving the first resolution information of the first display device, which is sent from the first transmission terminal; a resolution conversion step of converting a resolution of the display data acquired in the display data acquisition step to produce resolution-converted display data, based on the first resolution information received in the resolution information reception step and second resolution information, which represents a resolution of the second display device; and a display data transmission step of transmitting the resolution-converted display data to the first transmission terminal.

In yet another embodiment of the present invention, a non-transitory computer-readable storage medium stores a program for causing an information processing apparatus, which is communicably connectable to a first transmission terminal, which is connected communicably with a second transmission terminal via a network and to which a first display device is connected, to perform a process of sending display data to the first transmission terminal, when the program is installed in the information processing apparatus. The process includes a display control step of displaying a region of a program component on a screen of a second display device, which is connectable to the information processing apparatus; a bandwidth determination step of determining whether bandwidth for communication between the first transmission terminal and the second transmission terminal is less than or equal to a predetermined threshold; an acquisition region reception step of receiving a selection for selecting at least one of display data displayed in an entire region of the screen of the second display device or display data displayed in an active region of the screen, according to a result of determination in the bandwidth determination step, the active region being an object of a user's operation; a display data acquisition step of acquiring the display data of the entire region of the screen or the display data of the active region, whichever is selected by the selection, which is received in the acquisition region reception step; a resolution information reception step of receiving the first resolution information of the first display device, which is sent from the first transmission terminal; a resolution conversion step of converting a resolution of the display data to produce resolution-converted display data based on the received first resolution information and second resolution information, which represents a resolution of the second display device; and a display data transmission step of transmitting the resolution-converted display data to the first transmission terminal.

According to the present invention, an information processing apparatus, a transmission system and a program, which suppress the illegibility of details in the displayed image during cases of narrow bandwidth mode in the communication network, are provided.

BRIEF DESCRIPTION OF THE DRAWINGS

Other objects and further features of embodiments will be apparent from the following detailed description when read in conjunction with the accompanying drawings, in which:

FIGS. 5A to 5C are explanatory diagrams for explaining image quality of image data according to the present embodiment;

FIG. 6 is a diagram illustrating an example of a table for managing change in quality of image data according to the present embodiment;

FIG. 7 is a diagram illustrating an example of a table for managing the relay apparatus according to the present embodiment;

FIG. 8 is a diagram illustrating an example of a table for managing authentication for the terminal according to the present embodiment;

FIG. 9 is a diagram illustrating an example of a table for managing the terminal according to the present embodiment;

FIG. 10 is a diagram illustrating an example of a table for managing a destination list according to the present embodiment;

FIG. 11 is a diagram illustrating an example of a table for managing a session according to the present embodiment;

FIG. 12 is a diagram illustrating an example of a table for managing the image quality of the image data according to the present embodiment;

FIG. 14 is a diagram illustrating an example of a table for managing a resolution of image data according to the present embodiment;

FIGS. 15A and 15B are diagrams illustrating an example of tables for managing bandwidth according to the present embodiment;

FIG. 30 is a sequence chart illustrating another example of processes of changing the resolution by the transmission terminal and of converting the resolution by the external input device, using a compression format, according to the present embodiment;

DESCRIPTION OF THE PREFERRED EMBODIMENTS

In the following, embodiments of the present invention will be described with reference to the accompanying drawings. However, the technical scope of the present invention is not limited to the present embodiment.

Figure 1:
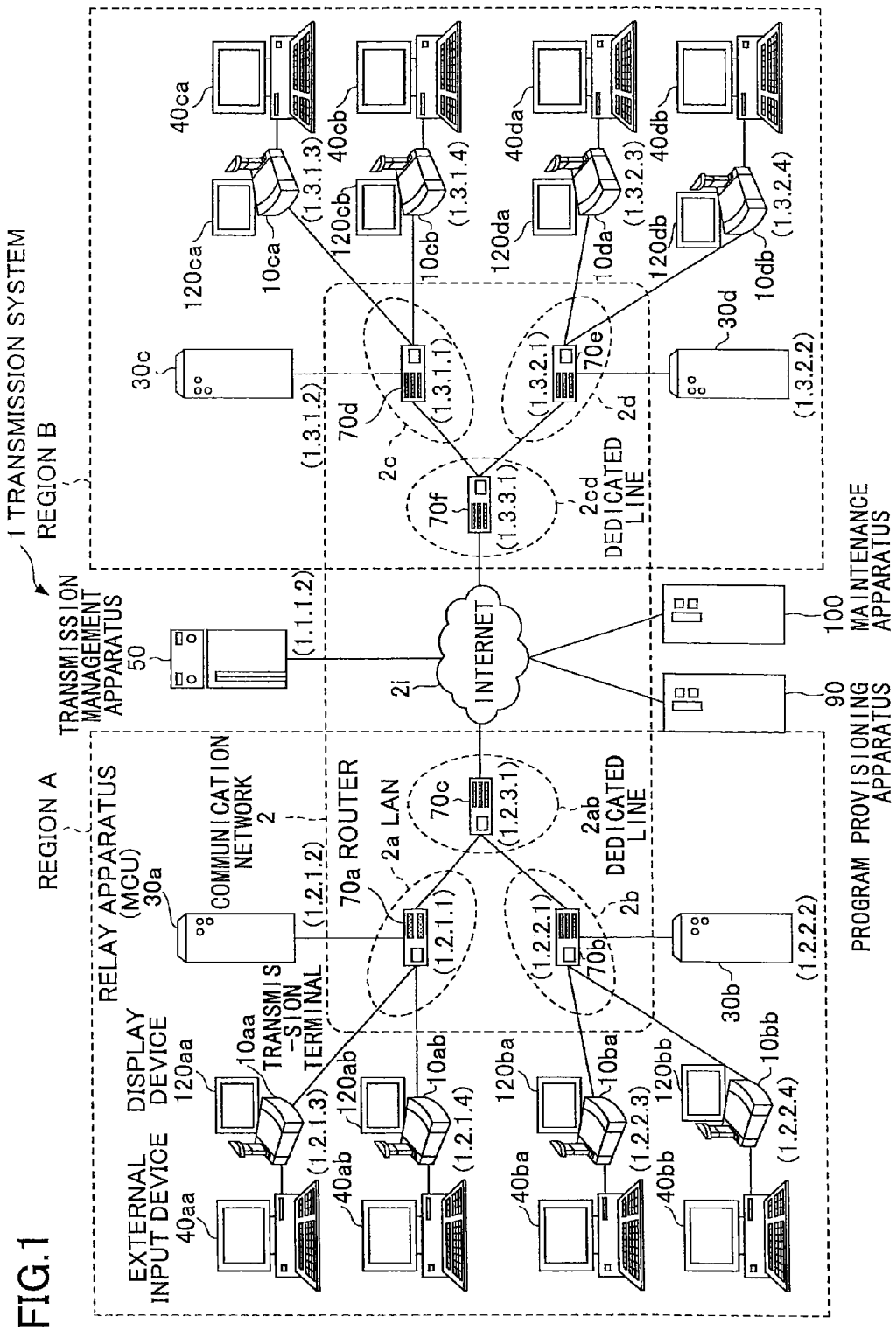
FIG. 1 is a diagram schematically illustrating an example of a whole configuration of a transmission system according to a present embodiment.

FIG. 1 is a schematic diagram illustrating an example of a whole configuration of a transmission system 1 according to the present embodiment. With reference to FIG. 1, the present embodiment will be explained in the following.

Generally, a transmission system includes a data provision system, in which content data are transmitted unidirectionally via a transmission management apparatus from one transmission terminal to the other transmission terminal, and a communication system, in which information, visual or the like are communicated bidirectionally via the transmission management apparatus among plural transmission terminals. The communication system communicates via the communication management apparatus (corresponding to the "transmission management apparatus") among plural communication terminals (corresponding to the "transmission terminals") information, visual or the like bidirectionally. A video conference system, a visual telephony system, a voice conference system, a voice telephony system, a PC (personal computer) screen sharing system or the like belong to the communication system.

In the present embodiment, the video conference system is assumed to be an example of the communication system. The video conference management apparatus is assumed to be an example of the communication management apparatus. The video conference terminal is assumed to be an example of the communication terminal. With the above assumptions, the transmission system, the transmission management apparatus and the transmission terminal will be explained. That is, the transmission terminal and the transmission management apparatus can be applied not only to the video conference system, but also to the communication system or to the transmission system.

The transmission system 1 according the present embodiment (see FIG. 1) includes plural transmission terminals 10aa, 10ab, 10ba, 10bb, 10ca, 10cb, 10da and 10db, plural display devices for each of the transmission terminals 120aa, 120ab, 120ba, 120bb, 120ca, 120cb, 120da and 120db, plural external input devices connected to each of the transmission terminals 40aa, 40ab, 40ba, 40bb, 40ca, 40cb, 40da and 40db, plural relay apparatuses 30a, 30b, 30c, and 30d, the transmission management apparatus 50, a program provisioning apparatus 90 and the maintenance apparatus 100.

In the following, unless otherwise stated, an arbitrary transmission terminal of the plural transmission terminals 10aa, . . . , 10db is denoted "transmission terminal 10", an arbitrary display device of the plural display devices 120aa, . . . , 120db is denoted "display device 120", an arbitrary external input device of the plural external input devices 40aa, . . . , 40db is denoted "external input device 40", and an arbitrary relay apparatus of the plural relay apparatuses 30aa, . . . , 30db is denoted "relay apparatus 30". Moreover, the display device 120 is an example of a display device of the transmission terminal 30.

The transmission terminal 10 sends/receives image data, voice data, or the like to/from other transmission terminals 10. In the present embodiment, the image data are video data. The image data may be still image data. Moreover, images of the image data may include both video and still images. The relay apparatus 30 relays image data and voice data between the transmission terminals 10. The transmission management apparatus 50 manages the plural transmission terminals 10 and the plural relay apparatuses 30 in an integrated fashion.

The external input device 40 is connected to the transmission terminal 10, and sends display data for an image displayed on a display unit (a display device 216, which will be explained later) of the external input device 40 to the transmission terminal 10.

Moreover, plural routers 70a, 70b, 70c, 70d, 70e and 70f, as shown in FIG. 1, select optimum paths on which the image data and voice data are sent/received. In the following explanation, unless otherwise stated, an arbitrary router of the plural router 70a, . . . , 70db is denoted "router 70". The program provisioning apparatus 90 includes a hard disk (HD), which is not shown. The HD stores a program for the transmission terminal to realize various functions and various means in the transmission terminal 10, a program for the relay apparatus to realize various functions and various means in the relay apparatus, and a program for the transmission management to realize various functions and various means in the transmission management apparatus. The program provisioning apparatus sends the program for the transmission terminal, the program for the relay apparatus and the program for the transmission management stored in the HD to the transmission terminal 10, the relay apparatus 30, and the transmission management apparatus 50, respectively.

Moreover, the transmission terminals 10aa and 10ab, the relay apparatus 30a, and the router 70a are connected with each other communicably via the LAN (Local Area Network) 2a, and the transmission terminals 10ba and 10bb, the relay apparatus 30b, and the router 70b are connected with each other communicably via the LAN 2b. The LAN 2a and the LAN 2b are connected with each other communicably via a dedicated line 2ab including the router 70c, and configured in a predetermined region A. For example, region A is Japan, the LAN 2a is configured in an office in Tokyo, and the LAN 2b is configured in an office in Osaka.

On the other hand, the transmission terminals 10ca and 10cb, the relay apparatus 30c, and the router 70d connected with each other communicably via the LAN 2c, and the transmission terminals 10da and 10db, the relay apparatus 30d, and the router 70e are connected with each other communicably via the LAN 2d. The LAN 2c and the LAN 2d are connected with each other communicably via a dedicated line 2cd including the router 70f, and configured in a predetermined region B. For example, region B is the United States of America, the LAN 2c is configured in an office in New York, and the LAN 2d is configured in an office in Washington D.C. Region A and region B are communicably connected via the Internet 2i by the routers 70c and 70f, respectively.

Moreover, the transmission management apparatus 50, the program provisioning apparatus 90 and the maintenance system are communicably connected with the transmission terminal 10 and the relay apparatus 30 via the Internet. The transmission management apparatus 50, the program provisioning apparatus 90 and the maintenance apparatus 100 may be installed in region A, in region B, or in an other region.

In the present embodiment, the communication network 2 is configured by the LAN 2a, the LAN 2b, the dedicated line 2ab, the Internet 2i, the dedicated line 2cb, the LAN 2c and the LAN 2d.

Moreover, a combination of four integers with parenthesis, indicated below each of the transmission terminals 10, the relay apparatus 30, the transmission management apparatus 50, the routers 70, the program provisioning apparatus 90, and the maintenance apparatus 100 in FIG. 1, represent an IP (Internet Protocol) address in a form of IPv4. For example, the IP address of the transmission terminal 10aa is "1.2.1.3". Moreover, IPv6 may be adopted instead of IPv4, but IPv4 is employed for simplicity in the present embodiment.

<<Hardware Configuration>>

Next the hardware configuration according to the present embodiment will be explained.

Figure 2:
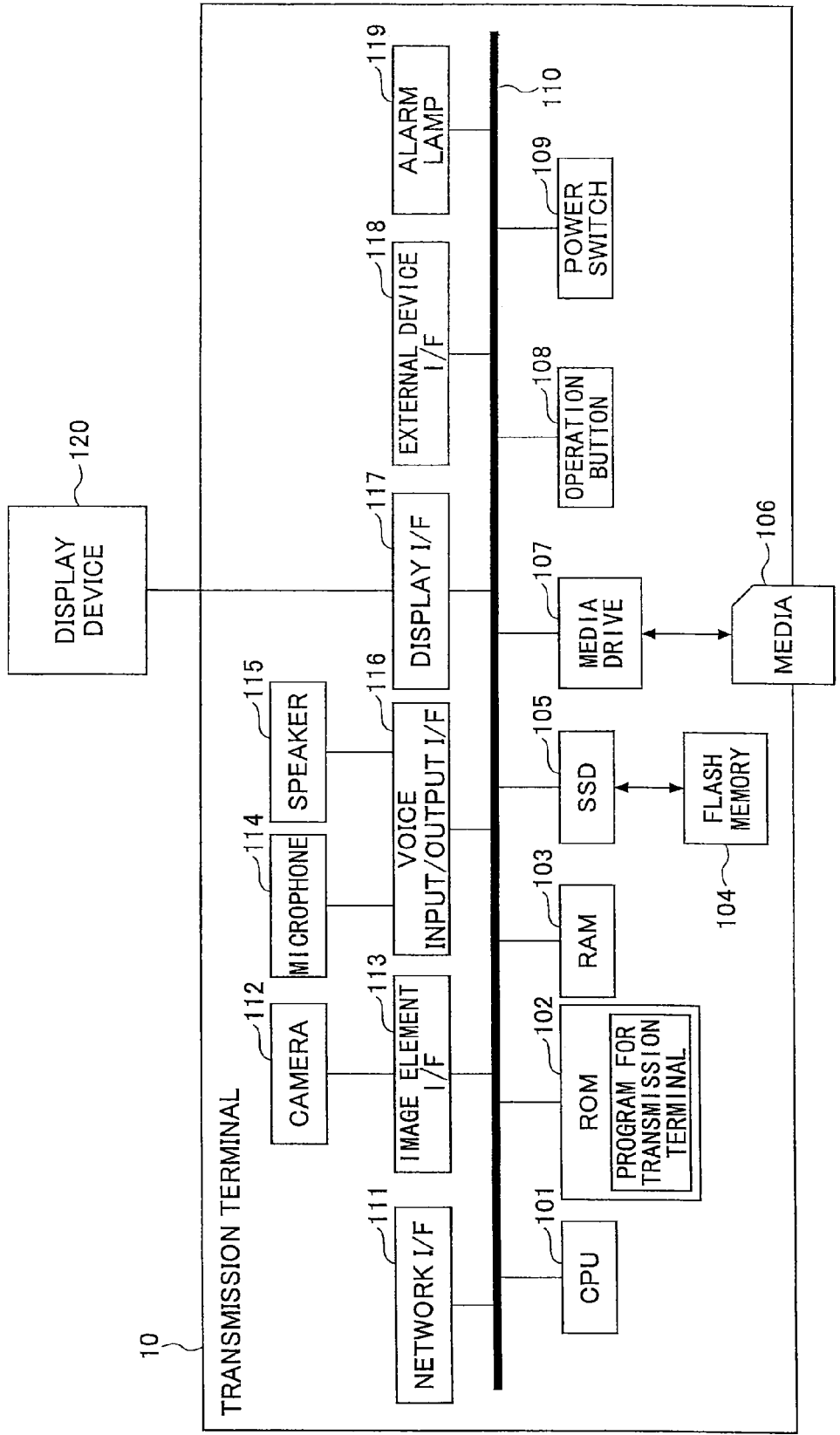
FIG. 2 is a diagram illustrating an example of a hardware configuration of a transmission terminal in the transmission system according to the present embodiment.

FIG. 2 is a diagram illustrating a hardware configuration of the transmission terminal 10 in the transmission system 1 according to the present embodiment. As shown in FIG. 2, the transmission terminal 10 includes a CPU (central processing unit) 101, which controls operations of the whole terminal 10; a ROM (read-only memory) 102, which stores the program for the transmission terminal; a RAM (random access memory) 103, used as a work area for the CPU 101; a flash memory 104, storing a program for the terminal and various data, such as image data and voice data; an SSD (solid state drive) 105, which controls reading from and writing to the flash memory 104 the various data according to the control by the CPU 101; a media drive 107, which controls reading data from and writing (storing) data to a recording medium 106, such as a flash memory; an operation button 108, which is operated when switching a destination of the transmission terminal 10, or the like; a power switch 109, used for turning on or off the transmission terminal 10; and a network I/F (interface) 111 for transmitting data using the communication network 2.

Moreover, the transmission terminal 10 further includes a camera 112, for acquiring image data by taking a picture of an object according to control by the CPU 101; an image element I/F 113, which controls the driving of the camera 112; a microphone 114 for inputting voice (sound); a speaker 115 for outputting voice; a voice input/output I/F 116, which performs inputting/outputting processing for a voice signal between the microphone 114 and the speaker 115 according to the control by the CPU 101; a display I/F 117, which transmits image data to an external display device 120 according to the control by the CPU 101; an external device I/F 118, for sending/receiving various data to/from external devices; an alarm lamp 119 for giving notice of a problem in the functions of the transmission terminal 10; and a bus line 110, such as an address bus or a data bus, which electrically connects the above components.

The recording medium 106 is detachable from the terminal 10. Moreover, if the recording medium 106 is a non-volatile memory, from which data are read, or into which data are written according to the control by the CPU 101, not only the flash memory 104, but also EEPROM (electrically erasable and programmable ROM) may be used. Moreover, the camera 112 includes a solid image element, which converts light into an electric signal to obtain digital data for an image (picture) of an object. For the solid image element, for example, CMOS (complementary metal oxide semiconductor), CCD (charge coupled device), or the like is used. Furthermore, instead of the SSD 115, a hard disk drive (HDD) may be used.

The display device 120 includes a display unit, formed of liquid crystal or organic EL (electro luminescence), which displays an image of the object or an icon image for operation.

Furthermore, the program for the transmission terminal may be distributed as a file in an installable form or in an executable form stored in a recording medium readable by a computer, such as the recording medium 106.

Each of the camera 112, the microphone 114, and the speaker 115 may be an external device. The transmission terminal 10 may be, for example, a general-purpose PC (personal computer), a smartphone, a tablet terminal, or a mobile phone.

Figure 3:
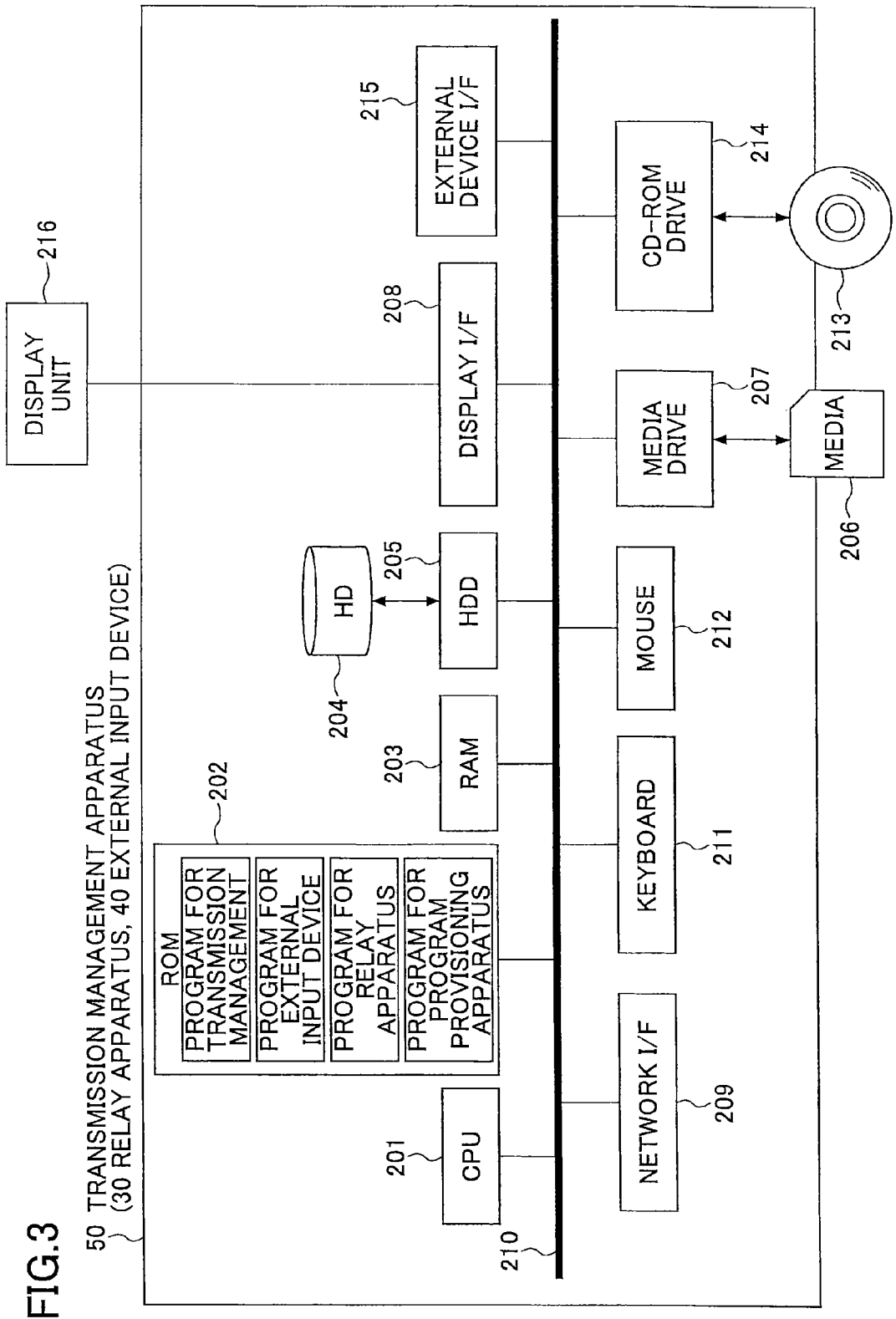
FIG. 3 is a diagram illustrating an example of a hardware configuration of a transmission management apparatus in the transmission system according to the present embodiment.

FIG. 3 is a diagram illustrating an example of a hardware configuration of the transmission management apparatus 50 in the transmission system 1 according to the present embodiment. The transmission management apparatus 50 includes a CPU 201, which controls operations of the whole transmission management apparatus 50; a ROM 202, which stores a program for transmission management; a RAM 203, used as a work area for the CPU 201; a HD (hard disk) 204, which stores various data; the HDD (hard disk drive) 205, which controls reading data from and writing data to the HD 204 according to control by the CPU 201; a media drive 207, which controls reading data from and writing (storing) data to a recording medium 206, such as a flash memory; a display I/F 208 for displaying on a display unit 216 various information items, such as a cursor, a menu, a window, a character or an image; a network I/F 209 for transmitting data using the communication network 2, which will be explained later; a keyboard 211 equipped with plural keys for inputting characters, numerical values, various instructions or the like; a mouse 212 for performing selection and execution of various instructions, selection of a processing object, a cursor movement, or the like; a CD-ROM drive 214, which controls reading various data from and writing various data to a CD-ROM (compact disc read only memory) 213, as an example of a detachable recording medium; an external device I/F, which sends/receives information items to/from an external device; and a bus line 210, such as an address bus or a data bus, which electrically connects the above components. The display unit 216 is also an example of the display device of the external input device 40.

Moreover, the program for the transmission management may be distributed as a file in an installable form or in an executable form stored in a recording medium readable by a computer, such as the recording medium 206, the CD-ROM 213 or the like. The program for the transmission management may be stored in the HD 204.

Furthermore, since the external input device 40 has the same hardware configuration as the transmission management apparatus 50, an explanation will be omitted. However, a program for an external input device for controlling the external input device 40 is stored in the ROM 202. Also in this case, the program for an external input device may be distributed as a file in an installable form or in an executable form stored in a recording medium readable by a computer, such as the recording medium 206, the CD-ROM 213 or the like.

Moreover, since the relay apparatus 30 has the same hardware configuration as the transmission management apparatus 50, an explanation will be omitted. However, a program for a relay apparatus for controlling the relay apparatus 30 is stored in the ROM 202. Also in this case, the program for a relay apparatus may be distributed as a file in an installable form or in an executable form stored in a recording medium readable by a computer, such as the recording medium 206, the CD-ROM 213 or the like.

Moreover, since the program provisioning apparatus 90 has the same hardware configuration as the transmission management apparatus 50, an explanation will be omitted. However, a program for a program provisioning apparatus for controlling the program provisioning apparatus 90 is stored in the ROM 202. Also in this case, the program for the relay apparatus may be distributed as a file in an installable form or in an executable form stored in a recording medium readable by a computer, such as the recording medium 206, the CD-ROM 213 or the like. The program for the program provisioning apparatus may be stored in the HD 204, other than the ROM 202.

Furthermore, since the maintenance apparatus 100 has the same hardware configuration as the transmission management apparatus 50, an explanation will be omitted. The maintenance apparatus 100 is a computer which maintains or manages at least one of the transmission terminal 10, the relay apparatus 30, the transmission management apparatus or the program provisioning apparatus. For example, in the case that the maintenance apparatus 100 is installed in one country and the transmission terminal 10, the relay apparatus 30, the transmission management apparatus 50 or the program provisioning apparatus 90 is installed in an other country, the maintenance apparatus 100 performs the maintenance process of keeping, managing, maintaining, or the like, for at least one of the transmission terminal 10, the relay apparatus 30, the transmission management apparatus 50 or the program provisioning apparatus 90, remotely via the communication network 2.

Moreover, the maintenance apparatus 100 performs a maintenance process of managing a model number, a production number, a sales destination, maintenance and inspection, a failure history or the like, for at least one of the transmission terminal 10, the relay apparatus 30, the transmission management apparatus 50, or the program provisioning apparatus 90, without using the communication network 2.

As an other example of the detachable recording medium, the program may be distributed as a file stored in a recording medium readable by a computer, such as a CD-R (compact disc recordable), a DVD (digital versatile disk), a Blu-ray disc, or the like.

<<Functional Configuration According to Embodiment>>

Figure 4:
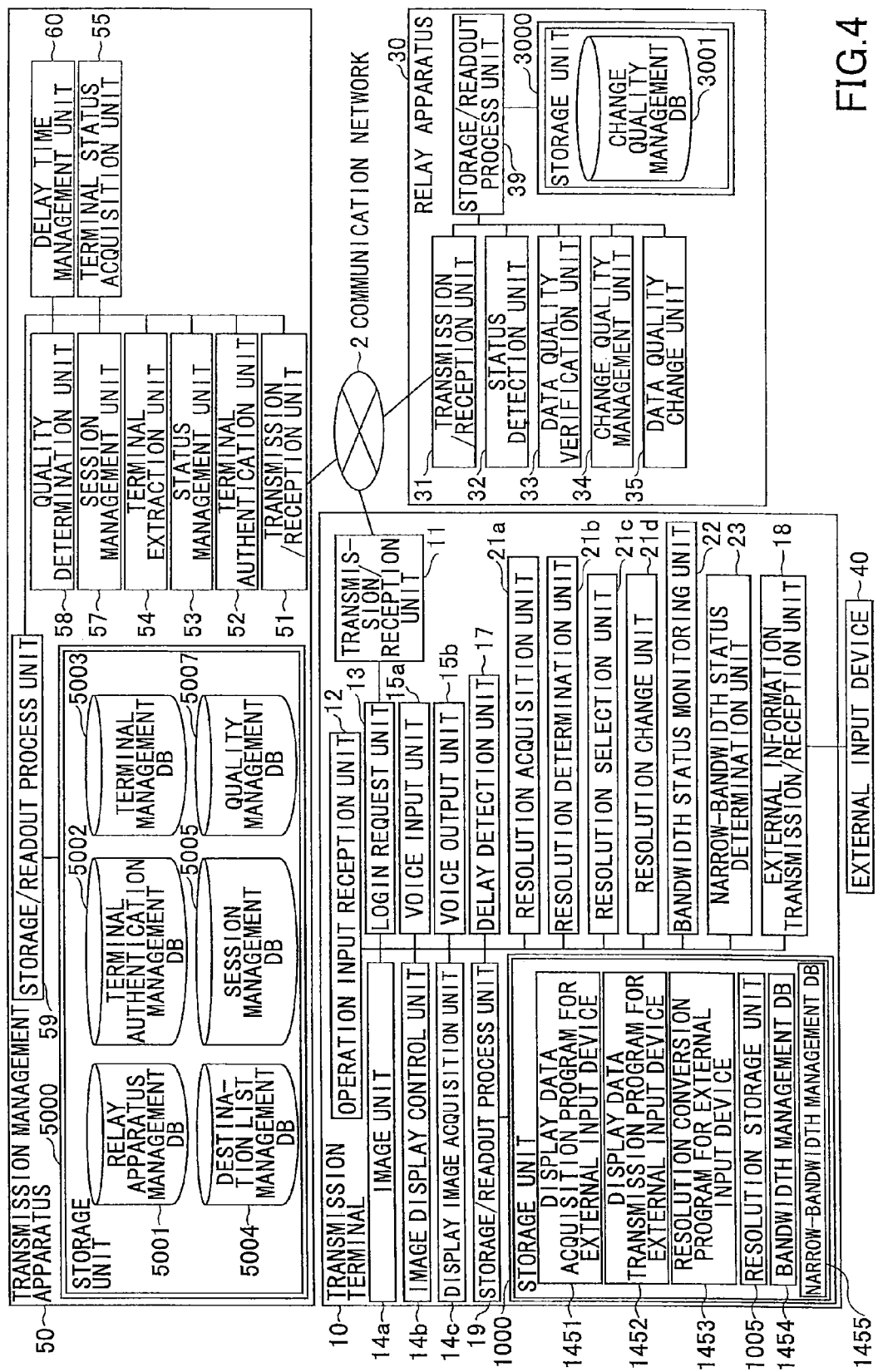
FIG. 4 is a functional block diagram illustrating an example of a transmission terminal, a relay apparatus and the transmission management apparatus in the transmission system according to the present embodiment.

Next, the functional configuration according to the present embodiment will be explained with reference to FIGS. 4 to 14. FIG. 4 is a functional block diagram illustrating an example of the transmission system according to the present embodiment. The transmission system 1 includes the transmission terminal 10, the relay apparatus 30 and the transmission management apparatus 50. In the example shown in FIG. 4, the transmission terminal 10, the relay apparatus 30 and the transmission management apparatus 50 are connected so as to perform data communications via the communication network 2. Moreover, the external input device 40 is connected so as to send/receive data to/from the transmission terminal 10. The program provisioning apparatus 90 and the maintenance apparatus 100, shown in FIG. 1, are not relevant to the communication for the video conference directly, and are omitted in FIG. 4.

Figure 13:
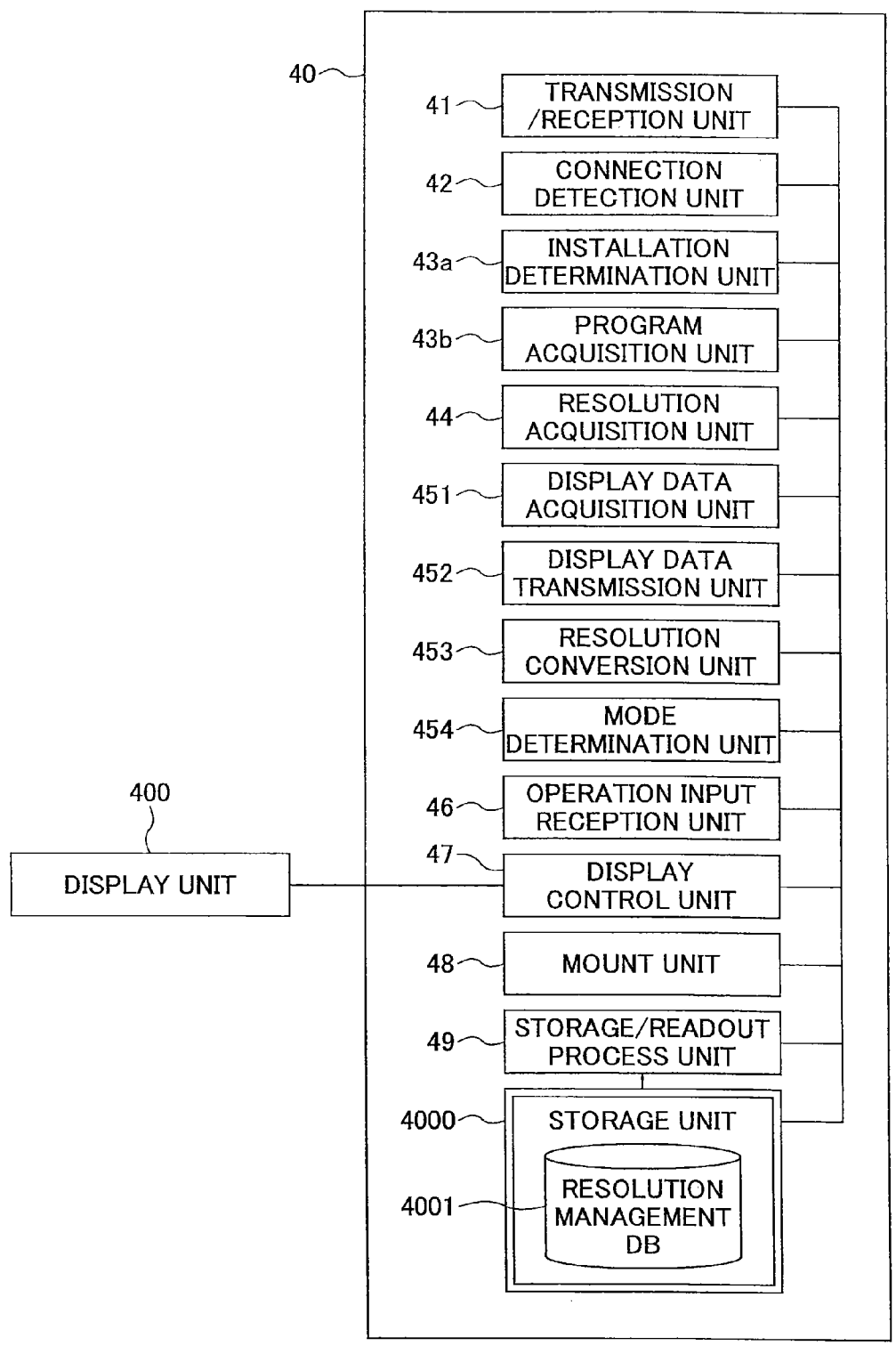
FIG. 13 is a functional block diagram illustrating an example of an external input device according to the present embodiment.

FIGS. 5A to 5C are explanatory diagrams for explaining image quality of image data. FIG. 6 is a diagram illustrating an example of a table for managing change in quality of image data. FIG. 7 is a diagram illustrating an example of a table for managing the relay apparatus. FIG. 8 is a diagram illustrating an example of a table for managing authentication for the terminal. FIG. 9 is a diagram illustrating an example of a table for managing the terminal. FIG. 10 is a diagram illustrating an example of a table for managing a destination list. FIG. 11 is a diagram illustrating an example of a table for managing a session. FIG. 12 is a diagram illustrating an example of a table for managing the image quality of the image data. FIG. 13 is a functional block diagram of the external input device 40. FIG. 14 is a diagram illustrating an example of a table for managing a resolution of image data.

<Functional Configuration of Transmission Terminal>

The transmission terminal 10, as shown in FIG. 4, includes a transmission/reception unit 11; an operation input reception unit 12; a login request unit 13, an image unit 14a, an image display control unit 14b, a display image acquisition unit 14c, a voice input unit 15a, a voice output unit 15b, a delay detection unit 17, an external information transmission/reception unit 18, a storage/readout process unit 19, a resolution acquisition unit 21a, a resolution determination unit 21b, a resolution selection unit 21c, a resolution change unit 21d, a bandwidth status monitoring unit 22, and a narrow-bandwidth determination unit 23. Each of the above units is a function or a functioning means realized by one of the components, shown in FIG. 2, operating according to an instruction from the CPU 101 following the program stored in the ROM 102. Moreover, the terminal 10 includes a storage unit 1000, including the SSD 105, shown in FIG. 2.

<Each Functional Element of Transmission Terminal>

Next, each of the functional elements of the transmission terminal 10 will be explained in detail. The transmission/reception unit 11 is realized by the network I/F 111, shown in FIG. 2, and sends various data to and receives various data from other transmission terminals 10, the relay apparatus 30 or the transmission management apparatus 50 via the communication network 2. The operation input reception unit 12 is realized by the operation button 108 and the power switch 109, shown in FIG. 2, and receives various inputs from a user. For example, when the user turns the power switch 109 to ON, the operation input reception unit 12 receives a signal of the user's operation, and turns on the power. Moreover, the operation input reception unit 12 receives resolution information representing a resolution input by the user's operation.

The login request unit 13 is realized by the instruction from the CPU 101, show in FIG. 2, and when receiving the operation for turning on the power, automatically sends login request information for requiring a login and an IP address of the transmission terminal 10 at the time of sending, from the transmission/reception unit 10 to the transmission management apparatus 50 via the communication network 2.

The image unit 14a is realized by the camera 112 and the image element I/F 113, shown in FIG. 2, and generates image data for an image of an object obtained by taking a picture of the object. The image display control unit 14b is realized by the display I/F, shown in FIG. 2, and performs a rendering process for image data, to control the image data so as to display the image represented by the image data on the display unit 120. The display image acquisition unit 14c acquires image data which represents the image displayed on the display device 120. In the present embodiment, data representing an image taken by the camera 112 is denoted as "image data". Moreover, data representing an image displayed on the display unit 216 of the external input unit 40, which will be explained later in detail, is denoted as "display data". The image data and the display data are, for example, in the format of JPEG (Joint Photographic Experts Group), Bitmap, GDI (Graphics Device Interface) or the like.

The voice input unit 15a realized by the microphone 114 and the voice input/output I/F 116, shown in FIG. 2, inputs the user's voice, converts the voice into a voice signal, and outputs voice data regarding the voice signal. The voice output unit 15b realized by the speaker 115 and the voice input/output I/F 116, converts the voice signal regarding the voice data into a sound, and outputs the sound.

The delay detection unit 17 is realized by the instruction from the CPU 101, shown in FIG. 2, and detects a delay time (ms) of the image data or the voice data sent from the other transmission terminal 10 via the relay apparatus 30. Moreover, the external information transmission/reception unit 18 sends/receives data to/from the external input device via the external device I/F, shown in FIG. 2. Moreover, a storage/readout process unit 19 is executed by the SSD 105, shown in FIG. 2, which stores various data into the storage unit 1000, and reads out various data stored in the storage unit 1000.

The resolution acquisition unit 21a acquires a resolution, with which the display device 120, connected to the transmission terminal 10, can display an image. The resolution determination unit 21b determines whether the resolution acquired by the resolution acquisition unit for display includes a resolution other than the standard aspect ratio used for transmitting image data. The resolution selection unit 21c selects, based on a result of a determination by the resolution determination unit 21b, selects a resolution other than the standard aspect ratio, or a resolution of the standard aspect ratio, from the resolution for display. The resolution change unit 21d changes the resolution of the display device 120 to a resolution represented by resolution information received by the operation input reception unit 12. The resolution in the present embodiment is a number of pixels in a unit length on the display screen, and includes a resolution in the vertical direction and a resolution in the horizontal direction.

The bandwidth status monitoring unit monitors a bandwidth status in the case of sending display data to the other transmission terminal and monitors a bandwidth status in the case of receiving display data from the other transmission terminal (measures the transmission rate), and registers the measured bandwidth status in the bandwidth management table. The narrow bandwidth status determination unit 23 refers to transmission bandwidth in the bandwidth management table, compares the bandwidth with a predetermined value, and sets "TRUE" or "FALSE" in the narrow bandwidth mode management table.

The storage unit 1000 stores a terminal ID (Identification) for identifying the transmission terminal 10, including a password, image data, voice data, a relay apparatus ID for identifying relay apparatus (which sends various data) an IP address of a destination terminal, and the like. Moreover, the storage unit 1000 stores a program for an external input device (the display data acquisition program 1451, the display data transmission program 1452 and the resolution change program 1453). By transmitting the above programs to the external input device and installing them in the external input device, the external input device is equipped with a display data acquisition unit 451, a display data transmission unit 452 and a resolution conversion unit 453, which will be explained later. The display data acquisition unit 451, the display data transmission unit 452 and the resolution conversion unit will be explained in detail in the section of <Each functional element of an external input device>. Moreover, the storage unit 1000 includes a resolution storage unit 1005 (which stores resolution information representing the resolution of the display data output by the transmission terminal 10) a bandwidth management DB 1454 and a narrow bandwidth management DB 1455.

The external information transmission/reception unit 18 is an example of a resolution information transmission unit and a display data reception unit. The image display control unit 14*b* is an example of a display control unit.

The terminal ID and the relay apparatus ID, which will be explained later, according to the present embodiment, are identification information, such as a language, a character, a symbol, numerical signs, or the like, used for uniquely identifying the transmission terminal 10 and the relay apparatus 30, respectively. Moreover, the terminal ID and the relay apparatus ID may be a combination of at least two of the language, the character, the symbol, or the numerical signs. In the following explanation, the transmission terminal 10 which is a request source requesting the start of the video conference is denoted "request source terminal", and the transmission terminal 10 which is a destination of the request is denoted "destination terminal".

<<Bandwidth Management DB>>

FIG. 15A illustrates an example of the bandwidth management table, configured in the bandwidth management DB, stored in the storage unit 1000. The bandwidth management table manages the transmission bandwidth status in the communication network. The bandwidth is expressed by a data transmission rate in units of bps (bits per second). Accordingly, the larger the value is, the higher the bandwidth. The valued of bandwidth in the bandwidth management table is registered by the bandwidth status monitoring unit 22.

<<Narrow Bandwidth Management DB>>

FIG. 15B illustrates an example of the narrow bandwidth management table, configured in the narrow bandwidth management DB, stored in the storage unit 1000. The narrow bandwidth management table manages whether the narrow bandwidth mode is valid or invalid. The "narrow bandwidth mode" is registered, with which "TRUE" (valid) or "FALSE" (invalid) is attached. That is, for communication in the narrow bandwidth mode, "TRUE" is set, and for communication in a mode other than the narrow bandwidth mode, "FALSE" is set. Switching between "TRUE" and "FALSE" is performed by the narrow bandwidth status determination unit 23.

<Functional Configuration of Relay Apparatus>

Next, the function or means of the relay apparatus 30 will be explained in the following. The relay apparatus 30 includes a transmission/reception unit 31, a status detection unit 32, a data quality verification unit 33, a change quality management unit 34, a data quality change unit 35, and a storage/readout process unit 39. Each of the above units is a function or a means realized by one of the components, shown in FIG. 3, operating according to an instruction from the CPU 201 following the program stored in the ROM 202. Moreover, the relay apparatus 30 includes a storage unit 3000, which includes a storage unit 3000 configured by one of the ROM 202, RAM 203 and the HDD 205.

<<Change Quality Management Table>>

The storage unit 3000 includes a change quality management DB 3001, configured by a change quality management table, as shown in FIG. 6. The change quality management table manages an IP address of a transmission terminal 10, to which image data are relayed, and a quality of the image data, to be relayed to the transmission terminal 10 by the relay apparatus, which are associated with each other.

The resolution of an image represented by image data, processed in the transmission system 1 according to the present embodiment, will be explained in the following. FIG. 5A illustrates an example of an image with a low resolution, as a base image, having 160 pixels in the horizontal direction and 120 pixels in the vertical direction. FIG. 5B illustrates an example of an image with an intermediate resolution, having 320 pixels in the horizontal direction and 240 pixels in the vertical direction. FIG. 5C illustrates an example of an image with a high resolution, having 640 pixels in the horizontal direction and 480 pixels in the vertical direction. In the case of communication through a narrow bandwidth path, image data of low image quality including only image data of low resolution as a base image are relayed. In the case where the bandwidth is relatively broad, image data of intermediate quality including image data of the low resolution as a base image and image data of the intermediate resolution are relayed. In the case where the bandwidth is quite broad, image data of high image quality including image data of the low resolution as a base image, image data of the intermediate resolution and image data of the high resolution are relayed. For example, FIG. 6 shows that according to the change quality management table, the relay apparatus 30 relays to the destination terminal 10*db* (see FIG. 1) with the IP address (1.3.2.4) image data of "high image quality".

<Each Functional Element of the Relay Apparatus>

Next, each functional element of the relay apparatus 30 will be explained in detail. In the following, in the explanation of the functional element of the relay apparatus 30, a relationship between the functional element and the component, shown in FIG. 3, which realizes the functional element of the relay apparatus 30, will be described.

The transmission/reception unit 31 (see FIG. 4) of the relay apparatus 30 is realized by the network I/F 209, shown in FIG. 3, and sends various data to and receives various data from the transmission terminals 10, the other relay apparatus 30 and the transmission management apparatus 50, via the communication network 2. The status detection unit 32 is realized by the instruction from the CPU 201, shown in FIG. 3, and detects an operational status of the relay apparatus 30, which includes the status detection unit 32. The operational status is, for example, "online", or "offline".

The data quality verification unit 33 is realized by the instruction from the CPU 201, show in FIG. 3, and searches the change quality management table (see FIG. 6) utilizing the IP address of the destination terminal 10 as a search key, extracts image quality of the image data relayed to the destination terminal with the IP address, and verifies the image quality of the image data to be relayed. The change quality management unit 34 is realized by the instruction from the CPU 201, shown in FIG. 3, changes content in the change quality management DB 3001, based on quality information, which will be described later, transmitted from the transmission management apparatus 50. For example, in the case that during the request source terminal 10aa with the terminal ID "01aa" communicates with the destination terminal 10db with the terminal ID "01db" in the video conference by sending/receiving image data of high image quality, the request source terminal 10bb and the destination terminal 10ca start another video conference, and a delay occurs in receiving image data at the destination terminal 10db, the relay apparatus 30 is required to lower the image quality of the image data, which has been relayed, to the intermediate image quality. In such a case, the content in the change quality management DB 3001 is updated so as to lower the image quality of image data relayed by the relay apparatus 30 from the high image quality to the low image quality, based on the quality information for the intermediate image quality.

The data quality change unit 35 is realized by the instruction from the CPU 201, shown in FIG. 3, and changes the image quality of the image data sent from the request source terminal 10 based on the content in the updated change quality management DB 3001. The storage/readout process unit 39 is realized by the instruction from the CPU 201, stores various data into the storage unit 3000, and reads out various data from the storage unit 3000.

<Functional Configuration of the Transmission Management Apparatus>

Next, the functions of the transmission management apparatus 50 will be explained in the following. The transmission management apparatus 50 includes, as shown in FIG. 4, a transmission/reception unit 51, a terminal authentication unit 52, a status management unit 53, a terminal extraction unit 54, a terminal status acquisition unit 55, a session management unit 57, a quality determination unit 58, a storage/readout process unit 59, and a delay time management unit 60. Each of the above units is a function realized by one of the components shown in FIG. 3, operating according to an instruction from the CPU 201 following the program stored in the ROM 202. Moreover, the transmission management unit 50 includes a storage unit 5000, configured by one of the ROM 202, the RAM 203, and the HDD 205.

<<Relay Apparatus Management Table>>

The storage unit 5000 includes a relay apparatus management DB 5001, including a relay apparatus management table, as shown in FIG. 7. The relay apparatus management table manages an operational status of the relay apparatus 30, a reception time when the transmission management apparatus 50 receives status information indicating the operational status, an IP address of the relay apparatus 30, and the maximum data transmission rate (Mbps) at the relay apparatus 30, which are associated with each other, for each relay apparatus ID of the relay apparatus 30. For example, the relay apparatus management table, shown in FIG. 7, indicates that the relay apparatus 30a with the relay apparatus ID "111a" (see FIG. 1), is in the operational status "online", the status information is received by the management apparatus 50 on "November 10, 2009, 13:00", the IP address of the relay apparatus 30a is "1.2.1.2", and the maximum data transmission rate of the relay apparatus 30a is 100 Mbps.

<<Terminal Authentication Management Table>>

Moreover, the storage unit 5000 includes a terminal authentication management DB 5002, including a terminal authentication managing table, as shown in FIG. 8. In the terminal authentication management table, each terminal ID of all the transmission terminals 10 managed by the transmission management apparatus 50 is associated with a password for the terminal ID. For example, the terminal authentication management table, as shown in FIG. 8, indicates that a terminal ID of the transmission terminal 10aa (see FIG. 1) is "01aa" and a password is "aaaa".

<<Terminal Management Table>>

Moreover, the storage unit 5000 includes a terminal management database (DB) 5003, including a terminal management table, as shown in FIG. 9. The terminal management table manages, for each terminal ID of the transmission terminals 10, an operational status of the transmission terminal 10, a reception time when the transmission management apparatus 50 receives login request information, which will be explained later, and an IP address of the transmission terminal 10, which are associated with each other. For example, the terminal management table, as shown in FIG. 9, indicates that the transmission terminal 10aa with the terminal ID "01aa" (see FIG. 1), is in the operational states "online", the transmission management apparatus 50 receives the login request information at "November 10, 2009, 13:40" and the IP address of the transmission terminal 10aa is "1.2.1.3".

<<Destination List Management Table>>

Moreover, the storage unit 5000 includes a destination list management DB 5004, including a destination list management table, as shown in FIG. 10. The destination list management table manages request source terminals 10, which require starting communicating in the video conference, so that all terminal IDs of destination terminals 10 registered as candidates of a destination terminal 10 are associated with each of the terminal IDs of the request source terminals 10. For example, the destination list management table, shown in FIG. 10, indicates that the candidates of a destination terminal 10, with which the request source terminal 10aa with the terminal ID "01aa" (see FIG. 1) requires to start communication in the video conference, are three transmission terminals, i.e. the transmission terminal 10ab with the terminal ID "01ab", the transmission terminal 10ba with the terminal ID "01ba" and the transmission terminal 10db with the terminal ID "10db". The candidate of the destination terminal 10 may be updated by appending or deleting an item in the destination list management table according to a request from the request source terminal 10 to the transmission management apparatus 50.

<<Session Management Table>>

Moreover, the storage unit 5000 includes a session management DB 5005, including a session management table, as shown in FIG. 11. The session management table manages, for each of the session IDs for selection used for executing a session to select the relay apparatus 30, a relay apparatus ID of the relay apparatus 30, a terminal ID of the request source terminal 10, a terminal ID of the destination terminal 10, a delay time (ms), and a reception time, which are associated with each other. The delay time (ms) in this table is a delay time of reception in receiving image data at the destination terminal 10. The reception time is when the transmission management apparatus 50 receives delay information from the destination terminal 10 which indicates the delay time.

For example, the session management table, shown in FIG. 11, indicates that the relay apparatus 30a (with the relay device ID "111a"), selected in a session executed using the session ID for selection "se1", relays image data and voice data between the request source terminal 10aa (with the terminal ID "01aa") and the destination terminal 10db (with the terminal ID "01db"). The session management table further indicates that the delay time of image data at the destination terminal 10db at the time of "November 10, 2009, 14:00" is 200 ms.

In the case of conducting the video conference between two transmission terminals 10, the reception time of the delay information may be managed based on the delay information sent from the request source terminal 10, not the destination terminal 10. However, in the video conference among two or more transmission terminals 10, the reception time of the delay information is managed based on the delay information sent from the transmission terminal 10, which receives image data and voice data.

<<Quality Management Table>>

Furthermore, the storage unit 5000 includes a quality management DB 5007, including a quality management table, as shown in FIG. 12. The quality management table manages the delay time (ms) of image data at the request source terminal 10 or the destination terminal 10, and image quality of the image data to be relayed at the relay apparatus 30, which are associated with each other.

<Each Functional Element in Transmission Management Apparatus>

Next, each function element in the transmission management apparatus 50 will be explained in detail. In the following, in the explanation of the functional element of the transmission management apparatus 50, a relationship between the functional element and the component, shown in FIG. 3, which realizes the functional element of the transmission management apparatus 50, will be described.

The transmission/reception unit 51 (see FIG. 4) is executed by the network I/F 209, and sends various data to and receives various data from the transmission terminal 10, the relay apparatus 30 or other system (the program provisioning apparatus 90, or the maintenance apparatus 100) via the communication network 2. The terminal authentication unit 52 searches the terminal authentication management DB 5002 in the storage unit 5000 with a terminal ID and a password used as a search key which is included in the login request information received via the transmission/reception unit 51, and determines whether the same terminal ID and the same password are managed in the terminal authentication management DB 5002, in order to perform the terminal authentication. The status management unit 53, in order to manage the operational status of the request source terminal 10, which requires a login, manages the terminal ID of the request source terminal 10, the operational status of the request source terminal 10, the reception time when the transmission management apparatus 50 receives the login request information, and the IP address of the request source terminal 10, by associating them with each other and then storing them in the terminal management table (see FIG. 9).

The terminal extraction unit 54 extracts a terminal ID by searching the destination list management table (see FIG. 10) with the terminal ID of the request source terminal 10 as a search key which requires a login, and reads out terminal IDs of candidates of a destination terminal 10 which can communicate with the request source terminal 10. Moreover, the terminal extraction unit 54 searches the destination list management table (see FIG. 10) with the terminal ID of the request source terminal 10 as a search key which requires a login, and searches for terminal IDs of other request source terminals, that are registered candidates of a destination terminal 10 which includes the above request source terminal 10.

The terminal status acquisition unit 55 searches the terminal management table (see FIG. 9), with the terminal ID of the candidate of the destination terminal 10 as a search key extracted by the above terminal extraction unit 54, and reads out operating status for each of the terminal IDs extracted by the terminal extraction unit 54. Accordingly, the terminal status acquisition unit 55 can acquire the operating status of the candidates of the destination terminal 10, which are allowed to communicate with the request source terminal 10, which has required the login. Moreover, the terminal status acquisition unit 55, with the terminal ID as a search key extracted by the terminal extraction unit 54, searches the terminal management table (see FIG. 9), and also acquires the operational status of the request source terminal 10, which has required the login.

The session management unit 57 manages the generated session ID, terminal ID of the request source terminal 10 and terminal ID of the destination terminal 10, by associating them with each other, and stores them in the session management DB 5005 of the storage unit 5000 (the session management table in FIG. 11). Furthermore, the session management unit 57 manages the relay apparatus ID of the relay apparatus 30 by storing them in the session management table (see FIG. 11).

The quality determination unit 58 determines image quality of image data to be relayed by the relay apparatus 30, by searching the quality management table (see FIG. 12) with the above delay time as a search key, and extracts image quality corresponding to the image data. The storage/readout process unit 59 is executed by the HDD 205, shown in FIG. 3, and performs a process of storing various data into the storage unit 5000 and a process of reading out various data stored in the storage unit 5000. The delay time management unit 60 searches the terminal management table (see FIG. 9) with the IP address of the above destination terminal 10, and extracts a corresponding terminal ID. The delay time management unit 60 manages the delay time by storing the delay time indicated by the above delay information into a field of delay time in the record, including the terminal ID, extracted as above, in the session management table (see FIG. 11).

<Functional Configuration of an External Input Device>

The external input device 40, as shown in FIG. 13, includes a transmission/reception unit 41, a connection detection unit 42, an installation determination unit 43a, a program acquisition unit 43b, a resolution acquisition unit 44, a display data acquisition unit 451, a display data transmission unit 452, a resolution conversion unit 453, a mode determination unit 454, an operation input reception unit 46, a display control unit 47, a mount unit 48, and a storage/readout process unit 49. Each of the above units is a function or a means realized by one of the components, shown in FIG. 3, operating according to an instruction from the CPU 201 following the program stored in the ROM 202. Moreover, the display data acquisition unit 451, the display data transmission unit 452, the resolution conversion unit 453, and the mode determination unit 454 are realized by downloading a display data acquisition program 1451, a display data transmission program 1452 and a resolution conversion program 1453 stored in the storage unit 1000 of the transmission terminal 10 (see FIG. 4) by the program acquisition unit 43a, and by installing these programs. Furthermore, the external input device 40 includes a storage unit 4000 configured by the ROM 202, the RAM 203 or the HDD 205, shown in FIG. 3. Moreover, on the external input device 40, an OS (operating system), such as "Windows" (registered trademark), "Mac (registered trademark) OS", "Mac (registered trademark) OS X Lion", "Mac (registered trademark) OS X", "OS X", or the like, though not especially shown. Accordingly, the external input device is equipped with a function of executing a program when it is connected to the other apparatus.

<Each Functional Element of an External Input Device>

Next, each functional element of the external input device 40 will be explained in detail. The transmission/reception unit 41 (see FIG. 13) is realized by the network I/F 209, shown in FIG. 3, and sends/receives various data (information) to/from the transmission terminal 10. The transmission/reception unit 41, as information relevant to the present embodiment, when the display resolution is changed on the side of the transmission terminal 10, receives resolution information indicating the resolution after the change (first resolution information). The connection detection unit 42 detects that sending/receiving various data to/from the transmission terminal 10 becomes possible by the external device I/F 215, shown in FIG. 3.

The installation determination unit 43a, when the connection detection unit 42 detects that sending/receiving data between the external input device and the transmission terminal 10 becomes possible, determines whether the display data acquisition program 1451, the display data transmission program 1452, and the resolution conversion program 1453 are installed in the external input device 40 or not. The program acquisition unit 43b, when the installation determination unit 43a determines that the display data acquisition program 1451, the display data transmission program 1452, and the resolution conversion program 1453 are not installed in the external input device 40, acquires the display data acquisition program 1451, the display data transmission program 1452, and the resolution conversion program 1453 from the storage unit 1000 of the transmission terminal 19 (see FIG. 4).

The resolution acquisition unit 44 acquires resolution information indicating a resolution of the display unit 216 of the external input device 40 (second resolution information). The operation input reception unit 46 receives information input by a user's operation. The display control unit 47 displays an image read out by the storage/readout process unit 49, which will be described later, on the display unit 216. The mount unit 48 mounts the storage unit 1000 of the transmission terminal 10. According to the above processes, the external input device 40 can install the display data acquisition program 1451, the display data transmission program 1452 and the resolution conversion program 1453.

The display data acquisition unit 451 acquires display data representing the image displayed on the display unit 216 of the external input device 40. The display data transmission unit 452 transmits the display data acquired by the display data acquisition unit 451 to the transmission terminal 10. The resolution conversion unit 451, based on the resolution of the display unit 216 of the external input device 40 (the second resolution information) and the resolution of the display unit 210 of the transmission terminal 10, which has been sent from the transmission terminal 10 and stored in the storage unit 4000 of the external input device 40 (the first resolution information), converts the resolution of the display data to be transmitted to the transmission terminal 10 from the external input device 40.

The mode determination unit 454 communicates with the transmission terminal 10 via the transmission/reception unit 41, and acquires the setting from the narrow bandwidth mode management table. The mode determination unit 454 determines whether the communication is in the narrow bandwidth mode according to whether the setting value for the narrow bandwidth mode indicates "True" or "False".

The storage/readout process unit 49 is executed by the HDD 205, shown in FIG. 3, and performs a process of storing various data into the storage unit 4000 and a process of reading out the various data stored in the storage unit 4000.

The transmission/reception unit 41 is an example of a resolution information reception means. The display data transmission unit 452 is an example of a display data transmission means, the resolution conversion unit 453 is an example of a resolution conversion means, and the display control unit 47 is an example of a display control means.

<<Resolution Management Table>>

The storage unit 4000 includes a resolution management DB 4001. FIG. 14 illustrates an example of a resolution management table stored in the resolution management DB 4001. The resolution management table stores information indicating the resolution in the vertical direction (height direction) of the display unit 120 of the transmission terminal 10, received by the transmission/reception unit 41 and information indicating the resolution in the horizontal direction (width direction), which are associated with each other. For example, the resolution management table, shown in FIG. 14, indicates that the resolution in the width direction of the display unit 120 of the transmission terminal 10 is 1024 and the resolution in the height direction is 768.

<<Process and Operation in Present Embodiment>>

Figure 16:
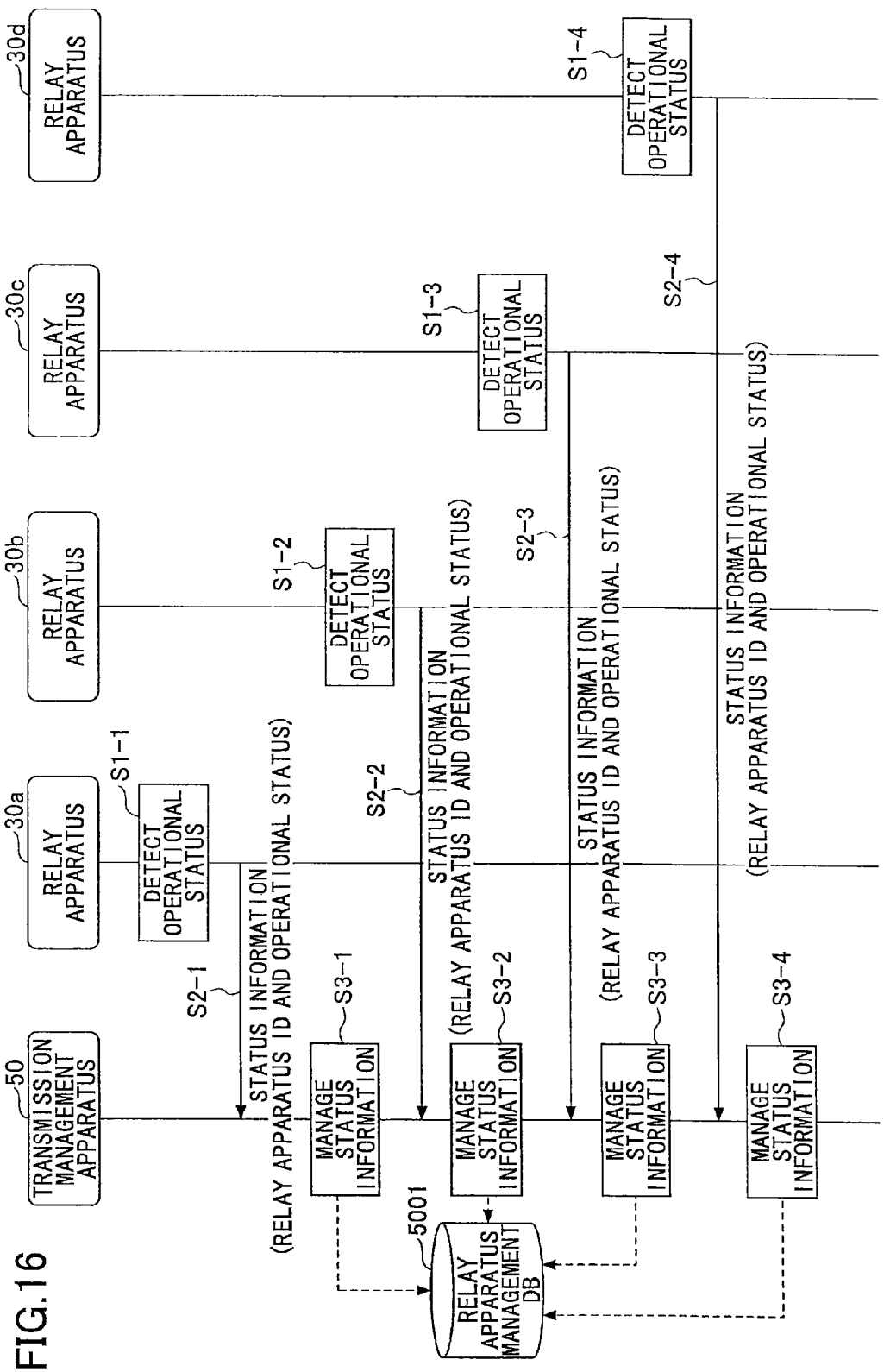
FIG. 16 is a sequence diagram illustrating an example of a process for managing status information representing an operational status of each relay apparatus, sent from the relay apparatus to the transmission management apparatus according to the present embodiment.
Figure 17:
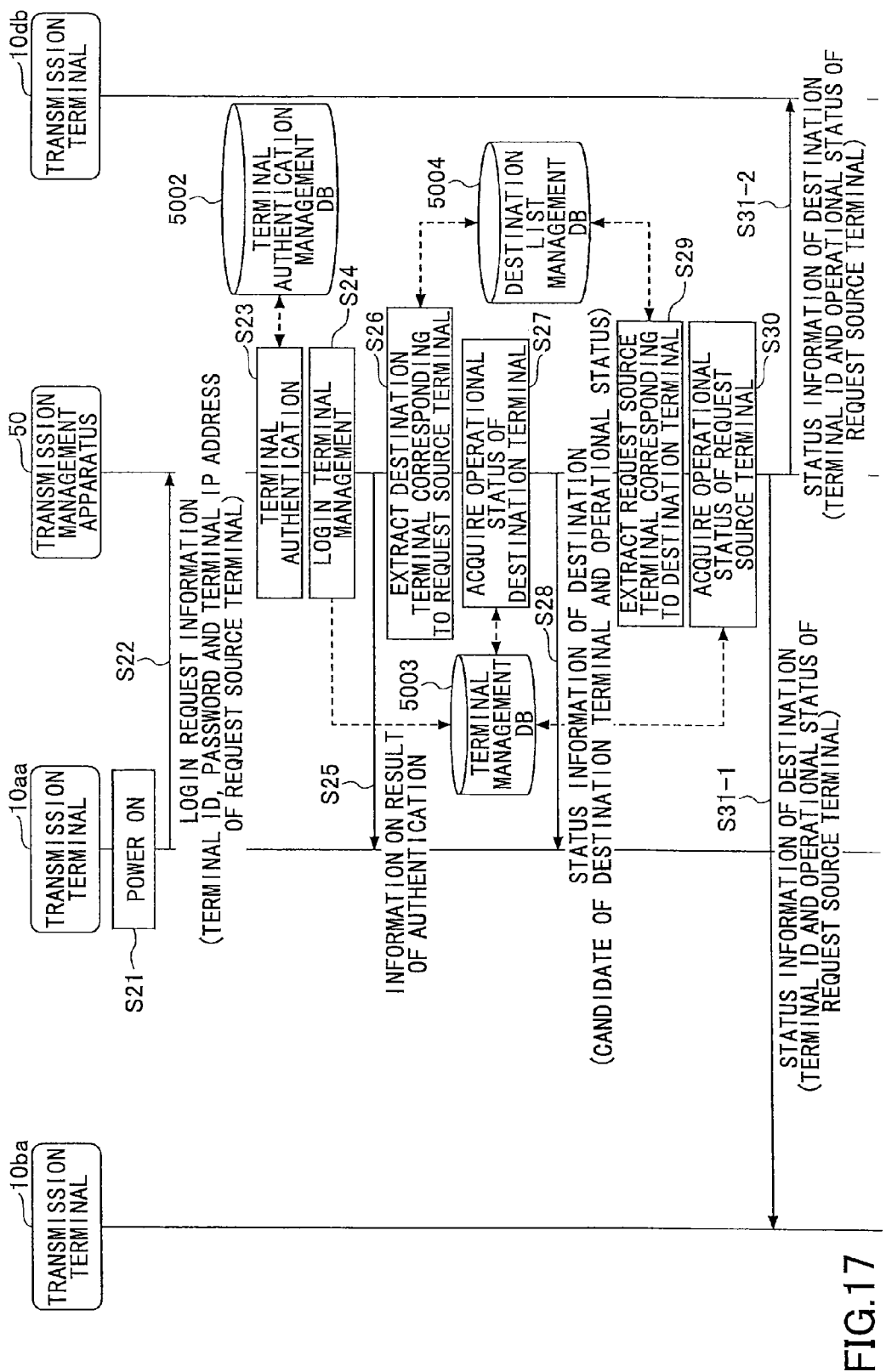
FIG. 17 is a sequence diagram illustrating an example of a process in a stage of preparation for starting the communication between the transmission terminals according present embodiment.
Figure 18:
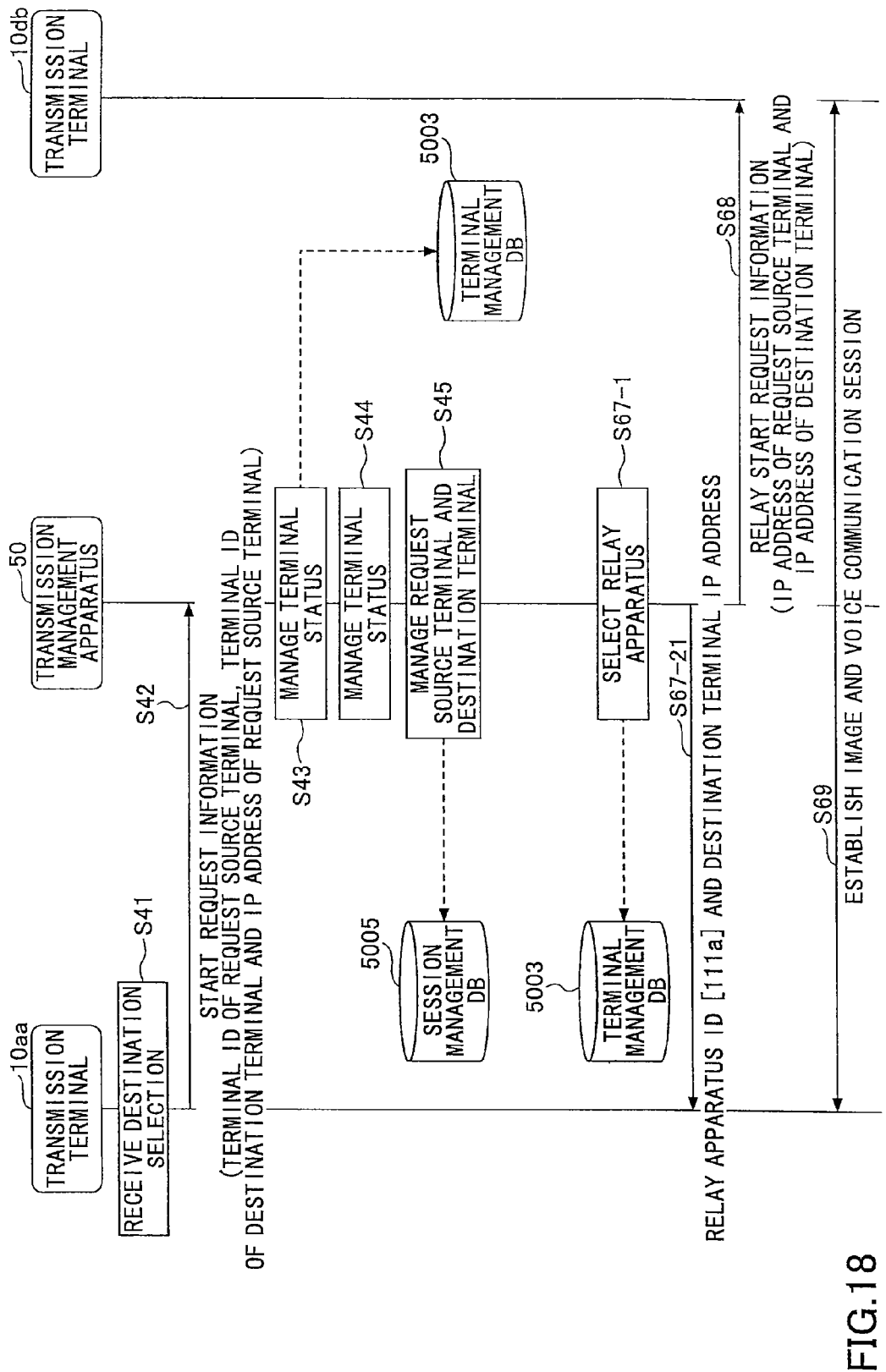
FIG. 18 is a sequence diagram illustrating an example of a process of establishing a session in the transmission terminal according to the present embodiment.
Figure 19:
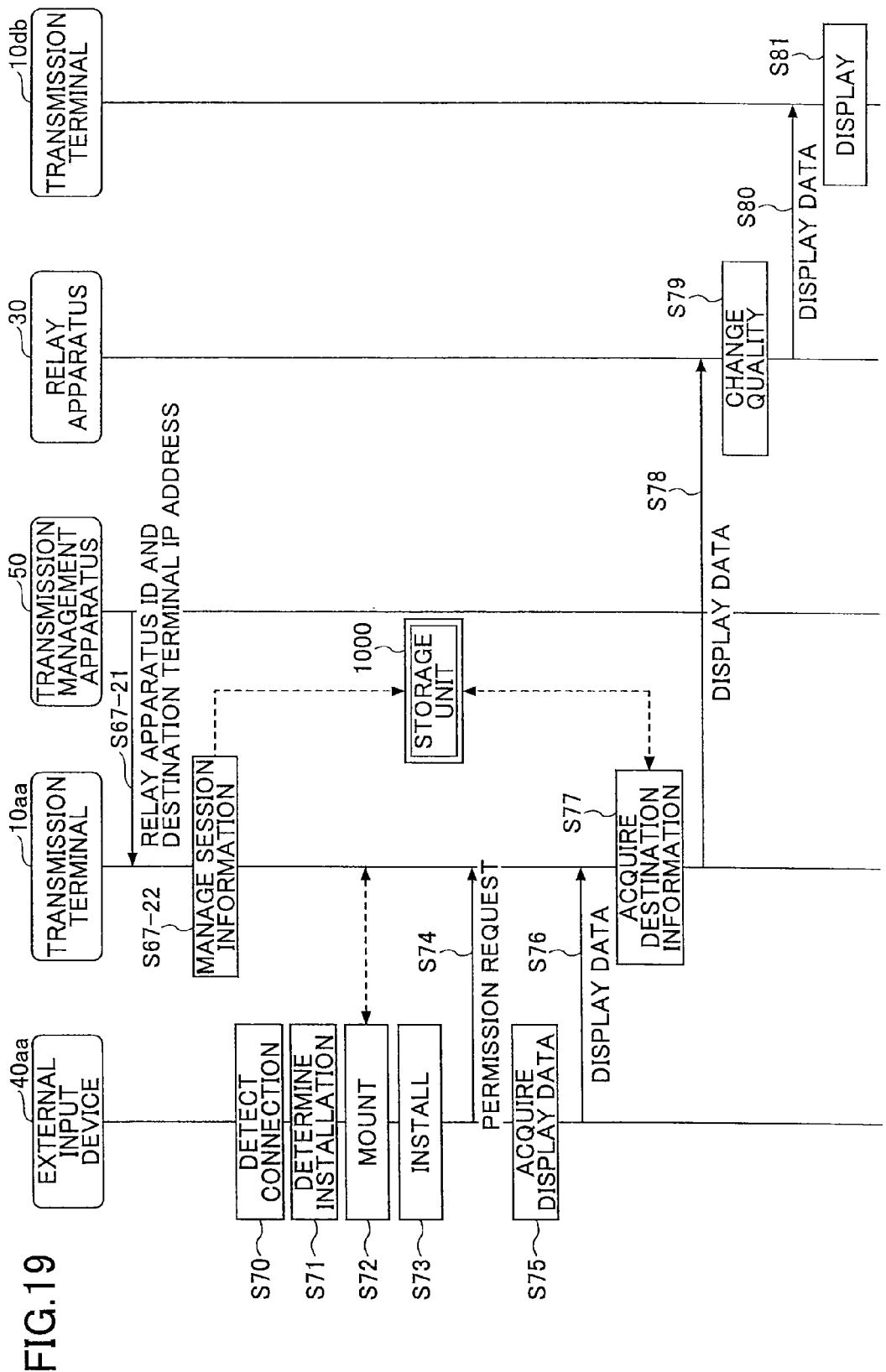
FIG. 19 is a sequence diagram illustrating an example of a process of displaying the display data, displayed on the external input device, on a transmission terminal of an other party in the conference according to the present embodiment.
Figure 20:
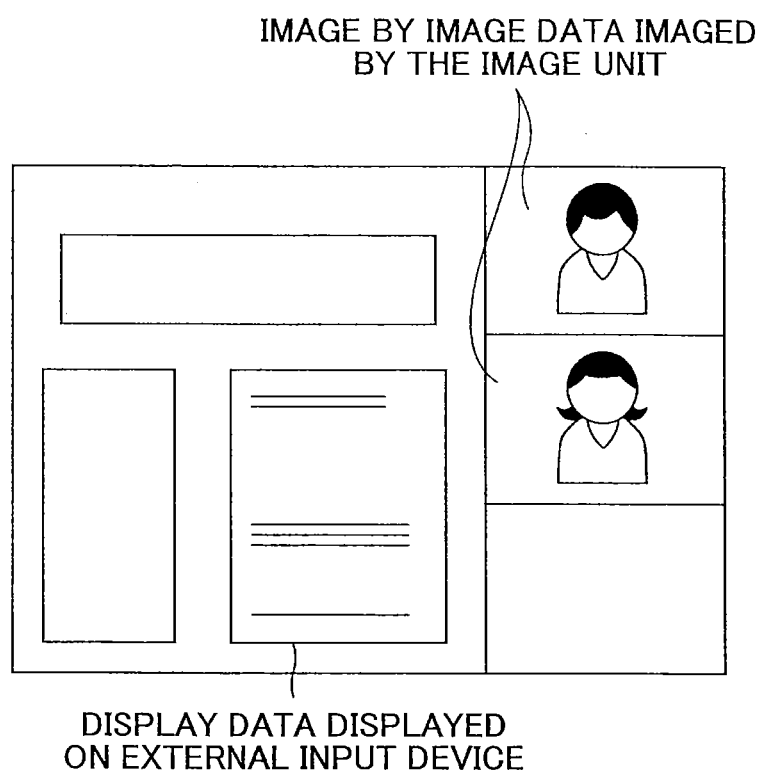
FIG. 20 is a diagram illustrating an example of display data displayed on the display unit according to the present embodiment.
Figure 21:
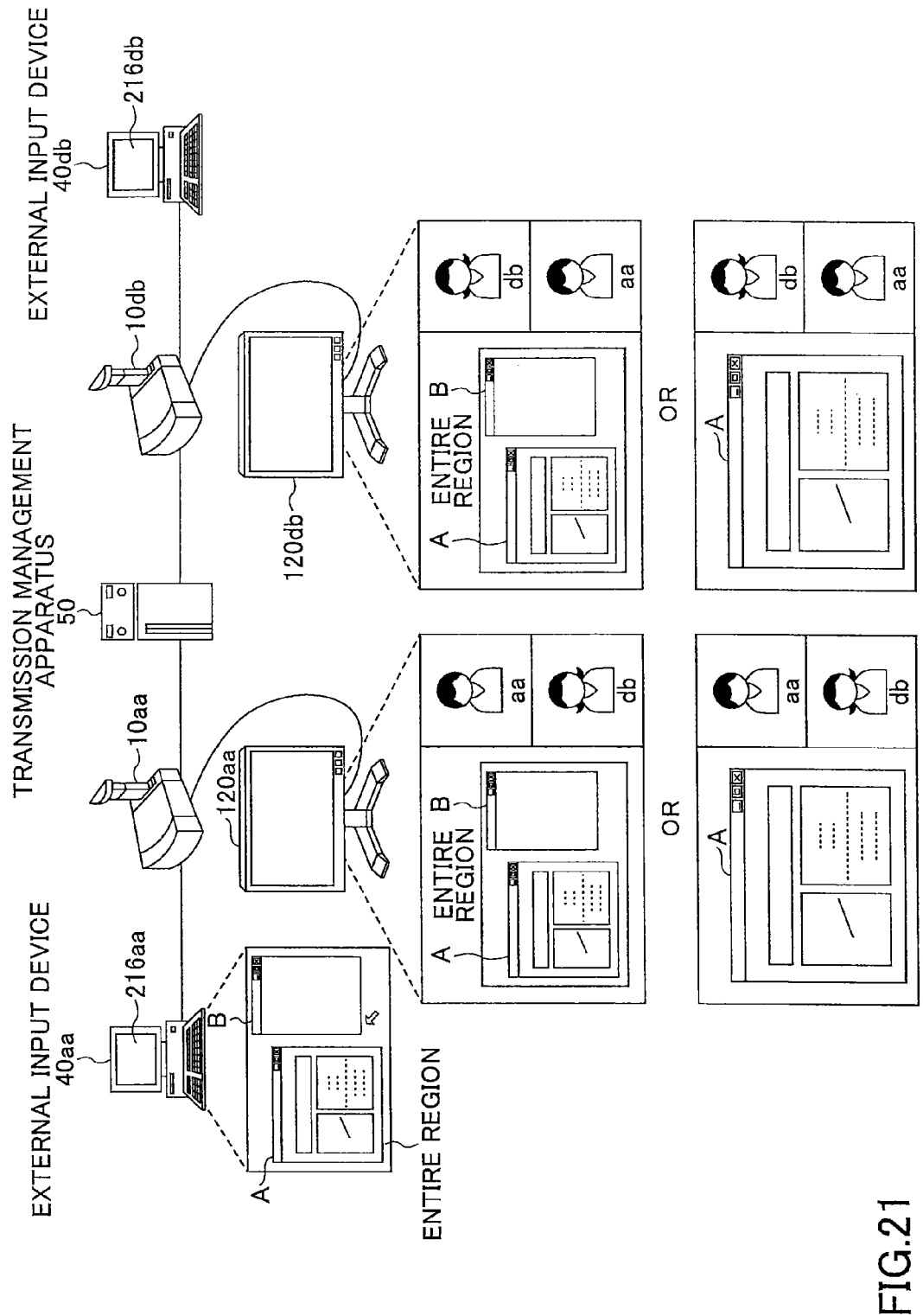
FIG. 21 is an explanatory diagram illustrating an example of screens displayed on display units of the external input devices in the transmission system according to the present embodiment.

Next, each process performed in the transmission system 1 according to the present embodiment will be explained with reference to FIGS. 16 to 21. FIG. 16 is a sequence diagram illustrating an example of the process of managing the status information, sent from the relay apparatus 30 to the transmission management apparatus 50, which indicates the operational status of the relay apparatus 30. FIG. 17 is a sequence diagram illustrating an example of the process in the preliminary stage for starting the communication between the transmission terminals 10. FIG. 18 is a sequence diagram illustrating an example of the process of establishing a session by the transmission terminal 10. FIG. 19 is a sequence diagram illustrating an example of the process of displaying the display data, displayed on the external input device, on the transmission terminal 10 of the other party in the conference. FIG. 20 is a diagram illustrating an example of display data displayed on the display unit 120. FIG. 21 is an explanatory diagram illustrating an example of screens displayed on the display units 216aa and 216db of the external input device 40aa and 40db, and on the display units 120aa and 120db of the terminal devices 10aa and 10db in the transmission system 1.

With reference to FIG. 16, the process of managing the status information indicating the operational status of the relay apparatus 30, transmitted from the relay apparatus 30 to the transmission management apparatus 50, will be described. In each of the relay apparatuses 30 (30a to 30d), the status detection unit 32 (see FIG. 4) periodically detects the operational status of the relay apparatus 30, to which the status detection unit 32 belongs (step S1-1 to S1-4). The transmission/reception unit 31 of each of the relay apparatuses 30 periodically transmits the status information to the transmission management apparatus 50 via the communication network 2, so that the transmission management apparatus 50 manages in real time the operational status of the relay apparatuses 30 (step S2-1 to S2-4). The status information includes the relay apparatus ID of the relay apparatus 30 and the operational status detected by the status detection unit 32 of the relay apparatus 30 corresponding to the relay apparatus ID. In the present embodiment, the relay apparatuses 30a, 30b and 30d normal operational states indicate "online", whereas the operational state of the relay apparatus 30c indicates "offline", whereas the relay apparatus 30c operates but has a problem in the program for executing the relaying operation of the relay apparatus 30c.

Next, in the transmission management apparatus 50, the transmission/reception unit 51 receives the status information transmitted from each of the relay apparatuses 30a to 30d, and manages the status information by storing the status information for each of the relay apparatus IDs in the relay apparatus management DB 5001 in the storage unit (the relay apparatus management table in FIG. 7) via the storage/readout process unit 59 (step S3-1 to S3-4). Accordingly, for the operational statuses of the relay apparatuses 30, as shown in the relay apparatus management table (see FIG. 7), the statuses "online" or "offline", are stored and managed for the respective relay apparatus IDs. Moreover, the reception time when the transmission management apparatus 50 receives the status information is also stored and managed for each relay apparatus ID. In the case that status information is not sent from the relay apparatus 30, in the relay apparatus management table, shown in FIG. 7, a field of the operational status and a field of the reception time in each record will be blank, or indicate the operational status and the reception time of the status information, received previously.

Next, with reference to FIG. 17, the processes in the preliminary stage before starting the communication between the transmission terminal 10aa and the transmission terminal 10db will be described in the following. At first, when the user turns on the power switch 109, shown in FIG. 2, the operation input reception unit 12, show in FIG. 4, receives the user's operation, and the power is turned ON (step S21). Next, the login request unit 13, when receiving the operation for turning on the power, automatically sends login request information, indicating a login required, to the transmission management apparatus 50 from the transmission/reception unit 11 via the communication network 2 (step S22). The login request information includes the terminal ID for identifying the terminal 10aa as the request source terminal and the password. The terminal ID and the password have been read out from the storage unit 1000 via the storage/readout process unit 17 and have been transmitted to the transmission/reception unit 11. Moreover, when the login request information is sent from the transmission terminal 10aa to the transmission management apparatus 50, the transmission management apparatus 50 on the reception side can recognize the IP address of the transmission terminal 10aa on the transmission side.

Next, the terminal authentication unit 52 of the transmission management apparatus 50 (see FIG. 4) searches the terminal authentication management DB 5002 (the terminal authentication management table in FIG. 8) with the terminal ID and the password as a search key included in the login request information received via the transmission/reception unit 51, and performs terminal authentication by determining whether the same terminal ID and the password are managed in the terminal authentication management DB 5002 (step S23). When the terminal authentication unit 52 determines that the login request information is from the terminal 10, which has authorization for use, since the terminal authentication unit 52 manages the same terminal ID and the same password, the status management unit 53 stores in the terminal management DB 5003 (the terminal management table in FIG. 9) the terminal ID, an operational status, a reception time when the login request information is received, and the IP address of the terminal 10aa, which are associated with each other (Step S24). Accordingly, the terminal management table (see FIG. 9), stores the operational status "online", the reception time "2009.11.10.13:40", and the IP address of the terminal 10aa "1.2.1.3", associated with the terminal ID "01aa".

Next, the transmission/reception unit 51 of the transmission management apparatus 50 sends authentication result information, indicating a result of the authentication obtained by the terminal authentication unit 52, via the communication network 2, to the request source terminal 10aa, which has required the login (step S25). Further, a process when the terminal authentication unit 52 determines the request terminal has authorization for use will be explained as follows in the present embodiment.

The terminal extraction unit 54 of the transmission management apparatus 50 searches the destination list management table (see FIG. 10) with the terminal ID "01aa" of the request source terminal 10aa, which has required the login, as a search key, and extracts the terminal ID of a candidate of a destination terminal 10, which can communicate with the request source terminal 10aa, by reading out from the destination list management table (step S26). In the present embodiment, the terminal ID "01ab", "01ba" and "01db" of the destination terminals 10ab, 10ba and 10db corresponding to the terminal ID "01aa" of the request source terminal 10aa, are extracted.

Next, the terminal status acquisition unit 55 searches the terminal management table (see FIG. 9) with the terminal IDs of the candidates of the destination terminal 10 as a search key extracted by the terminal extraction unit 54 ("01ab", "01ba", "01db"), and acquires, by reading out an operational status ("offline", "online", "online") for each terminal ID, extracted by the terminal extraction unit 54, the operational status of each of the destination terminals 10ab, 10ba or 10db (step S27).

Next, the transmission/reception unit 51 sends destination status information including the terminal IDs used as the search key at step S27 ("01ab", "01ba" and "01db") and the operational statuses ("offline", "online" and "online") of the transmission terminals (10ab, 10ba, and 10db) corresponding to the terminal IDs, to the request source terminal 10aa via the communication network 2 (step S28). Accordingly, the request source terminal 10aa can recognize the operational status ("offline", "online", and "online") at present of each of terminals (10ab, 10ba and 10db) as the candidates of the destination terminal 10, which can communicate with the request source terminal 10aa.

Furthermore, the terminal extraction unit 54 of the transmission management apparatus 50 searches the destination list management table (see FIG. 10) with reference to the terminal ID "01aa" of the request source terminal 10aa, which has required the login, as a search key, and extracts terminal IDs of other request source terminals 10, which are registered candidates of a destination terminal 10 which includes the above request source terminal 10aa with the terminal ID "01aa" (step S29). In the destination list management table, shown in FIG. 10, the terminal IDs of the other request source terminals 10 extracted as above, are "01ab", "01ba" and "01db".

Next, the terminal status acquisition unit 56 of the transmission management apparatus 50, searches the terminal management table (see FIG. 9) with the terminal ID "01aa" of the request source terminal 10aa, which required the login, as a search key, and acquires the operational status of the request source terminal 10aa (step S30).

Next, the transmission/reception unit 51 sends, to the transmission terminals (10ba and 10db) with the operational status of "online", in the terminal management table (see FIG. 9), out of the transmission terminals (10ab, 10ba and 10db)

corresponding to the terminal IDs ("01ab", "01ba" and "01db"), extracted at step S29, destination status information including the terminal ID "01aa" of the request source terminal 10aa acquired at step S30 and the operational status of "online" (steps S31-1 and S31-2). When the transmission/reception unit 51 sends the destination status information to the transmission terminals 10ba and 10db, based on the terminal IDs ("01ba" and "01db"), the transmission/reception unit 51 refers to the IP addresses of the transmission terminals managed in the terminal management table (see FIG. 9). Accordingly, the transmission/reception unit 51 can transfer, to each of the other destination terminals 10ba and 10db, which can communicate with the request source terminal 10aa having required the login, as a destination, the terminal ID "01aa" of the request source terminal 10aa, which required the login, and the operational status of "online".

On the other hand, in the other transmission terminals 10, when the user turns on the power switch 109, as shown in FIG. 2 (step S21, as above), the operation input reception unit 12 (see FIG. 4) receives the operation for the power to be ON. Since the same processes as in steps S22 to S31-1 and S31-2 are performed, an explanation is omitted.

Next, with reference to FIG. 18, the process of establishing the session by the transmission terminal will be explained in the following. In the present embodiment, the request source terminal 10aa can communicate with at least one of the transmission terminals 10ba and 10db with the operational status of "online", out of the terminals 10 as the candidates of the destination terminal, according to the destination status information received at step S28 above. Accordingly, in the following description, processes in the case where a user of the request source terminal 10aa selects to start communicating with the destination terminal 10db will be explained.

At first, the user selects the terminal 10db by depressing the operation button 108 (see FIG. 2) to select the terminal 10db, then the operation input reception unit 12 (see FIG. 4) receives the selection to assign the transmission terminal 10db to the destination (step S41). Next, the transmission/reception unit 11 of the transmission terminal 10aa sends start request information, including the terminal ID "01aa" of the request source terminal 10aa and the terminal ID "01db" of the destination terminal 10db, and indicates that starting the communication is required, to the transmission management apparatus 50 (step S42). According to the above processes, the transmission/reception unit 51 of the transmission management apparatus 50 receives the start request information and can recognize the IP address "1.2.1.3" of the request source terminal 10aa as the transmission source. The status management unit 53, based on the terminal ID "01aa" of the request source terminal 10aa and the terminal ID "01db" of the destination terminal 10db, included in the start request information, in the terminal management table (see FIG. 9) of the terminal management DB 5003, changes both of the fields of the operational status in the records, each including the terminal ID "01aa" or the terminal ID "01db", to "busy" (step S43). In this stage, although both the request source terminal 10aa and the destination terminal 10db have not yet started communicating with each other, both terminals 10 have transitioned to a busy state. When an other transmission terminal tries to communicate with the request source terminal 10aa or the destination terminal 10db, a sound or a display indicating a busy state is output.

The transmission management apparatus 50 generates a session ID for selection used for executing the session for selecting the relay device (step S44). The session management unit 57 stores the session ID for selection "se1", generated at step S44, the terminal ID "01aa" of the request source terminal 10aa, and the terminal ID "01db" of the destination terminal 10db, which are associated with each other, into the session management table (see FIG. 11) of the storage unit 5000, and manages them (step S45).

After that, the transmission management apparatus 50 refines the selection for the relay apparatus 30, which relays communication between the request source terminal 10aa and the destination terminal 10db, based on the relay apparatus management DB 5001 and the terminal management DB 5003. However, further explanation in detail will be omitted.

Next, the session management unit 57 of the transmission management apparatus 50, in the session management table (see FIG. 11) of the session management DB 5005, stores the relay apparatus ID "111a" of the relay apparatus 30a, selected above as the final one, in the field of the relay apparatus ID in the record including the session ID for selection "se1", and manages it (step S67-1). The transmission/reception unit 51 sends the relay apparatus ID "111a" and the IP address of the destination terminal 10db to the request source terminal 10aa (step S67-21). The transmission/reception unit 51 of the transmission management apparatus 50 sends the relay start request information, indicating that commencement of relaying is required, to the relay apparatus 30a via the communication network 2 (not shown). The relay start request information includes the IP addresses of the request source terminal 10aa and the destination terminal 10db, which are relayed as "1.2.1.3" and "1.3.2.4". According to the above processes, the relay apparatus 30 establishes a session to send/receive three kinds of image data of the low image quality, intermediate image quality and a high image quality, and voice data between the transmission terminals 10aa and 10db (step S69). Accordingly, each of the transmission terminals 10aa and 10db can start a video conference. The number of kinds of image quality is not limited to three as in the present embodiment. The number of the kinds of image quality may be greater than three or may be less than three.

Each transmission terminal 10 according to the present embodiment sends/receives image data by using a standard for video encoding, such as H.264 (H.264/AVC. MPEG-4 part 10, MPEG4 AVC), H.264/SVC, which is the extended standard thereof, or MPEG-2.

Next, with reference to FIG. 18, the process of sending display data representing an image, displayed on the display unit 216 of the external input device 40, to the other transmission terminal 10, and displaying the display data on the display 120 of the other transmission terminal 10, after the relay apparatus is determined, will be explained as follows. In the present embodiment, the process in the case where information displayed on the external input device 40aa connected to the transmission terminal 10aa is displayed on the transmission terminal 10db, which is the destination terminal, will be explained as an example.

When the relay apparatus 30 is determined as above, the transmission/reception unit 11 of the transmission terminal 10aa receives the relay apparatus IP "111a" and the IP address "1.3.2.4" of the destination terminal 10db, which the transmission management apparatus 50 sends at step S67-21. The storage/readout process unit 19 stores the received relay apparatus ID "111a" and the IP address "1.3.2.4" into the storage unit 1000 (step S67-22).

Moreover, when the external input device 40aa is connected to the transmission terminal 10aa, the connection detection unit 42 (see FIG. 13) of the external input device 40aa detects the connection (step S70). At the time of starting up the external input device 40aa, the display control unit 47 displays a screen including at least the whole region. When the connection detection unit 42 detects the connection of the external input device 40*aa* to the transmission terminal 10*aa*, the installation determination unit 43*a* determines whether the external input device is equipped with the display data acquisition unit 451, the display data transmission unit 452 and the resolution conversion unit 453 (step S71). Specifically, the installation determination unit 43*a* determines whether the display data acquisition program 1451 (see FIG. 4), the display data transmission program 1452 and the resolution conversion program 1453 are installed in the external input device 40*aa*. If each of the programs is installed, the installation determination unit 43*a* determines that the external input device 40*aa* is equipped with the functional element corresponding to the program.

On the other hand, when the installation determination unit 43*a* determines that the external input device is not equipped with any of the display data acquisition unit 451, the display data transmission unit 452 or the resolution conversion unit 453, the mount unit 48 mounts the storage unit 1000 of the transmission terminal 10*aa* (step S72). Next, the program acquisition unit 43*b* acquires the program, corresponding to the functional element, which the external input device 40*aa* is not equipped with, from the display data acquisition program 1451, the display data transmission program 1452 and the resolution conversion program 1453, stored in the storage unit 1000 of the transmission terminal 10, and installs the acquired program in the external input device 40*aa* (step S73). According to the above process, the external input device 40*aa* is equipped with the display data acquisition unit 451, the display data transmission unit 452 and the resolution conversion unit 453. The display data acquisition program 1451, the display data transmission program 1452 and the resolution conversion program 1453 may be installed in the external input device 40*aa* in advance.

After the process at step S73, the transmission/reception unit 41 sends information requiring a permission to execute each of the above programs, i.e. a permission to activate the display data acquisition unit 451, the display data transmission unit 452 and the resolution conversion unit 453, to the transmission terminal 10*aa* (step S74). When the transmission/reception unit 41 receives information indicating the permission in response to the requirement from the transmission terminal 10*aa*, the display data acquisition unit 451 acquires display data representing the image displayed on the display unit 216 (step S75). Next, the resolution conversion unit 453 converts the resolution of the display data acquired by the display data acquisition unit 451. Furthermore, the display data transmission unit 452 sends the display data, the resolution of which is converted, to the external information transmission/reception unit 18 of the transmission terminal 10*aa* (step S76). The process of converting the resolution of the display data by the resolution conversion unit 453 will be explained later in detail. The process of converting the resolution by the resolution conversion unit 453 is different from the process, which is performed based on the operational status of the above relay apparatus 30 or the transmission rate of the communication between the transmission terminal 10 and the relay apparatus. The resolution to be converted is not determined according to the operational status of the relay apparatus 30 or to the transmission rate between the relay apparatus 30 and the transmission terminal 10.

When the external information transmission/reception unit 18 of the transmission terminal 10*aa*, as the transmission source, receives the display data from the external input device 40*aa*, the storage/readout process unit 19 reads out the relay apparatus ID "111a" and the IP address "1.3.2.4" of the transmission terminal 10*db*, as the destination, stored in the storage unit 1000 (step S77). The transmission/reception unit 11 sends, to the relay apparatus 30 specified by the relay apparatus ID "111a" read out at step S77, the display data, the resolution of which is converted, and the IP address "1.3.2.4" of the transmission terminal, as the destination (step S78). When the relay apparatus 30 receives the display data transmitted from the transmission terminal 10*aa* at step S78, the relay apparatus 30 changes the image quality of the display data based on the IP address "1.3.2.4" of the transmission terminal 10*db*, as the destination (step S79), and sends the display data to the transmission terminal 10*db* (step S80). When the transmission/reception unit 11 of the transmission terminal 10*db* receives the display data sent from the relay apparatus 30, the image display control unit 14*b* displays an image represented by the received display data on the display unit 120 (step S81). FIG. 20 is a diagram illustrating an example of a screen image displayed on the display unit. In the left-hand area of the screen, the display data displayed on the external input device 10*aa* is displayed. In the upper right area of the screen, image data imaged by the image unit 14*a* of the transmission terminal 10*aa* and sent from the transmission/reception unit 11 are displayed. Moreover, in the lower right area of the screen, image data imaged by the image unit 14*a* of the transmission terminal 10*db* are displayed.

FIG. 21 is an explanatory diagram illustrating an example of screens displayed on the display units of the external input devices 40*aa* and 40*db*, and the display devices 120*aa* and 120*db* connected to the transmission terminals 10*aa* and 10*db* respectively, in the whole configuration of the transmission system 1. On the display unit of the external input device 40*aa*, a screen, which the user shares with the transmission terminal 10*db*, is displayed. The screens displayed on the external input devices 40*aa* and 40*db* are denoted as "desktop screens". In the whole region of the desktop screen (in the following, denoted "whole region") plural regions can be displayed. In FIG. 21, as an example, a region "A" and a region "B" are displayed in the whole region of the screen of the external input device 40*aa*.

According to the process illustrated in FIG. 19, the transmission terminal 10*aa* displays image data and display data on the display device 120*aa*, and the transmission terminal 10*db* displays image data and display data on the display device 120*db*. In the following, the screens displayed on the display device are denoted as "display screens". In the display screens of the upper row in FIG. 21, the whole region is displayed as the display data, and a user "aa" of the transmission terminal 10*aa* and a user "db" of the transmission terminal 10*db* are displayed as the image data. In the display screens of the lower row in FIG. 21, the region "A" is displayed as the display data, and the user "aa" of the transmission terminal 10*aa* and the user "db" of the transmission terminal 10*db* are displayed as the image data.

Moreover, in the display device 216*db* of the external input device 40*db*, the whole region or a specific region, which the user "db" displays, remains displayed. The screen on the display device 216*db* is not affected by the operation of the user "aa".

In the present embodiment, the user can select at least one of the whole region, the region "A" or the region "B", and display them on the display screen.

[First Example]

In the first example, a transmission system 1, in which the user can select at least one of the whole region or arbitrary regions and display them on the display screen only by operating a pointing device, such as a mouse 212, will be explained. Moreover, in the first example, the transmission system 1, which obviates the problem that, in the narrow bandwidth mode when the bandwidth of the communication network is narrow, characters which are hard to make out by the user, will be described. The pointing device, in the present Example, is mainly a mouse 212. In the case where the display device 216 is equipped with a touch panel, the pointing device is a function of detecting a position of a fingertip of the user.

Figure 22A:
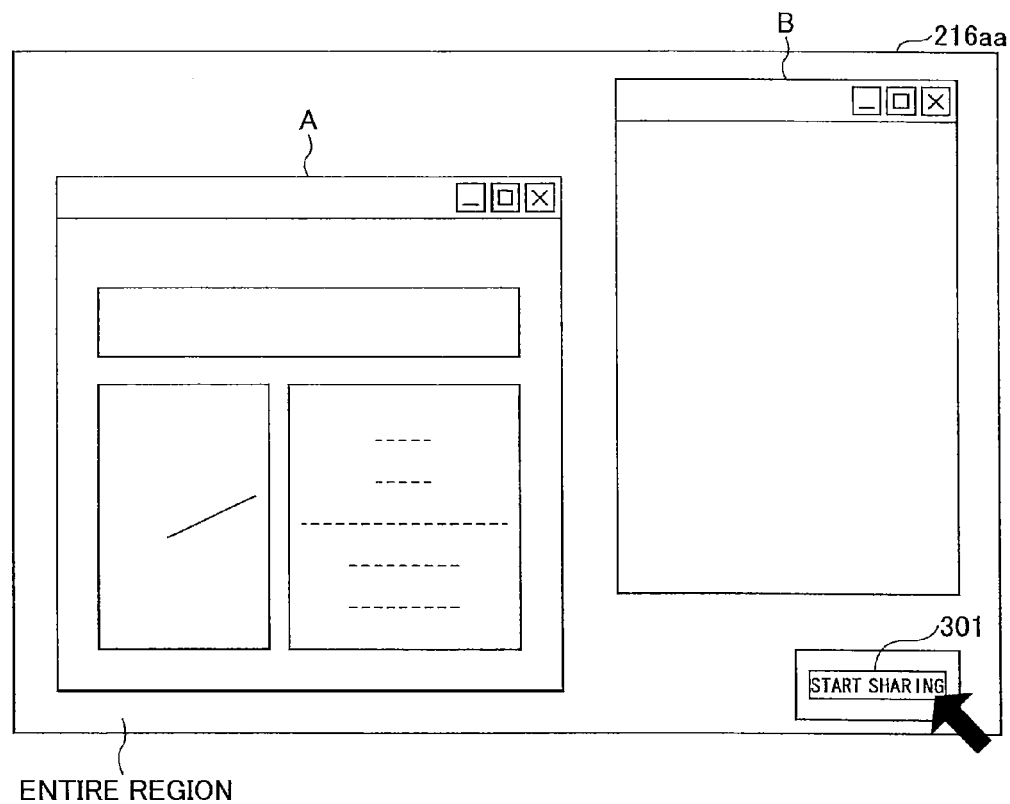
FIGS. 22A to 22C are diagrams illustrating an example of a desktop screen displayed on the external input device according to the present embodiment.

FIG. 22A illustrates an example of a desktop screen displayed on the external input device 40aa. In the external input device 40aa, the program for an external input device is installed. For example, on the bottom-right corner of the desktop screen, a shared setting reception button 301 is displayed constantly or according to the user's predetermined operation. The predetermined operation is, for example, clicking or double-clicking an icon image on the screen representing the program for an external input device by the pointing device, hovering the mouse over an icon, or the like.

Figure 22B:
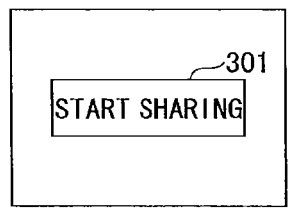
Figure 22C:
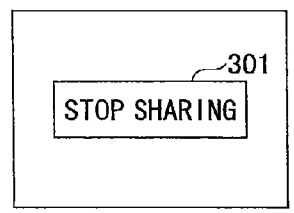

FIGS. 22B and 22C are enlarged views of examples of the shared setting reception button 301 according to the present Example. In FIG. 22B, a character string "start sharing" is displayed on the shared setting reception button 301. In FIG. 22C, a character string "stop sharing" is displayed on the shared setting reception button 301. When the user clicks the shared setting button 301 in FIG. 22B by the pointing device, sharing the display data displayed on the display unit 216aa of the external input device 40aa starts. Moreover, during the display data displayed on the display unit 216aa of the external input device 40aa are shared, the image of the shared setting reception button 301 in FIG. 22C is displayed. When the user clicks the shared setting button 301 in FIG. 22C by the pointing device, sharing of the display data displayed on the display unit 216aa of the external input device 40aa with the transmission terminal 10db stops, i.e. the display data ceases to be sent to the transmission terminal 10aa.

The operation input reception unit 46, which corresponds to an "acquisition region reception unit" recited in claims as shown in FIG. 13, receives the user's operation for the shared setting reception button 301. The display data acquisition unit 451, when the user clicks the shared setting reception button 301, on which the character string "start sharing" is displayed, acquires a region selected by the user as the display data.

In the transmission system 1 according to the present embodiment, the display data of the whole region or a specific region displayed on the external input device 40 at the time when the shared setting reception button 301 with "start sharing" is clicked is shared. Accordingly, in the case where the user "db" clicks the shared setting reception button 301 on which the character string "start sharing", in FIG. 22B, is displayed, sharing of the display data on the display unit 216aa stops automatically, without clicking the shared setting reception button 301 with "stop sharing" by the user "aa", shown in FIG. 22C.

[Procedure of Operations]

Figure 23:
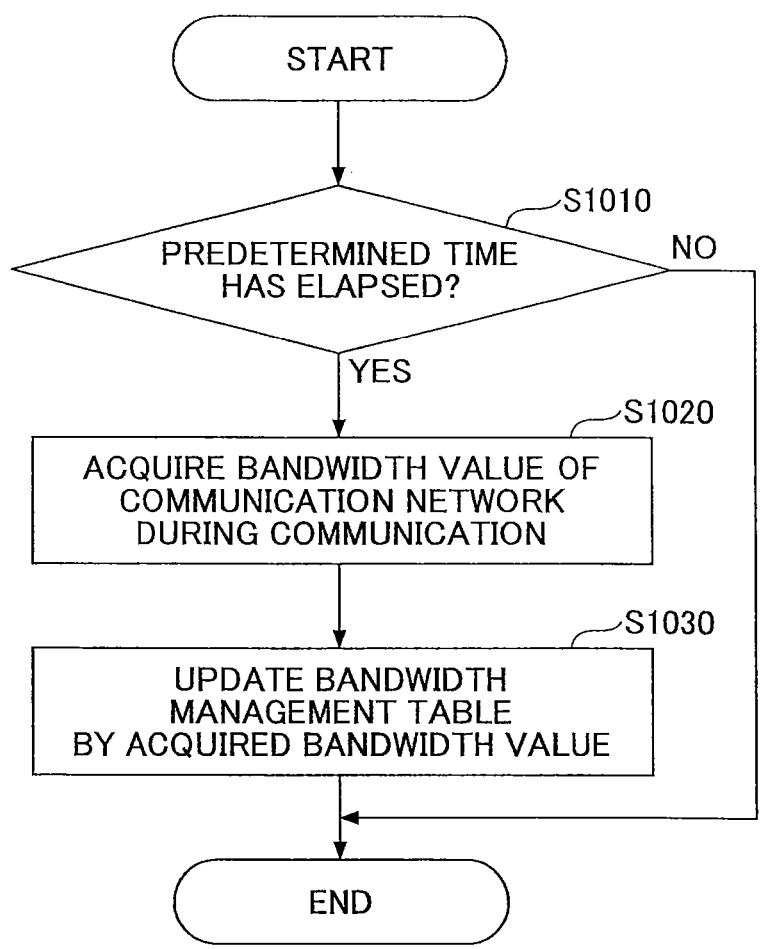
FIG. 23 is a flowchart illustrating an example of a procedure of updating the bandwidth management table by a bandwidth status monitoring unit according to the present embodiment.

FIG. 23 is a flowchart illustrating an example of a procedure of updating the bandwidth management table by the bandwidth status monitoring unit 22. The procedure illustrated in FIG. 23 is executed when the power switch 109 of the transmission terminal 10 is ON, or from when the user clicks the shared setting reception button 301 with "start sharing" to when the user clicks the shared setting reception button 301 with "stop sharing".

The bandwidth status monitoring unit 22 determines whether a predetermined time has elapsed (step S1010). The predetermined time is set to a value from a few seconds to a few minutes in advance. Moreover, the user may set an arbitrary predetermined time at the transmission terminal 10.

Furthermore, instead of setting the predetermined time in advance, a maximum time interval may be set, and the process illustrated in FIG. 23 may be performed when a processing load on the transmission terminal 10 is small.

After the predetermined time has passed (step S1010YES), the bandwidth status monitoring unit 22 acquires the bandwidth by measuring the bandwidth of the communication network during communication (step S1020). For the measurement of the bandwidth, for example, the sent data quantity per unit time of the display data actually sent to the other transmission terminal may be used. Moreover, the bandwidth may be measured by sending pseudo display data to the other transmission terminal in order to make a measurement. A bandwidth on received data may not be acquired. Generally, the transmission terminal 10 of the transmission source does not control a size of the display data to be transmitted based on the bandwidth of received data. However, the bandwidth of received data can be acquired in the same way. In the case where the bandwidth of received data are acquired, for example, the acquired receiving bandwidth may be sent to the transmission terminal 10 of the other party, and the size of the display data may be controlled by the transmission terminal 10 of the other party based on the baseband of the received data.

The bandwidth status monitoring unit 22 updates bandwidths in the baseband management table for the sending bandwidth acquired and the receiving bandwidth, respectively (step S1030).

Figure 24:
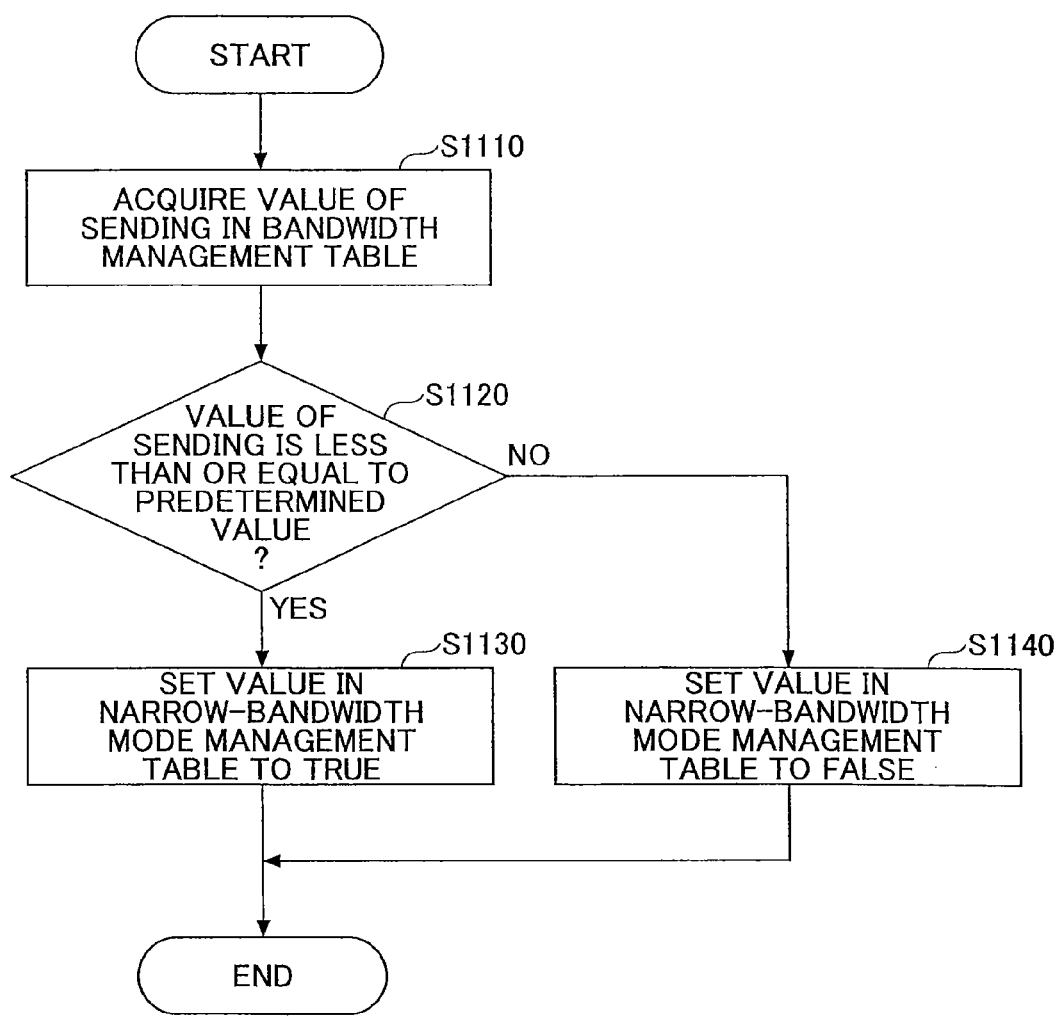
FIG. 24 is a flowchart illustrating an example of a procedure of updating a setting in the narrow-bandwidth mode management table by the narrow-bandwidth status determination unit according to the present embodiment.

FIG. 24 is a flowchart illustrating an example of procedure of updating the settings in the narrow-bandwidth mode management table by the narrow-bandwidth status determination unit 23. The update of the bandwidth management table, as shown in FIG. 23, is preferably followed by this procedure. The narrow-bandwidth status determination unit 23 detects the update, for example, by acquiring a notice from the bandwidth status monitoring unit 22 that the bandwidth management table has been updated, or by monitoring the bandwidth management table.

The narrow-bandwidth status determination unit 23 reads out a "sent" bandwidth from the bandwidth management table (step S1110).

The narrow-bandwidth determination unit 23 determines whether the "sent" bandwidth is less than or equal to a predetermined value (threshold) (step S1120). The predetermined value has been set in advance based on the size of the display data in the whole region of the display unit 216.

When the "sent" bandwidth is less than the predetermined value (step S1120 YES), the bandwidth is narrow (narrow bandwidth), and the narrow bandwidth status determination unit 23 sets a value in the narrow bandwidth mode management table to "True" (step S1130).

When the "sent" bandwidth is not less than the predetermined value (step S1120 NO), the bandwidth is not narrow, and the narrow-bandwidth status determination unit 23 sets the value in the narrow bandwidth mode management table to "False" (step S1140). According to the above processes, the mode determination unit 454, can determine whether the present bandwidth is narrow or not, referring to the narrow bandwidth mode management table.

Figure 25:
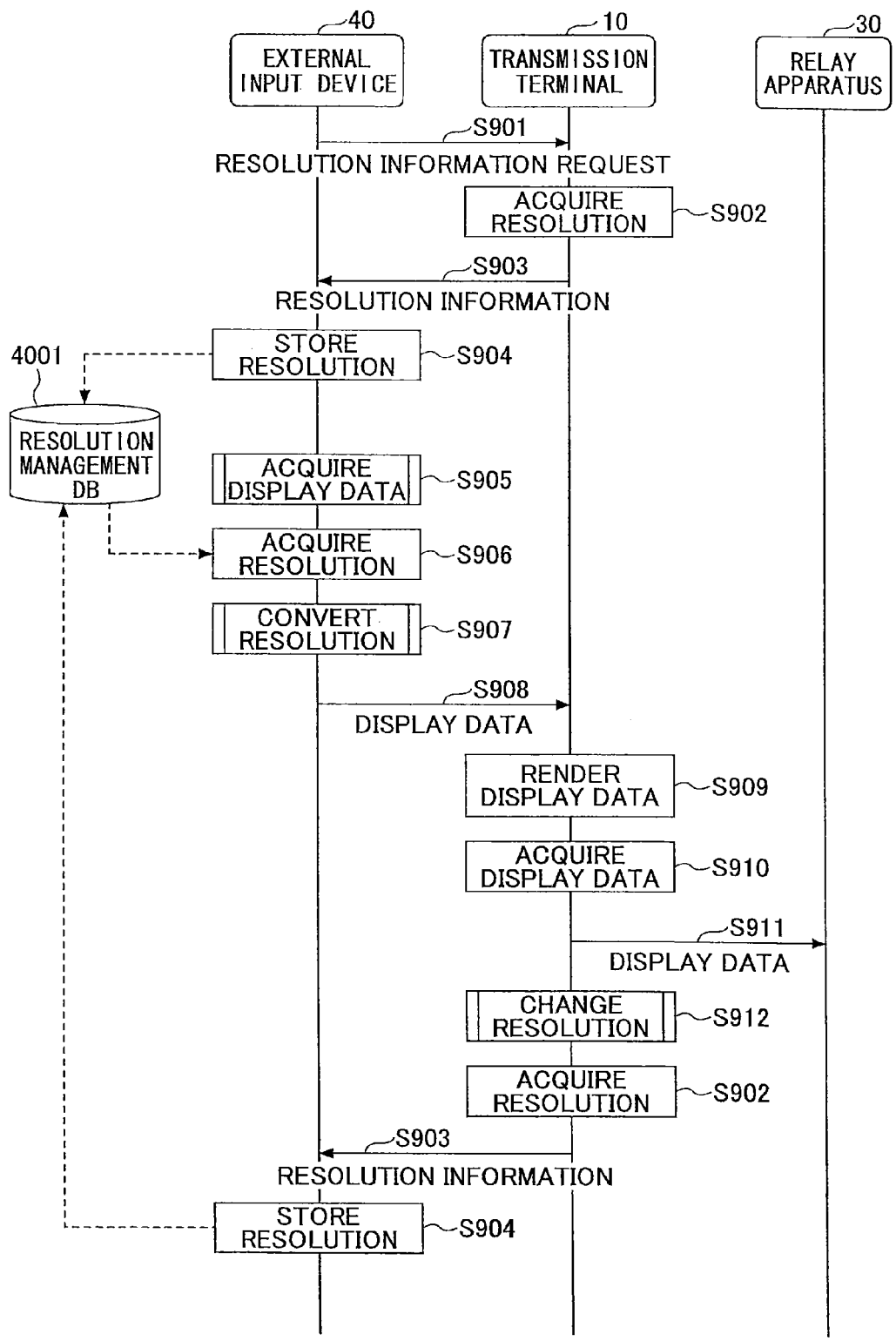
FIG. 25 is a sequence diagram illustrating an example of processes of changing the resolution by the transmission terminal and of converting the resolution by the external input device, using a non-compression format, according to the present embodiment.

FIG. 25 is a sequence diagram illustrating an example of processes of changing the resolution by the transmission terminal 10 and of converting the resolution by the external input device using a non-compression format.

Figure 26:
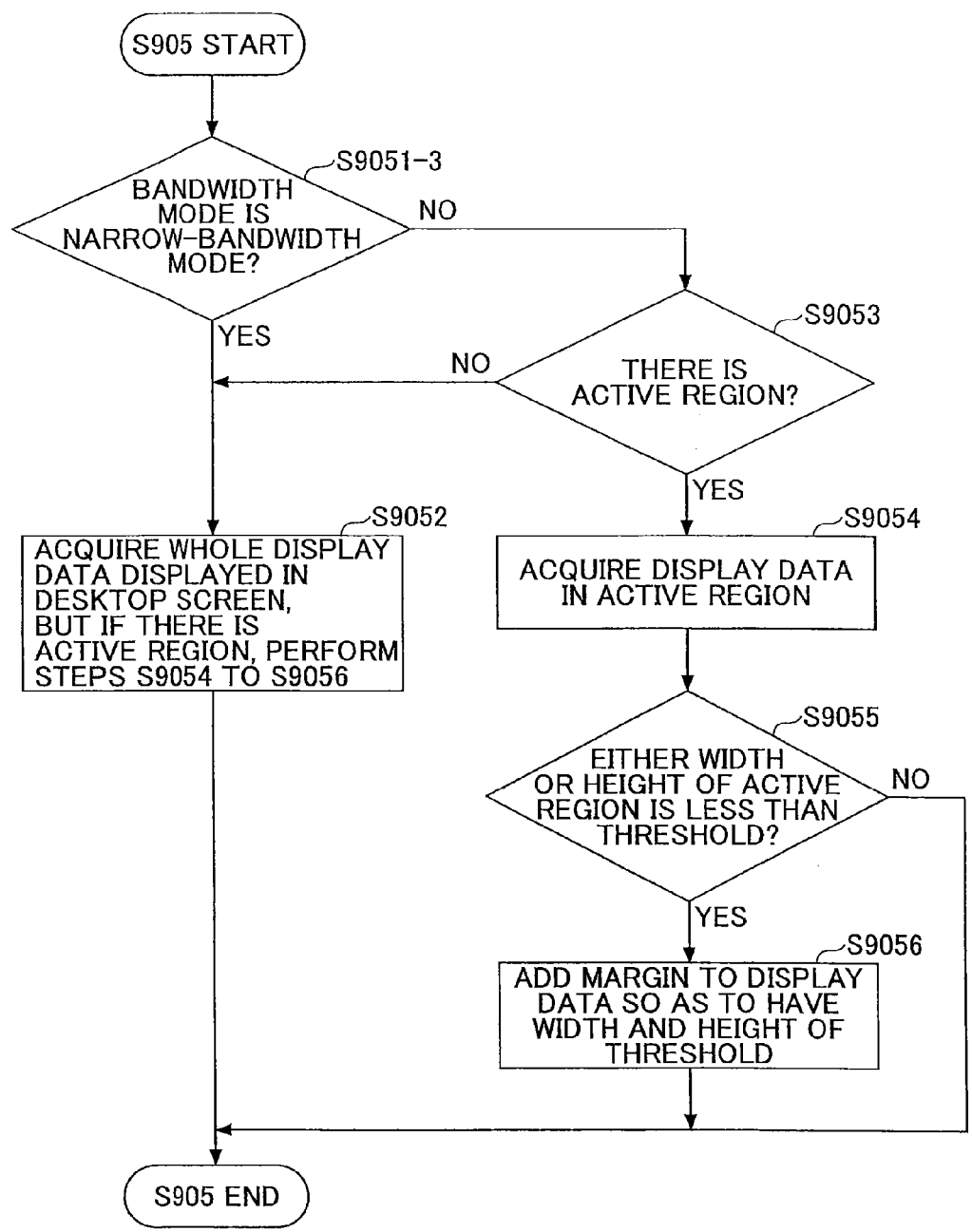
FIG. 26 is a flowchart illustrating an example of a procedure of acquiring displayed data in the whole region or a specific region by the display data acquisition unit according to the present embodiment.
Figure 27:
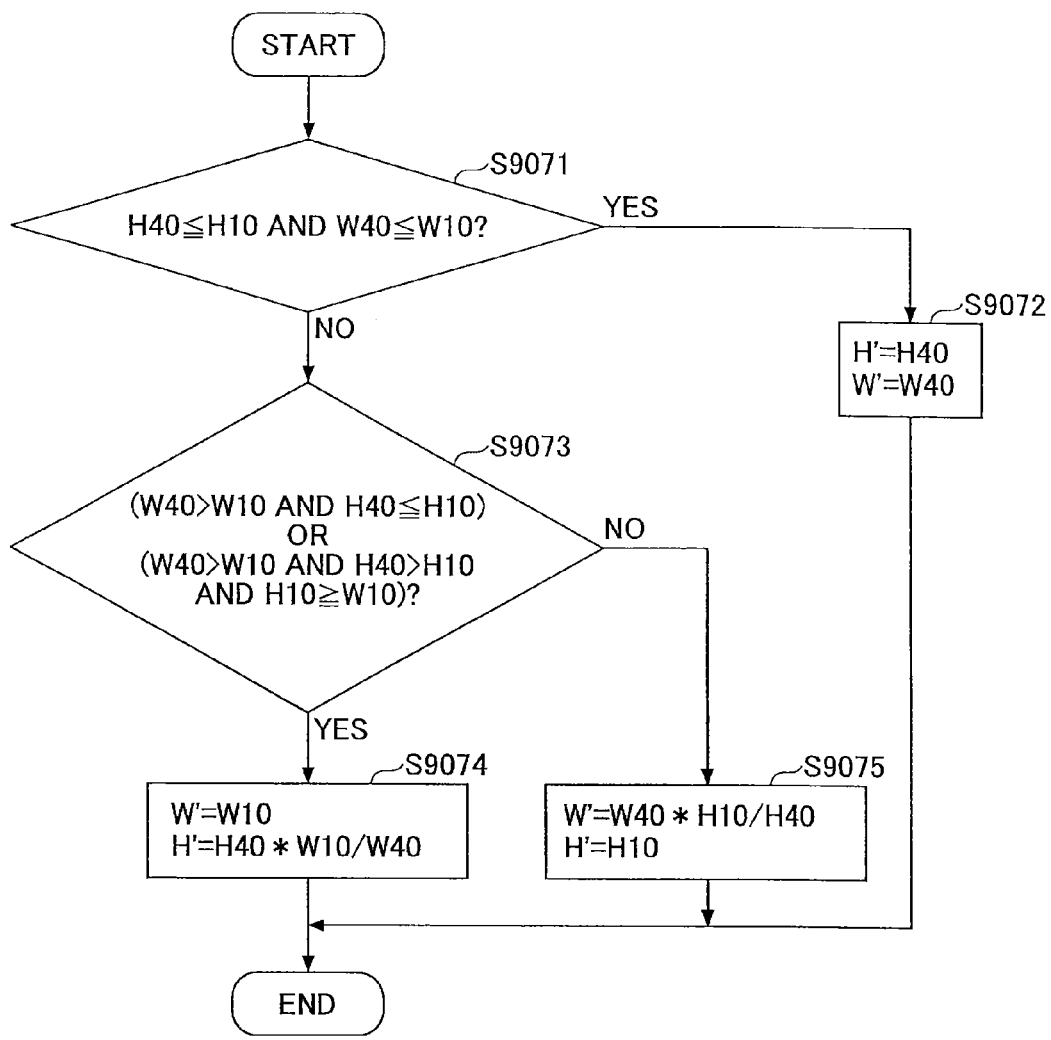
FIG. 27 is a flowchart illustrating an example of a procedure of converting the resolution of image data according to the present embodiment.
Figure 28:
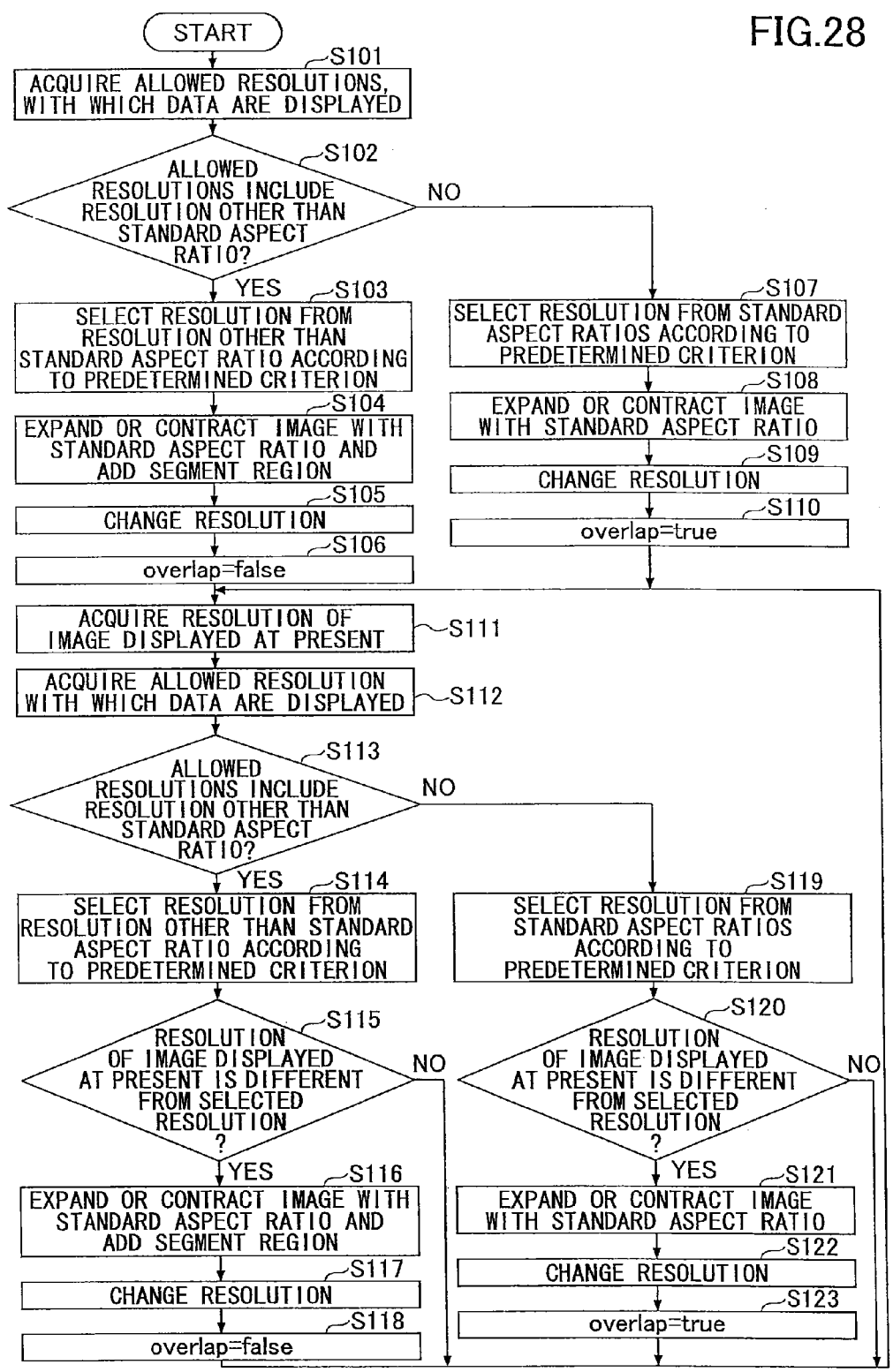
FIG. 28 is a flowchart illustrating an example of a procedure of controlling the resolution of image data, including changing the resolution, by the transmission terminal according to the present embodiment.
Figure 29A:
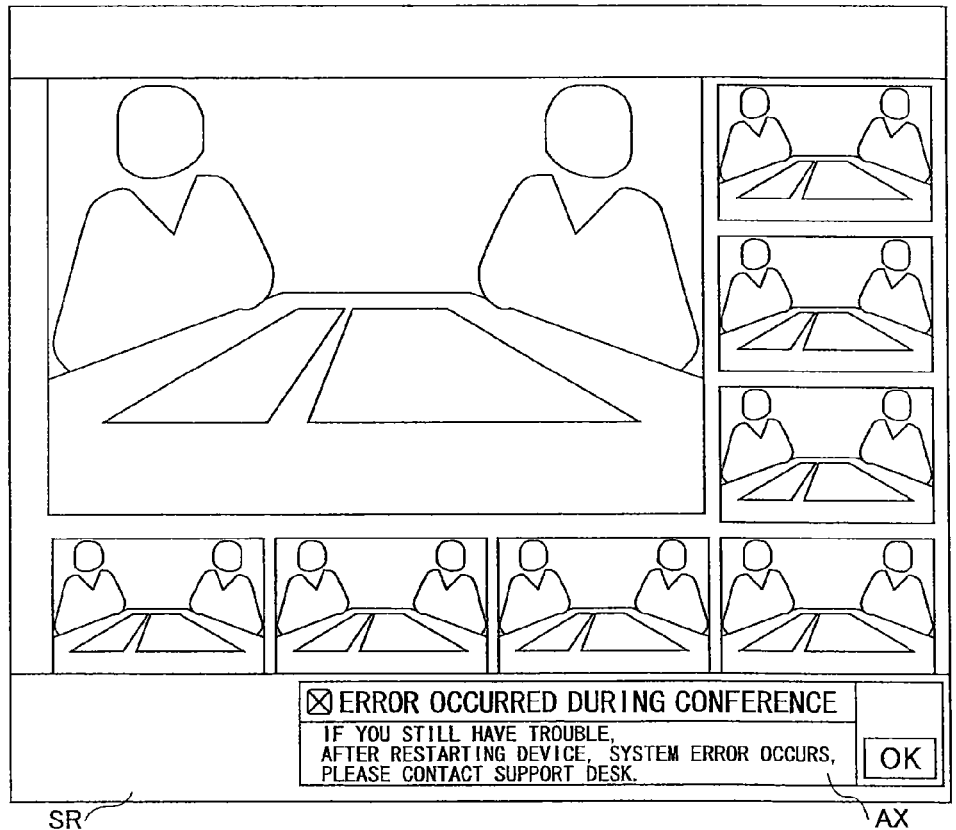
FIGS. 29A and 29B are diagrams illustrating an example of auxiliary information displayed in the screen, used in the supplemental explanation for a determination process at step S102 in FIG. 28 according to the present embodiment.
Figure 29B:
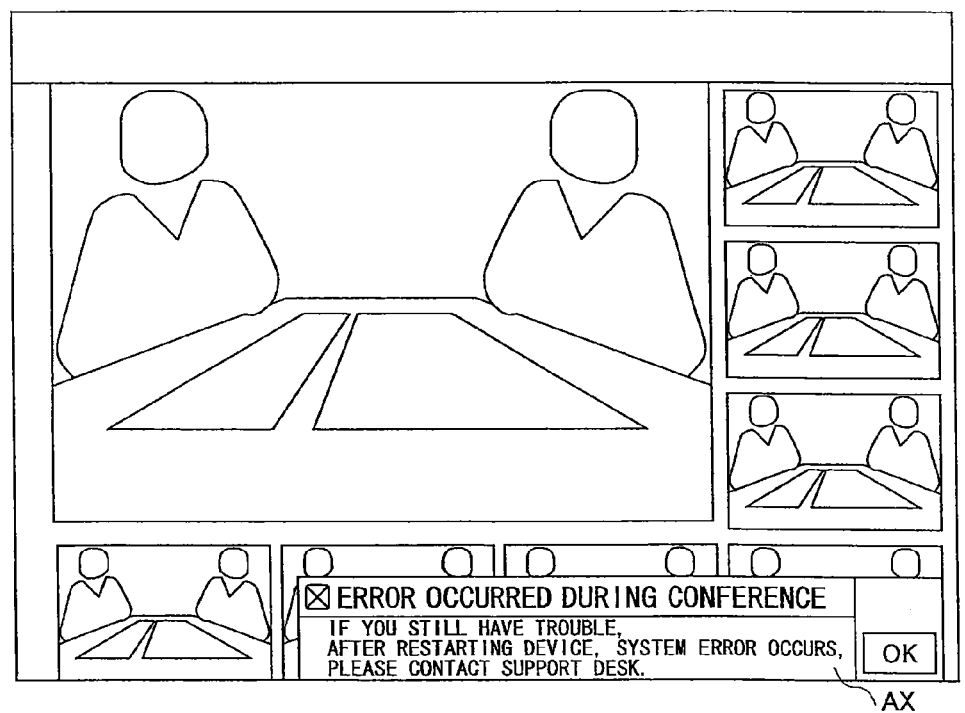

FIG. 26 is a flowchart illustrating an example of a procedure of acquiring displayed data in the whole region or a specific region by the display data acquisition unit 451. FIG. 27 is a flowchart illustrating an example of a procedure of converting the resolution. FIG. 28 is a flowchart illustrating an example of a procedure of controlling the resolution of image data, including changing the resolution, by the transmission terminal 10. FIGS. 29A and 29B are diagrams illustrating an example of auxiliary information displayed in the screen, used in the supplemental explanation for a determination process at step S102 in FIG. 28. FIG. 30 is a sequence chart illustrating another example of processes of changing the resolution by the transmission terminal and of converting the resolution by the external input device, using a compression format.

The process of converting the resolution of the display data to be transmitted from the external input device 40 to the transmission terminal 10 based on the resolution of the display device 120 of the transmission terminal 10 and the resolution of the display unit 216 of the external display device 40 will be explained with reference to the sequence chart, shown in FIG. 25. FIG. 25 illustrates an example of the process of sending the display data in a non-compression format.

In FIG. 25, the transmission/reception unit 41 of the external input device 40 sends a request for resolution information of the display device 120 to the transmission terminal 10 (step S901), and the resolution acquisition unit 21a acquires the resolution information indicating the resolution of the display device 120 of the transmission terminal 10, stored in the resolution storage unit 1005 (step S902). When the resolution acquisition unit 21a acquires the resolution information, the external information transmission/reception unit 18 sends the acquired resolution information to the external input device 40 (step S903). In the external input device 40, when the transmission/reception unit 41 receives the resolution information of the display device 120 of the transmission terminal 10, the storage/readout process unit 49 stores the received resolution information into the resolution management table of the resolution management DB 4001 (step S904).

In the present Example, at step S902 the resolution information of the display device 120 of the transmission terminal 10. The resolution information of the display device 120 is preferably the resolution determined according to the mode specified by the user. The mode is, for example, a current mode, a HIGH mode (640 by 360), a MID mode (320 by 180) or a LOW mode (192 by 108). When the user perceives a delay in a transfer of the display data, the user can accelerate the transfer of the display data by converting the resolution of the mode arbitrarily. That is, in the case of the narrow bandwidth, by sending display data of lower resolution, not the resolution of the display device 120, the delay in the transfer of the display data can be suppressed.

Next, the display data acquisition unit 451 of the external input device 40 acquires the display data representing the image displayed on the display unit 216 by the display control unit 47 (step S905).

The process of acquiring the display data by the display data acquisition unit 451 will be explained in detail with reference to FIG. 26. The user "aa" is assumed to have already clicked the shared setting reception unit 301, shown in FIG. 22B.

The mode determination unit 454 determines whether the setting of the narrow-bandwidth mode management table is TRUE or FALSE (step S9051-3).

When the setting of the narrow-bandwidth mode management table is FALSE (step S9051-3 NO), the display data acquisition unit 451 determines whether there is an active region (step S9053). In the present Example, the operating system (OS) operating in the external input device (corresponding to the management program in claims) treats not only this active region but also the whole region as one region, and by clicking outside the active region is an operation of selecting the whole region. That is, the whole desktop screen is treated as one whole region, and the desktop region and respective regions are treated as different program components.

According to the OS, the whole region and respective regions may be denoted "objects" (processing objects). A position, an attribute value and whether it is an object, and the like are managed. The region and the object correspond to program components in the claims.

For the determination at step S9053, for example, the function of the OS may be used. For example, in the case of using Windows (trademark registered) API, a handle of an active region is acquired, and if the value of the handle is not NULL, the API determines that an active region exists. The active region is a region, which is an object of input or operation by the user. The object is denoted "active window" in Windows (registered trademark) and in Mac OS or the like.

If the user closes the active window or if there is no active region (step S9053 NO), the process proceeds to step S9052, and the display data acquisition unit 451 acquires the whole desktop screen as a display data (step S9052). At step S9052, when there is an active region in order to correspond to a case in which it is not the narrow bandwidth mode, processes at steps at S9054 to S9056 are executed.

If there is an active window (step S9053 YES), the display data acquisition unit 451 acquires, out of the display data displayed on the display unit 216 by the display control unit, the display data in the active region (step S9054). Since this region is specified by the handle of the active region acquired at step S9053, the display data acquisition unit 451 can refer the display data in the region to be acquired.

Next, the display data acquisition unit 451 determines whether a width or a height of the acquired region is less than the threshold (S9055). In the present Example, the threshold for the width is 128 pixels and the threshold for the height is 36 pixels. The purpose of the above determination is to exclude small active regions from processed objects, since display data in a small region may not have meaningful content, and a process load of an enlargement process of a small region in the resolution conversion, which will be explained later, may incidentally increase. Moreover, even if the small region is enlarged by converting the resolution, since the enlargement factor may be too great, the user "db" may not be able to make out the content. By defining the lower limit of size of the region to be enlarged, a load by the CPU in rendering the display data by the transmission terminal 10aa can be reduced.

When either of the width or the height of the region is less than the threshold (step S9055 YES), the display data acquisition unit 451 adds black pixels to the region of the present display data until the region equals the size having the width and the height of the threshold, e.g. 128 pixels by 36 pixels (step S9056). The black pixels are inserted as follows. The region having the width and the height of the threshold is prepared. The present region is arranged so that the upper-left corner of the present region coincides with the upper-left corner of the region of the threshold. The black pixels are inserted in the region outside the present region but inside the threshold region. The present region may be arranged so that the upper right corner, the lower left corner or the lower right corner coincides with the upper right corner, the lower left corner or the lower right corner of the threshold region, respectively. The present region may be arranged so that the center of the present region coincides with the center of the threshold region. A color of the added pixel is not limited to black. Pixels of a color, other than black, may be inserted.

In the case where the setting of the narrow bandwidth mode management table is TRUE (step S9051-3 YES), the display data acquisition unit 451 acquires the whole desktop screen as display data (step S9052). That is, when the communication is not in the narrow bandwidth mode, the whole region or the active region selected by the user is acquired as the display data.

Accordingly, in the narrow bandwidth mode, the active region can be preferentially acquired as the display data, regardless of selecting the whole region by the user. When the communication is in the narrow bandwidth mode but there is no active region, since there is no application executed or there isn't an application to be preferentially displayed, the whole display screen (whole region) is acquired as display data. That is, even if details of the region are illegible, there is no inconvenience. Moreover, when the communication is not in the narrow bandwidth mode, if there is an active region, the active region can be acquired as the display region, and if there is no active region, the whole display screen (whole region) can be acquired as the display data.

The process returns to FIG. 25, and the resolution acquisition unit acquires resolution information of the display device 216 (step S906). The resolution conversion unit 453 converts the resolution of the display data to be transmitted to the transmission terminal 10 based on the resolution indicated by the resolution information of the display device 120 of the transmission terminal 10, which is stored in the resolution management DB 4001 and the resolution indicated by the resolution information of the display unit 216 of the external input device 40, which has been acquired at step S906 (step S907).

The process of "conversion of resolution", performed by the resolution conversion unit 453 at step S907 will be explained in detail with reference to FIG. 27, as follows. For the purpose of illustration, out of the resolution information of the display unit 216 of the external input device 40 acquired at step S906, the resolution in the vertical direction (height direction, H) is denoted "H40" and the resolution in the horizontal direction (width direction, W) is denoted "W40". Similarly, out of the resolution information of the display device 120 of the transmission terminal 10, stored in the resolution management DB 4001, the resolution in the vertical direction is denoted "H10" and the resolution in the horizontal direction is denoted "W10". The resolution conversion unit 453, based on these resolution H40, W40, H10 and W10, converts the resolution of the display data in the vertical direction to "H'" and the resolution of the display data in the horizontal direction to "W'".

With reference to FIG. 27, the resolution conversion unit 453 determines whether H40 is less than or equal to H10 and W40 is less than or equal to W10 (step S9071). When it is determined that H40 is less than or equal to H10 and W40 is less than or equal to W10 (step S9071 YES), the resolution conversion unit 453 converts the resolution of the display data in the vertical direction H' to H40, and the resolution of the display data in the horizontal direction W' to W40, and does not convert the resolutions (step S9072).

On the other hand, when it is determined that H40 is not less than or equal to H10 or W40 is not less than or equal to W10 (Step S9071 NO), the resolution conversion unit 453 determines whether W40 is larger than W10 and H40 is less than or equal to H10, or W40 is larger than W10, or H40 is larger than H10 and H10 is larger than or equal to W10 (step S9073).

When it is determined that W40 is larger than W10 and H40 is less than or equal to H10, or W40 is larger than W10 and H40 is larger than H10 and H10 is larger than or equal to W10 (step S9073 YES), the resolution conversion unit 453 converts the resolution of the display data in the horizontal direction W' to W10, and converts the resolution of the display data in the vertical direction H' to H40*(W10/W40) (step S9074). In the above conversion, the ratio W10/W40 represents a compression ratio in the width (W) direction.

On the other hand, when it is not determined that W40 is larger than W10 and H40 is less than or equal to H10, or W40 is larger than W10 and H40 is larger than H10 and H10 is larger than or equal to W10 (step S9073 NO), the resolution conversion unit 453 converts the resolution of the display data in the vertical direction H' to H10, and converts the resolution of the display data in the horizontal direction W' to W40* (H10/H40) (step S9075). In the above conversion, the ratio H10/H40 represents a compression ratio in the height (H) direction.

In the case where it is not determined that W40 is larger than W10 or H40 is larger than H10 and H10 is larger than or equal to W10 at step S9073, for example, the resolution of the display unit 216 of the external input device 40 in the vertical direction is larger than the resolution of the display device 120 of the transmission terminal 10 in the vertical direction and the resolution of the display unit 216 of the external input device 40 in the horizontal direction is less than or equal to the resolution of the display device 120 of the transmission terminal 10 in the horizontal direction, i.e. H40 is larger than H10 and W40 is less than or equal to W10. Or the resolutions of the display unit 216 of the external input device 40 in the horizontal direction and in the vertical direction are larger than the resolutions of the display device 120 of the transmission terminal 10 in the horizontal direction and in the vertical direction, respectively, and the resolution of the display device 120 of the transmission terminal 10 in the vertical direction is less than the resolution thereof in the horizontal direction, i.e. W40 is larger than W10, H40 is larger than H10 and H10 is less than W10.

That is, at step S907, when the resolution of the display unit 216 of the external input device 40 in the vertical direction is less than the resolution of the display device 120 of the transmission terminal 10 in the vertical direction, the resolution conversion unit 453 converts the resolution of the display data in the vertical direction H' to the resolution of the display device 120 of the transmission terminal 10 in the vertical direction H10. Moreover, the resolution conversion unit 453 converts the resolution of the display data in the horizontal direction so that the horizontal to vertical ratio of the display data is the same as the horizontal to vertical ratio of the display 120 of the transmission terminal 10, i.e. W' is set to W40*(H10/H40).

Moreover, when the resolution of the display device 120 of the transmission terminal 10 in the horizontal direction is less than the resolution of the display unit 216 of the external input device 40 in the horizontal direction, the resolution conversion unit 453 converts the resolution of the display data in the horizontal direction W' to the resolution of the display device 120 of the transmission terminal 10 in the horizontal direction W10. Furthermore, the resolution conversion unit 453 converts the resolution of the display data in the vertical direction so that the horizontal to vertical ratio of the display data is the same as the horizontal to vertical ratio of the display device 120 of the transmission terminal 10, i.e. H' is set to H40* (W10/W40).

The process returns to FIG. 25. When the resolution conversion unit 452 converts the resolution of the display data, the display data transmission unit 452 sends the converted display data to the transmission terminal 10 (step S908).

The external information transmission/reception unit 18 of the transmission terminal 10 receives the display data sent from the display data transmission unit 452 (step S908), and the image display control unit 14b renders the received display data and displays the rendered data on the display device 120 (step S909). The display image acquisition unit 14c acquires data, which represents the image displayed on the display device 120 by the image display control unit 14b at step S909 (step S910). The transmission/reception unit 11 sends the data acquired by the display image acquisition unit 14c to the relay apparatus 30 (step S911).

In the case of receiving display data, the resolution of which has not been converted (step S9072), the display control unit 47 enlarges or reduces the resolution of the display data so as to be displayed on the display device 120 while maintaining the horizontal to vertical ratio of the display data, and renders the display data.

For displaying the display data within the entire screen of the display device 120, the resolutions of the display data are determined by the following relations:

$$Wr=Wt, Hr=Hs*Wt/Ws \text{ (if } Wt/Ws<Ht/Hs),$$

and $$Hr=Ws*Ht/Hs, Hr=Ht \text{ (if } Wt/Ws>=Ht/Hs).$$

In the above relations, Wr and Hr are the width and the height of the rendered display data, respectively. The width and the height of the received display data are denoted by Ws and Hs, respectively, and the width and the height of the display device 120 are denoted by Wt and Ht, respectively.

Moreover, when the operation input reception unit 12 receives the resolution information, the resolution change unit 21d changes the resolution of the display 120 of the transmission terminal 10 (step S912). The "change of the resolution" is performed in a process of "change of resolution" at steps S105, S109, S117 and S122 in the process flow of FIG. 28, which will be described later.

When the resolution is changed, the resolution acquisition unit 21a acquires resolution information indicating the changed resolution (step S902), the external information transmission/reception unit 18 sends the resolution information to the external input device 40 (step S903). Further processes are the same as the above processes after step S904, and duplicate explanation is omitted.

Next, the process of controlling the resolution, including changing the resolution, by the transmission terminal 10 will be explained with reference to the flowchart illustrated in FIG. 28.

In FIG. 28, when the power in the transmission terminal 10 is turned ON, the process starts and the resolution acquisition unit 21a, shown in FIG. 4, accesses the display device 120, to acquire allowed resolutions, with which data are displayed (step S101).

Next, the resolution determination unit 21b determines whether the allowed resolutions include the resolution other than the standard aspect ratios (for example, 16 (width) to 9 (height) and the resolutions are 1200 (width) by 720 (height)), which is used for transmitting image data between the transmission terminal 10 and the relay apparatus 30 (step S102). The above determination is performed for the purpose whereas a resolution other than the standard aspect ratios is selected, if possible, and a segment region, in which auxiliary information is displayed, is appended. FIG. 29A is a diagram illustrating an example of the screen, in which the segment region is appended. In FIG. 29A, a segment region SR is appended at the lower end of the screen. In the segment region SR, auxiliary information AX (error message and an operational button) is displayed. On the other hand, FIG. 29B is a diagram illustrating an example of the screen, in which the segment region is not appended. In FIG. 29B, the error message is displayed overlapping the lower end of the screen.

In the case where the resolution other than the standard aspect ratios is included in the allowed resolutions (step S102 YES), the resolution selection unit 21c selects a resolution according to a predetermined criterion from the resolutions other than the standard aspect ratios (step S103). The predetermined criterion is, for example, preferentially selecting the largest resolution, i.e. a product of the horizontal resolution and the vertical resolution is the largest, preferentially selecting the resolution having a specified aspect ratio, e.g. 8 to 5, selecting the resolution suitable for a character size or the number of characters of the auxiliary information, selecting the resolution defined by the user, e.g. WXGA (1280 by 800) or XGA (1024 by 768), or the like.

Next, an image processing unit (not shown), one of the functions of the image display control unit 14b, expands or contracts an image data, generated internally with the standard aspect ratio, to the selected resolution, and appends a segment region (step S104). Specifically, the image process unit performs the following processes. The image before conversion is extended by proportional symmetrically (with the same expansion or contraction ratio for the width direction and for the height direction) so that the width of the image coincides with the width of the screen. If the resolution before the conversion is the same as the resolution after the conversion, the expansion or contraction is not performed, i.e. the expansion factor or the contraction factor is one. Next, a height of the image after the expansion or contraction is obtained. A segment region is appended to the expanded or contracted image, so that a height of the converted image coincides with the height of the screen. In FIG. 29A, the segment region SR is appended at the lower end of the screen. The segment region may be appended at the upper end of the screen. Moreover, two segment regions having the same height may be appended at the upper and lower ends of the screen.

Next, the resolution change unit 21d changes the resolution of the display device 120 to the selected resolution (step S105). According to the process, the screen in the display device 120 is displayed with the changed resolution.

Next, a flag configuration unit (not shown), one of the functions of the image display control unit 14b, configures a flag "overlap" to "false" (step S106). The flag "overlap" is referred when the image display control unit 14b detects an error or the like, and controls a display of auxiliary information other than the image data, which is displayed at present. The value of "overlap" becomes "true", when the auxiliary information is displayed overlapping the displayed image, as shown in FIG. 29B. When the auxiliary information does not overlap the displayed image, the value of "overlap" is "false".

On the other hand, in the case where the allowed resolutions do not include the resolution other than the standard aspect ratios (step S102 NO), the resolution selection unit 21c selects a resolution according to the predetermined criterion from the standard aspect ratios (step S107). The predetermined criterion is the same as the one, explained for step S103.

Next, the image processing unit (not shown), one of the functions of the image display control unit 14b, expands or contracts an image data, generated internally with the standard aspect ratio, to the selected resolution (step S108). In this case, since the image is expanded or contracted with the same aspect ratio as that of the screen, a blank region does not occur in any of the width direction and the height direction. Accordingly, a segment region is not appended to the display image (see the example of display of the image in FIG. 29B).

Next, the resolution change unit 21*d* changes the resolution of the display device 120 to the selected resolution (step S109). According to the process, the screen in the display device 120 is displayed with the changed resolution. Next, the flag configuration unit (not shown), one of the functions of the image display control unit 14*b*, configures the flag "overlap" to "true" (step S110).

The processes as explained above are initial processes at the time when the power of the transmission terminal 10 is turned ON. In the following, a process in response to an exchange of the display device 120 after the power is turned ON will be described.

The resolution acquisition unit 21*a* accesses the display device 120 and acquires the resolution, with which an image is displayed on the display device 120 at present (step S111). Next, the resolution acquisition unit 21*a* accesses the display device 120, to acquire allowed resolutions, with which data are displayed (step S112).

Next, the resolution determination unit 21*b* determines whether the allowed resolutions include the resolution other than the standard aspect ratios (for example, 16 (width) to 9 (height)), which is used for transmitting image data between the transmission terminal 10 and the relay apparatus 30 or not (step S113). In the case where the resolution other than the standard aspect ratios is included in the allowed resolutions (step S113 YES), the resolution selection unit 21*c* selects a resolution according to the predetermined criterion from the resolutions other than the standard aspect ratios (step S114). The predetermined criterion is the same as the one explained for step S103.

Next, the resolution determination unit 21*b* determines whether the resolution, with which an image is displayed on the display device 120 at present, is different from the selected resolution or not (step S115). If the resolution, with which the image is displayed at preset, is different from the selected resolution (step S115 YES), the image process unit (not shown), one of the functions of the image display control unit 14*b*, expands or contracts an image data, generated internally with the standard aspect ratio, to the selected resolution, and appends a segment region (step S116).

Next, the resolution change unit 21*d* changes the resolution of the display device 120 to the selected resolution (step S117). According to the process, the screen in the display device 120 is displayed with the changed resolution. Next, the flag configuration unit (not shown), one of the functions of the image display control unit 14*b*, configures a flag "overlap" to "false" (step S118). On the other hand, when the resolution, with which the image is displayed at present, is the same as the selected resolution step S115 NO), the processes at steps S116 to S118 are not performed, since change in the resolution is not required.

On the other hand, in the case where the allowed resolutions do not include the resolution other than the standard aspect ratios (step S113 NO), the resolution selection unit 21*c* selects a resolution according to the predetermined criterion from the standard aspect ratios (step S119). The predetermined criterion is the same as the one, explained for step S103.

Next, the resolution determination unit 21*b* determines whether the resolution, with which an image is displayed on the display device 120 at present, is different from the selected resolution (step S120). If the resolution, with which the image is displayed at preset, is different from the selected resolution (step S120 YES), the image process unit (not shown), one of the functions of the image display control unit 14*b*, expands or contracts an image data, generated internally with the standard aspect ratio, to the selected resolution (step S121).

Next, the resolution change unit 21*d* changes the resolution of the display device 120 to the selected resolution (step S122). According to the process, the screen in the display device 120 is displayed with the changed resolution. Next, the flag configuration unit (not shown), one of the functions of the image display control unit 14*b*, configures a flag "overlap" to "true" (step S123). On the other hand, when the resolution, with which the image is displayed at present, is the same as the selected resolution (step S120 NO), the processes at steps S121 to S123 are not performed, since change in the resolution is not required.

The above processes are iterated during when the application program is executed. Accordingly, even when the display device 120 is replaced by another display device, which has a different resolution, the process in FIG. 28 continues. The above iteration process corresponds to a process of monitoring a change in the resolution of the display device 120 periodically. Moreover, an event mechanism, known as a program in Windows (registered trademark), may be introduced, to perform the process. In this case, an event schedule may be registered in the event mechanism, so that when the resolution changes by connecting the other display device 120, an event notification is issued, at the time of starting the program. After the program starts, the processes from step S111 are performed in the image display control unit 14*b*, each time the event notification is issued.

<Variation of Example>

In the embodiment, shown in FIG. 25, an example of transmission of display data, sent from the external input device to the transmission terminal 10 and sent from the transmission terminal 10 to the relay apparatus 30, in a bitmap format (uncompressed format) have been described. The present invention is not limited to this. For example, the display data may be transmitted in a compressed format, such as the JPEG (Joint Photographic Experts Group), GIF (Graphics Interchange Format) or the like.

In the following, with reference to FIG. 30, an example of the process of transmission of display data in the compressed format will be described. In the sequence chart shown in FIG. 30, a process of compressing display data and a process of decompressing the compressed data (steps S907-A, S908-A and S910-A) are added to the sequence chart shown in FIG. 25. The processes other than the steps S907-A, S908-A and S910-A are the same as in the FIG. 25, and an explanation is omitted.

In FIG. 30, the resolution conversion unit 453 of the external input device 40 performs the resolution conversion for the display data (step S907), and for the display data, the resolution of which is converted, a predetermined compression (encoding) process is performed (step S907-A). In the present embodiment, the display data acquisition unit 451 performs the compression process.

On the other hand, in the transmission terminal 10, the external information transmission/reception unit 18 receives the compressed display data after the resolution conversion, sent from the external input device 40 (step S908). The received compressed display data are decompressed (decoded) (step S908-A). In the present embodiment, the display image acquisition unit 14*c* decompresses the compressed display data.

Next, the image display control unit 14*b* renders the decompressed (decoded) display data, and displays the rendered data on the display device 120 (step S909). The display image acquisition unit 14c acquires the display data displayed on the display device 120 (step S910). The acquired display data (uncompressed data) are classified into two groups. The display image acquisition unit 14c performs the predetermined process of compression (encoding) for display data of one of the groups (step S910-A). The transmission/reception unit 11 sends the compressed display data, acquired by the display image acquisition unit 14c to the relay apparatus 30 via the communication network 2 (step S911).

The compressed display data are further received by the other transmission terminal 10, shown in FIG. 1, via the relay apparatus 30. In the transmission terminal 10, which receives the compressed display data, the image display control unit 14b performs the predetermined decompression (decoding) process for the received compressed display data, renders the decompressed display data, and displays the rendered data on the display device 120. According to the above processes, the transmission terminal receiving the display data 10 shares the screen image data with the transmission terminal 10 of the transmission source. That is, by sending the display data in the external input device 40 to the transmission terminal 10 of the user and to the transmission terminal 10 of the other party, the display data can be shared between the transmission terminals 10 in respective regions.

On the other hand, the process of changing resolution is performed at step S912 for the display data of the other group of the two divided groups of the display data (uncompressed data) acquired by the display data acquisition unit 14c at step S910. Further processes after step S912 are the same as in the FIG. 25, and an explanation is omitted.

As described above, by converting the display data, the resolution of which is changed at the external input device 40, into a compressed format and sending the compressed displayed data, from the transmission terminal 10 to the other transmission terminal via the relay apparatus 30, the transmission capacity can be reduced compared with the transmission using the uncompressed format, such as Bitmap format, shown in FIG. 25. Accordingly, the communication load can be suppressed.

As explained above, in the transmission system according to the present embodiment, an image in the entire screen, if the entire region is selected by a mouse, and an image in the active region, if the entire region is not selected, can be shared with the transmission terminal used by the other party participating in the video conference. Moreover, in the case where the communication is in the narrow bandwidth mode, an active region is preferentially acquired as the displayed data, and the illegibility of details in the displayed image can be suppressed even if the user selects the entire region.

[Second Example]

In the present Example, the transmission system 1, in which by the user's operation for the display region selection menu displayed on the display unit 216 of the external input device 40, the user can select the entire region or an arbitrary region on the display screen and display it, will be described. Moreover, the transmission system 1 will be described, in which the illegibility of details in the displayed image can be suppressed, as in the First Example.

Figure 31A:
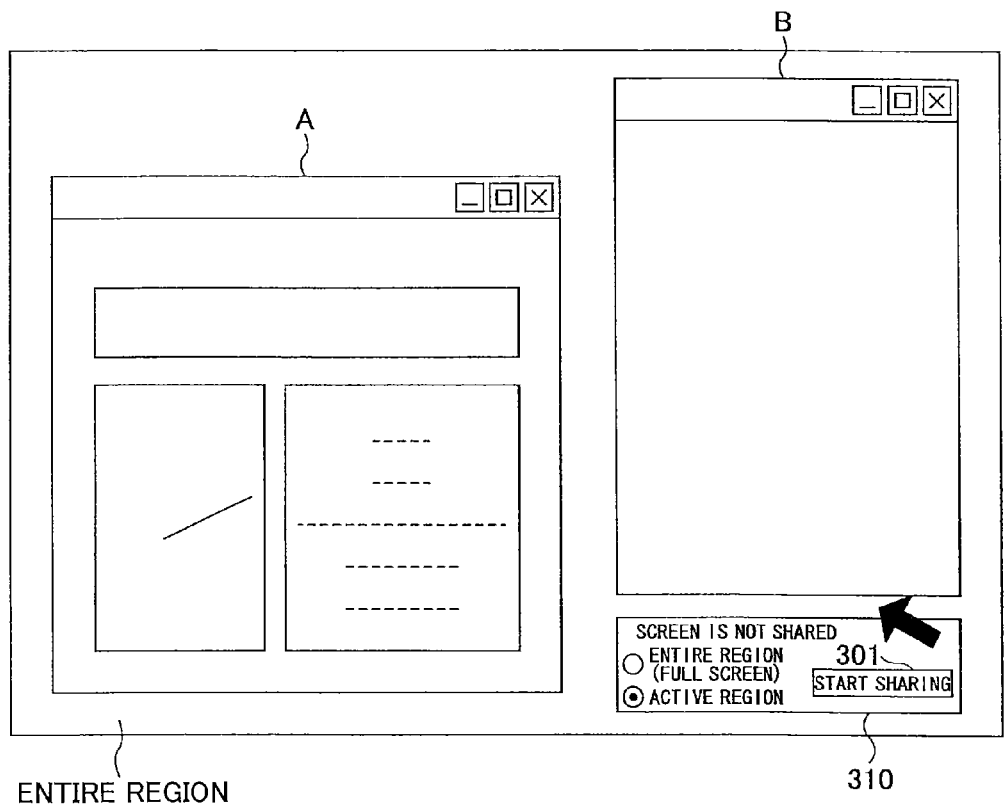
FIGS. 31A to 31C are diagrams illustrating an example of a desktop screen displayed on the external input device according to the present embodiment.
Figure 31B:
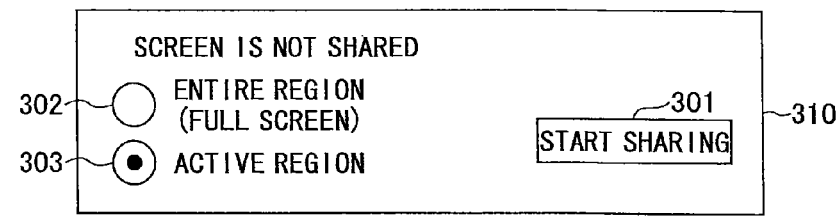
Figure 31C:
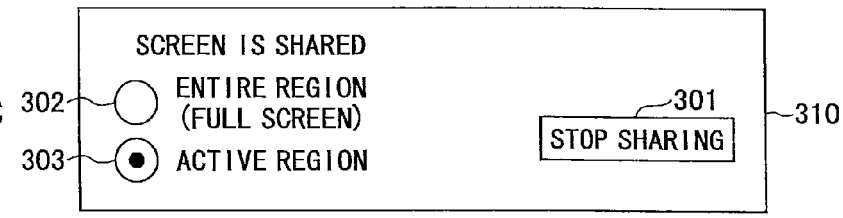

FIGS. 31A to 31C are diagrams illustrating an example of a desktop screen displayed on the external input device 40aa, as in FIGS. 22A to 22C in the First Example. FIG. 31A is a diagram illustrating an example of the desktop screen displayed on the external input device 40aa. In FIG. 31A, on the bottom-right corner of the desktop screen, a display region selection menu 310 (corresponding to a menu for determining whether to send display data or not, in claims) is displayed.

FIGS. 31B and 31C are enlarged views of examples of the display region selection menu 310. In FIG. 31B, a character string "start sharing" is displayed on the shared setting reception button 301. In FIG. 31C, a character string "stop sharing" is displayed on the shared setting reception button 301. The function of the shared setting reception button 301 is the same as in the First Example.

Moreover, in FIGS. 31B and 31C, two radio buttons 302 and 303 are displayed in addition to the shared setting reception button 301, respectively. On the radio button 302 "entire region (full screen)" is displayed, and on the other radio button 303 "active region" is displayed. That is, the user exclusively selects one of either the entire region or the active region, in which the display data are displayed, by using the radio buttons 302 and 303. When the user selects one of the radio buttons 302 and 303, the operation input reception unit 35 receives the selection. Meanwhile, the selection of "active region" by the radio button 303, is irrelevant to whether the user actually selects the region or not, and there may be no "active region" even if the "active region" is selected by the radio button 303.

In the case that the "stop sharing" is displayed on the shared setting reception button 301, i.e. the display data are shared, when the user switches between the radio buttons 302 and 303, a region, in which the display data are displayed, on the display device 120 of the transmission terminal 10aa, switches alternately between the entire region and the active region.

In the case that the "start sharing" is not selected by the shared setting reception button 301, i.e. the display data are not shared, when the user clicks the "start sharing", sharing of the display data selected by the radio button 302 or 303 starts.

In the case of explicitly selecting by the user the "entire region (full screen)" or the "active region", when the communication is in the narrow-bandwidth mode, selecting the "active region" by the user is a comprehensive operation. In the transmission system 1, voice data can always be transmitted between the transmission terminals. When the other party, who shares the display data with the user of the transmission source, notifies the user of the transmission source that the detail is illegible, the user of the transmission source selects the "active region" by the display region selection menu 310. If the active region has been already defined, the active region can be shared by the above operation. If the active region has not been defined, the user can define the active region by clicking the screen.

Figure 32:
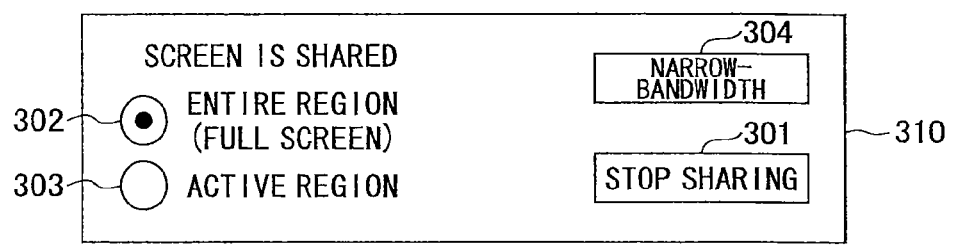
FIG. 32 is a diagram illustrating an example of a menu for selecting the display region according to the present embodiment.

Moreover, the user may be informed that the communication is in the narrow-bandwidth mode by the display region selection menu 310. FIG. 32 illustrates an example of the display region selection menu 310. As in the First Example, the mode determination unit 343 determines whether the communication is in the narrow-bandwidth mode or not, and displays the result of determination on a narrow-bandwidth lamp 304 in the display region selection menu 310. The narrow-bandwidth lamp 304 may be configured, for example, so that a color of the narrow-bandwidth lamp changes according the bandwidth. The narrow-bandwidth lamp 304 may blink when the narrow-bandwidth mode management table shows "FALSE". An alarm sound may be output when the bandwidth status in the narrow-bandwidth mode management table turns to "FALSE". According to the above process, the user can recognize the narrow-bandwidth mode, and select the "active region" by the display region selection menu 310.

The narrow-bandwidth lamp 304 may be displayed only when the display data are shared and the "entire region (full screen)" is selected. The user can easily recognize by viewing the narrow-bandwidth lamp 304 whether the communication is in the narrow-bandwidth mode, which the user should consider when the display data are shared and the "entire region" is selected, or not.

Figure 33:
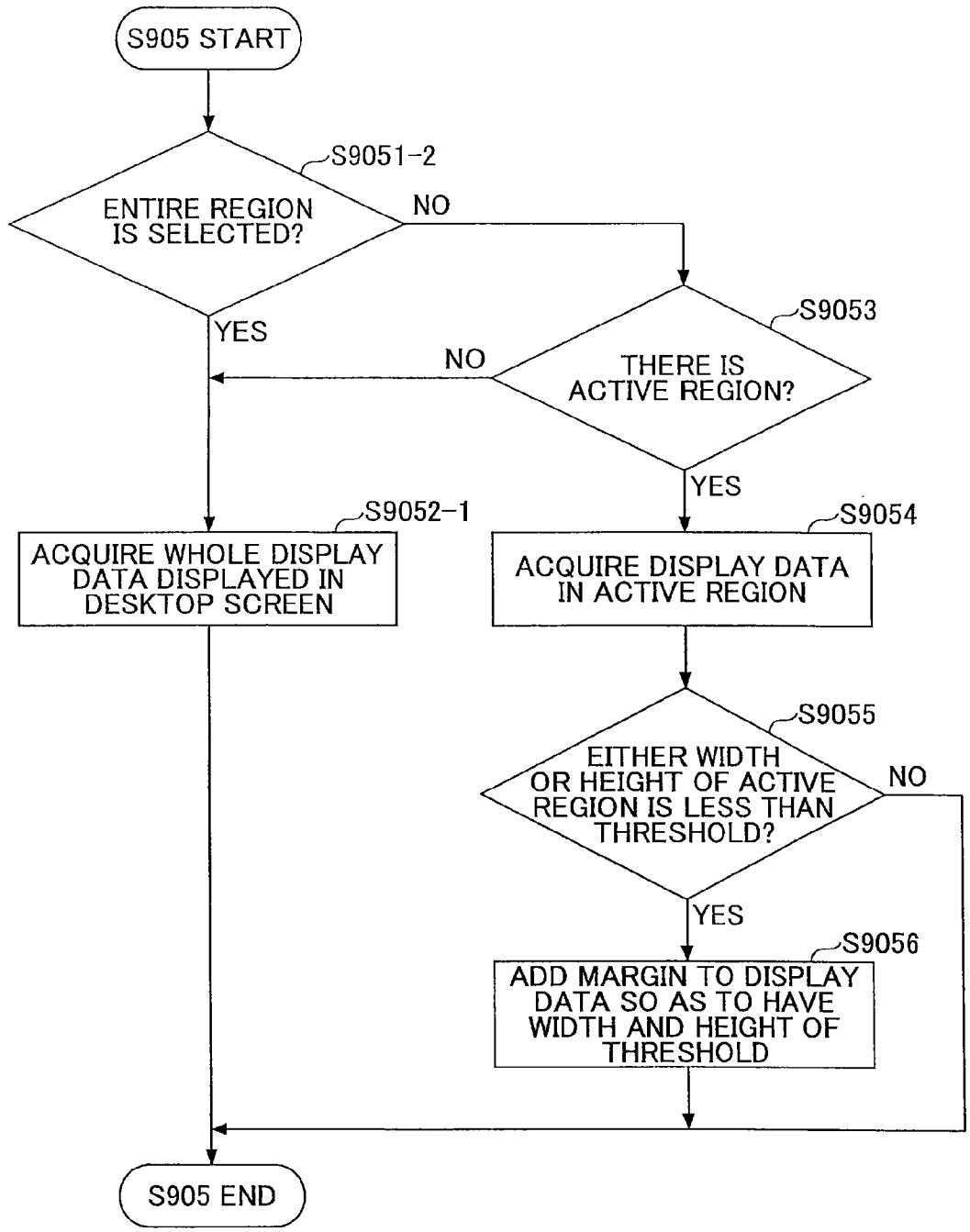
FIG. 33 is a flowchart illustrating an example of a detailed procedure of acquiring displayed data by the display data acquisition unit according to the present embodiment.

The procedures of the operations according to the present Example are the same as in the First Example, i.e. FIGS. 25, 27 to 30, except for the process of the display data acquisition unit 451 to acquire the display data. FIG. 33 is a flowchart illustrating an example of the process of acquiring the display data according to the present Example. The flowchart in FIG. 33 is different from the flowchart in FIG. 26 in that steps S9051-3 and S9052 in FIG. 26 are replaced by steps S9051-2 and S9052-1 in FIG. 33. The operation by the display data acquisition unit 451 according to the present Example will be described in the following.

The operation input reception unit 46 determines whether the user selects the entire region by the radio button 302 or not (step S9051-2).

In the case that the user selects the entire region by the radio button 302 (step S9051-2 YES), the display data acquisition unit 451 acquires the whole desktop screen displayed on the display unit 216 as the display data (step S9052-1), and the process ends.

In the case that the user does not select the entire region by the radio button 302 (step S9051-2 NO), i.e. the user selects the active region by the radio button 303, the display data acquisition unit 451 determines whether there is an active region (step S9053). The method of determination is the same as in the First Example.

When the user "aa" closes the active region and there is no active region (step S9053 NO), the process proceeds to step S9052-1, and the display data acquisition unit 451 acquires the whole desktop screen as the display data.

When there is an active region (step S9053 YES), the display data acquisition unit 451 acquires the display data in the active region, out of display data displayed on the display unit 216 by the display control unit 47 (step S9054). Further processes are the same as in the First Example.

According to the configuration, as described above, when the communication is in the narrow-bandwidth mode, by the user's operation of sharing an active region, such as selecting the active region or clicking the shared setting reception button 301, the active region is acquired as the display data.

In the case that the communication is in the narrow-bandwidth mode but the user does not perform the operation of sharing the active region, the user does not execute an application or there isn't an application to be preferentially displayed, the whole display screen (whole region) is acquired as the display data. That is, if detail of the region is illegible, there is no inconvenience.

Also in the case that the communication is not in the narrow-bandwidth mode, the entire region or the active region, selected by the user, can be acquired as the display data.

According to the present Example, even if the OS does not support the operation of treating the whole desktop screen as one region, the user can select the entire region by the display region selection menu 310.

[Third Example]

In the First and Second Examples, there is the inconvenience when an image of a mouse cursor is not displayed when the display data acquisition unit 451 acquires the display data of the entire region or the active region.

The above situation is the same as the case where the Print Screen button of keyboard is used for acquiring the display data. When the Print Screen button is depressed, the mouse cursor is not captured. Accordingly, the display data acquisition unit 451 preferably adds the mouse cursor to the display data, when the mouse cursor indicates the entire region or the active region.

Figure 34A:
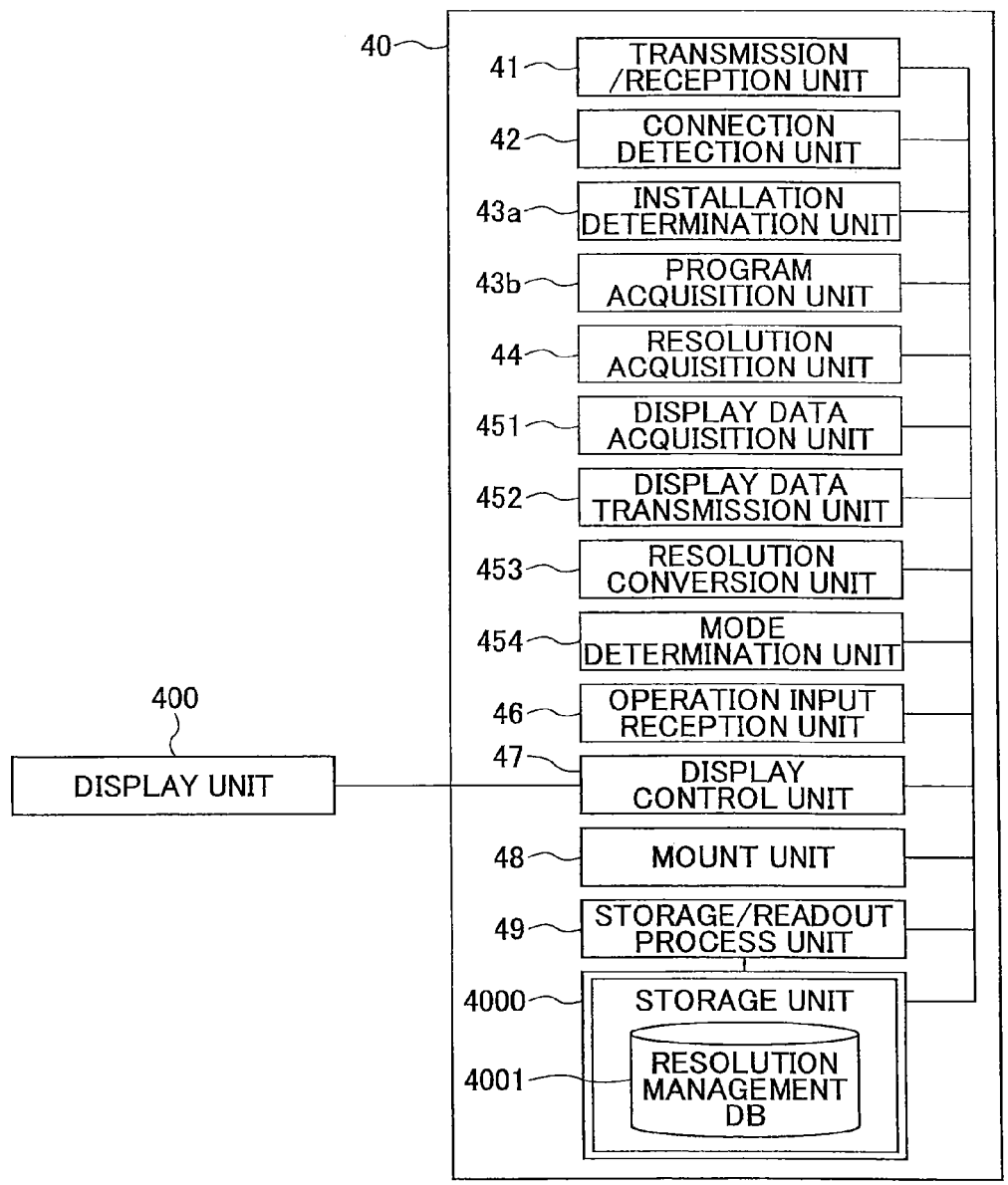
FIGS. 34A and 34B are function block diagrams illustrating an example of the external input device according to the present embodiment.
Figure 34B:
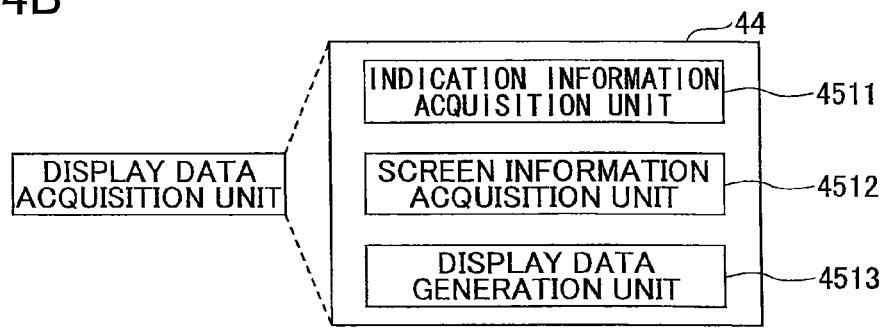

FIG. 34A is a function block diagram illustrating an example of the external input device according to the present Example. FIG. 34A is the same as FIG. 13. FIG. 34B is a function block diagram illustrating an example of the display data acquisition unit 451. The display data acquisition unit 451 includes an indication information acquisition unit 4511, a screen information acquisition unit 4512 and a display data generation unit 4513. The screen information acquisition unit 4512 acquires the display data on the display unit 216 displayed by the external input device 40. The indication information acquisition unit 4511 acquires the indication information, such as a position of the mouse cursor and an icon image of the mouse cursor (corresponding to cursor information in claims). Specifically, the indication information is coordinate data of the mouse cursor on the screen, or the coordinate data of the mouse cursor on the screen and the icon image of the mouse cursor. The coordinate data of the mouse cursor can be acquired by referring to the OS using a predetermined command. Similarly, the icon image of the mouse cursor may be acquired from the OS. The predetermined known icon image of the mouse cursor may be the image data.

The display data generation unit 4513 adds the icon image to the display data. Since the external input device 40 sends the display data to the transmission terminal 10, each user can commonly obtain a position on the screen, at which the mouse cursor specifies the display data.

[Synthesis of Icon Image]

The synthesis method of the icon image when the entire region is the display data is different from the synthesis method when the active region is the display data.

The synthesis method when the entire region is the display data will be described.

Figure 35:
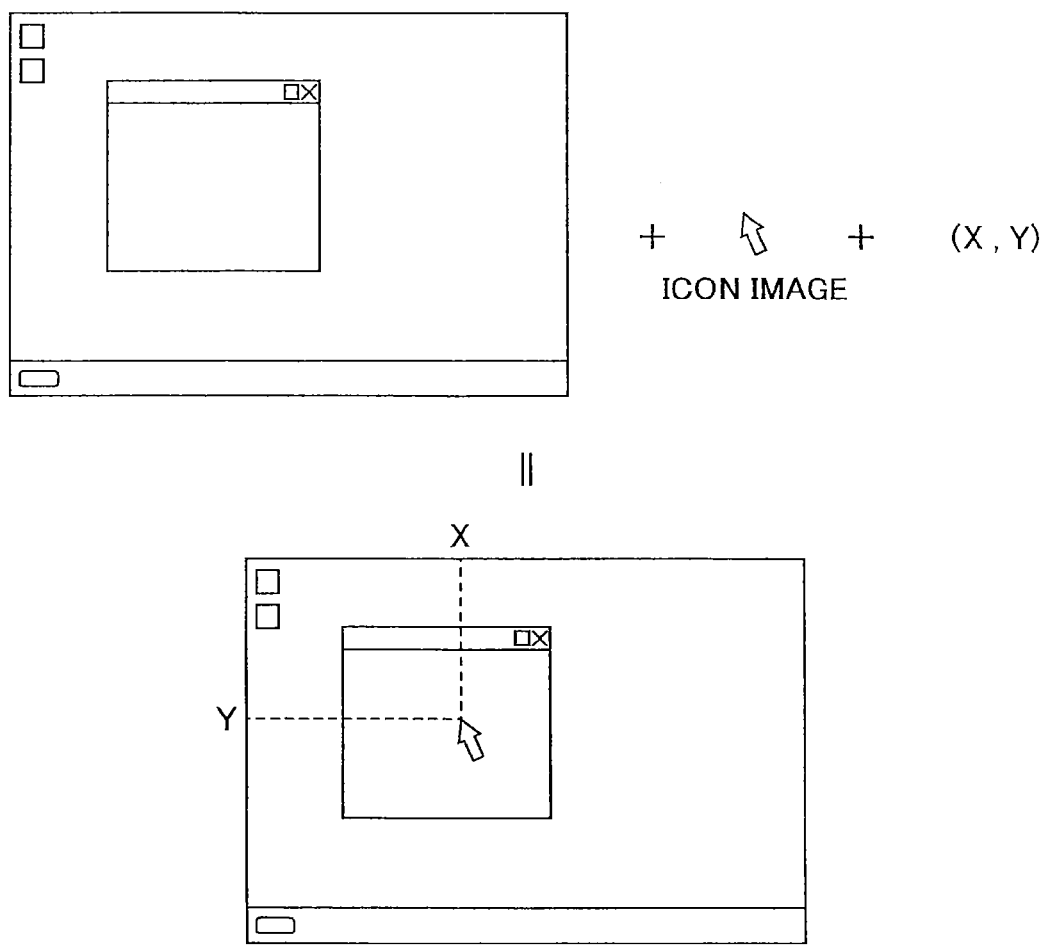
FIG. 35 is an explanatory diagram schematically illustrating an example of a process of incorporating an icon image into the display data according to the present embodiment.

FIG. 35 is an explanatory diagram schematically illustrating an example of a process of synthesizing the icon image into the display data. The display data in FIG. 35 is the whole screen on the display device 120*aa* displayed by the external input device 40. The mouse cursor can move within the whole desktop screen.

The indication information acquisition unit 4511 acquires the icon image of the mouse cursor and the coordinate data of the mouse cursor. The coordinate data are expressed in the orthogonal coordinate system, and indicate a two-dimensional position of the mouse cursor in a unit of pixel, where the upper-left corner is the origin.

Accordingly, the display data generation unit 4513, for example, by arranging the tip part of the mouse cursor at the position in the display data indicated by the coordinate data, can synthesize the mouse cursor into the display data. The synthesis in the present Example is to arrange the icon image of the mouse cursor in the display data, by replacing a pixel value of the overlapped pixel, to generate one image data.

The synthesis method when the active region is the display data will be described.

Figure 36:
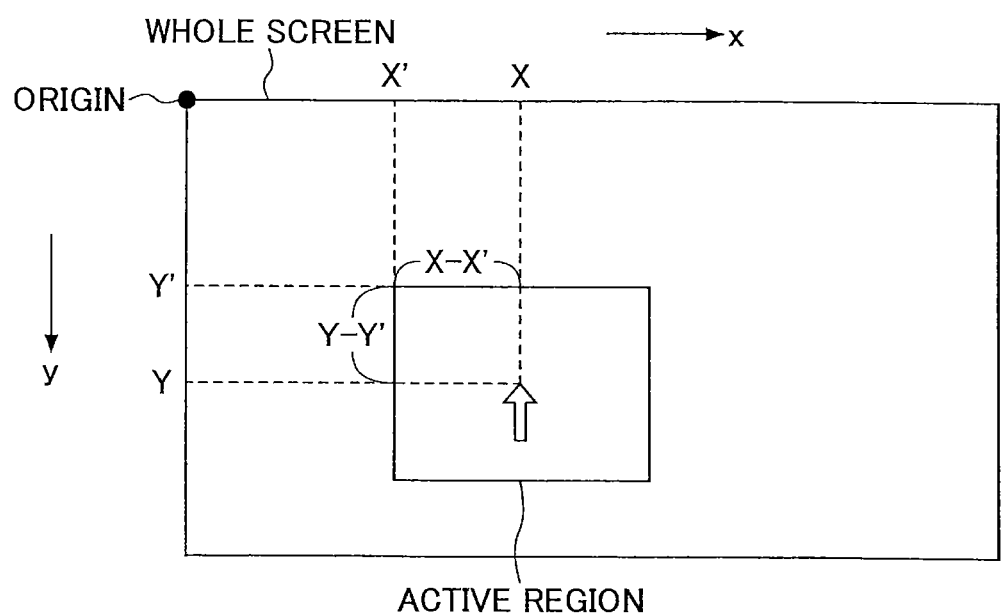
FIG. 36 is an explanatory diagram schematically illustrating another example of a process of incorporating the icon image into the display data according to the present embodiment.

FIG. 36 is an explanatory diagram schematically illustrating an example of a process of synthesizing the icon image into the display data. The coordinate of the mouse cursor (X, Y) is a coordinate with the origin at the upper-left corner of the desktop screen, whereas the active region is merely a part of the desktop screen. Accordingly, when the icon image is synthesized at the coordinate (X, Y) with respect to the display data in the active region, the icon image is arranged with the reference at the upper-left corner of the active region (X', Y'), and in the display data the position of the icon image may change.

The indication information acquisition unit 4511, when the active region is the display data, corrects the coordinate data of the mouse cursor, by the following relations:

$$X=X-X', \text{ and}$$

$$Y=Y-Y'.$$

According to the above correction, the icon image can be synthesized into the display data while the relative position between the display data and icon image is maintained.

Figure 37:
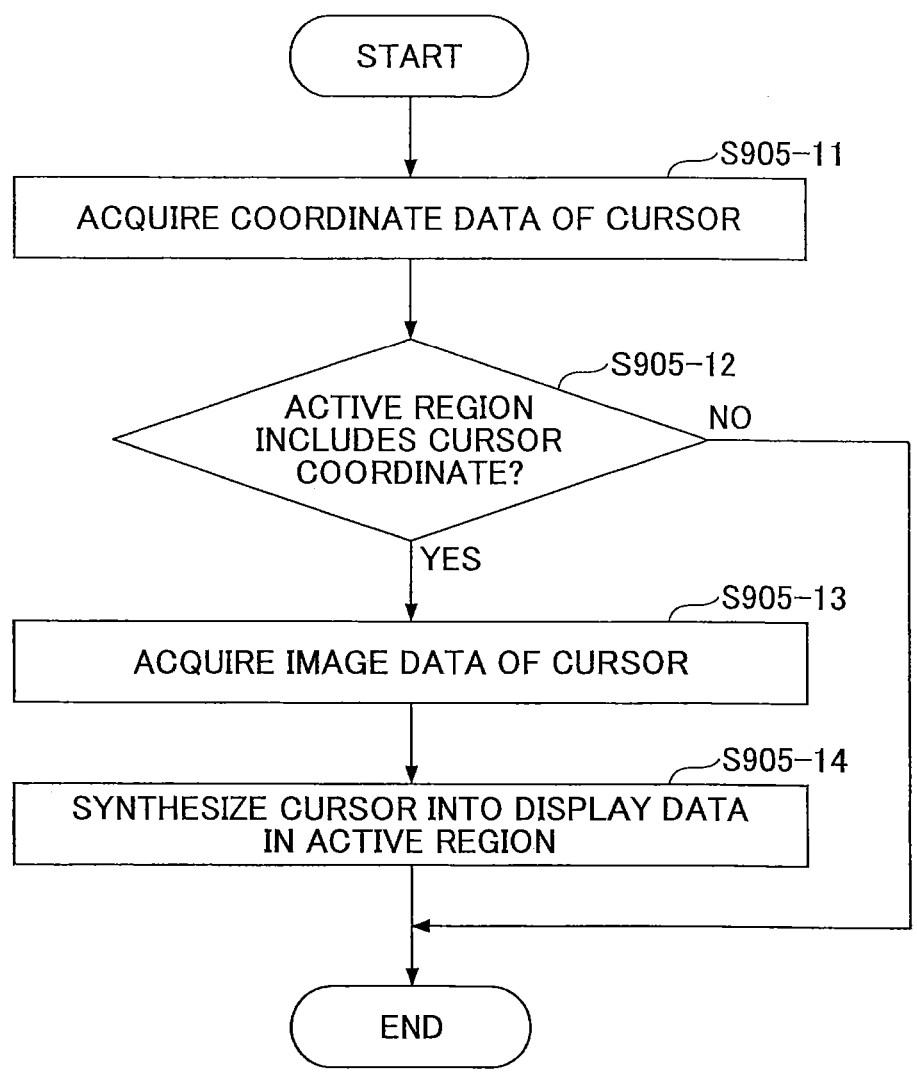
FIG. 37 is a flowchart illustrating an example of a procedure of incorporating the icon image into the display data by the display data acquisition unit according to the present embodiment.
Figure 38:
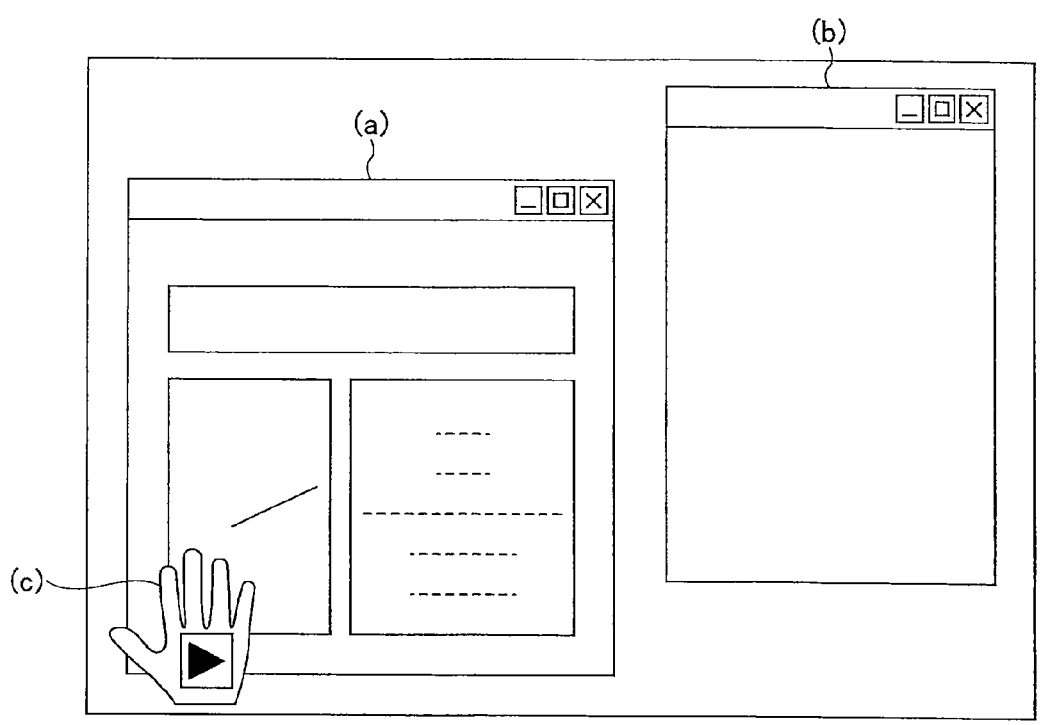
FIG. 38 is a diagram illustrating an example of a screen displayed on an external input device in the related art.

FIG. 37 is a flowchart illustrating an example of a procedure of synthesizing the icon image into the display data by the display data acquisition unit 451. The process in the FIG. 37 is performed at step S905 of FIG. 25, and after the process of acquiring the display data in the first Example or in the second Example. Moreover, in FIG. 37, the active region is assumed to be the display data.

The indication information acquisition unit 4511 acquires the coordinate data of the mouse cursor (step S905-11). In the case that the entire region is the display data, after the above process, the icon image is synthesized into the display data.

The indication information acquisition unit 4511 determines whether the coordinate data, acquired at step S905-11, are included in the active region (step S905-12).

When the coordinate data are not included in the active region (step S905-12 NO), the icon image need not be synthesized, the display data generation unit 4513 does not synthesize the icon image of the mouse cursor into the display data in the active region, and the process ends.

When the coordinate data are included in the active region (step S905-12 YES), the display data generation unit 4513 acquires the icon image of the mouse cursor (step S905-13).

Next, the display data generation unit 4513 synthesizes the icon image acquired at step S905-13 into the display data of the active region (step S905-14), and the process ends. The display data generation unit 4513 refers to the coordinate data of the tip part of the mouse cursor (X, Y) and the coordinate data of the upper-left corner of the active region (X', Y'). The display data generation unit synthesizes the icon image of the mouse cursor into the display data at the position ((X−X'), (Y−Y')) with the origin at the upper-left corner of the display data, which are the image data acquired only from the active region.

As described above, even when the active region is shared, the mouse cursor can be displayed correctly on the display device 120 of the transmission terminal 10db as in the case where the entire region is selected, by shifting the origin of the coordinate from the upper-left corner of the desktop screen to the upper-left corner of the active region.

Moreover, at step S905-12 in FIG. 37, it is assumed that the active region is selected. The process illustrated in FIG. 37 may be applied to the case where the entire region is selected by setting the origin of the selected region to the upper-left corner of the desktop screen, i.e. X'=0 and Y'=0.

Further, the present invention is not limited to these embodiments, but various variations and modifications may be made without departing from the scope of the present invention.

The present application is based on and claims the benefit of priority of Japanese Priority Application No. 2013-048496 filed on Mar. 11, 2013, with the Japanese Patent Office, the entire contents of which are hereby incorporated by reference.

What is claimed is:

1. An information processing apparatus, communicably connectable to a first transmission terminal, which is communicably connected with a second transmission terminal via a network and to which a first display device is connected, the information processing apparatus comprising:
    a display control unit that displays a region of a program component in a screen of a second display device, which is connectable to the information processing apparatus;
    a bandwidth determination unit that determines whether bandwidth for a communication between the first transmission terminal and the second transmission terminal is less than or equal to a predetermined threshold;
    an acquisition region reception unit that receives a selection for selecting at least one of display data displayed in an entire region of the screen of the second display device or display data displayed in an active region in the screen, according to a result of determination by the bandwidth determination unit, the active region being an object of a user's operation;
    a display data acquisition unit that acquires the display data of the entire region of the screen or the display data of the active region, whichever is selected by the selection, which is received by the acquisition region reception unit;
    a resolution information reception unit that receives first resolution information of the first display device, which is sent from the first transmission terminal;
    a resolution conversion unit that converts a resolution of the display data acquired by the display data acquisition unit to produce resolution-converted display data, based on the first resolution information received by the resolution information reception unit and second resolution information, which represents a resolution of the second display device; and
    a display data transmission unit that transmits the resolution-converted display data to the first transmission terminal.

2. The information processing apparatus, as claimed in claim 1, wherein the acquisition region reception unit receives the selection for selecting the display data displayed in the entire region, when the bandwidth determination unit determines that the bandwidth is greater than the predetermined threshold, and the acquisition region reception unit receives the selection for selecting the display data displayed in the active region, which is the object of the user's operation, when the bandwidth determination unit determines that the bandwidth is less than or equal to the predetermined threshold.

3. The information processing apparatus, as claimed in claim 2, wherein the acquisition region reception unit receives the selection for selecting the display data displayed in the entire region, when the bandwidth determination unit determines that the bandwidth is less than or equal to the predetermined threshold, but the screen does not include the active region, which is an object of a user's operation.

4. The information processing apparatus, as claimed in claim 1, further comprising a position information management unit that manages at least position information in the program component, wherein the entire region and the active region are treated as different program components, the acquisition region reception unit acquires a position where an event occurs detected by a pointing device from the position information management unit, the acquisition region reception unit receives the selection for selecting the display data displayed in the entire region, when the position where the event occurs overlaps the program component of the entire region, which does not include the active region, and the acquisition region reception unit receives the selection for selecting the display data displayed in the active region, which is an object of a user's operation, when the position where the event occurs does not overlap the program component of the entire region.

5. The information processing apparatus, as claimed in claim 1, wherein
the acquisition region reception unit displays a selection menu on the second display device, which receives a selection for exclusively selecting the display data displayed in the entire region or the display data displayed in an active region, which is an object of a user's operation,
wherein the acquisition region reception unit receives the selection for selecting the display data displayed in the entire region, when the display data of the entire region are selected by the selection menu, and
wherein the acquisition region reception unit receives the selection for selecting the display data displayed in the active region, which is an object of a user's operation, when the display data displayed in the active region, are selected by the selection menu.

6. The information processing apparatus, as claimed in claim 5, wherein the acquisition region reception unit displays the result of determination by the bandwidth determination unit in the selection menu.

7. A transmission system comprising:
a first transmission terminal communicably connected with a second transmission terminal via a network, a first display device being connected to the first transmission terminal;
an external input device that sends display data to the first transmission terminal;
a resolution acquisition unit that acquires a resolution, with which the first display device performs a display process;
a bandwidth status monitoring unit that monitors a communication status of communication between the first transmission terminal and the second transmission terminal;
a resolution transmission unit that sends first resolution information, which represents the resolution of the first display device, to the external input device;
a display control unit that displays a region of a program component in a screen of a second display device, which is connectable to the external input device;
a bandwidth determination unit that acquires the communication status monitored by the bandwidth status monitoring unit and determines whether bandwidth for the communication between the first transmission terminal and the second transmission terminal is less than or equal to a predetermined threshold;
an acquisition region reception unit that receives a selection for selecting at least one of display data displayed in an entire region of the screen of the second display device or display data displayed in an active region in the screen, according to a result of determination by the bandwidth determination unit, the active region being an object of a user's operation;
a display data acquisition unit that acquires the display data of the entire region of the screen or the display data of the active region, whichever is selected by the selection, which is received by the acquisition region reception unit;
a resolution information reception unit that receives the first resolution information of the first display device, which is sent from the first transmission terminal;
a resolution conversion unit that converts a resolution of the display data acquired by the display data acquisition unit to produce resolution-converted display data, based on the first resolution information received by the resolution information reception unit and second resolution information, which represents a resolution of the second display device; and
a display data transmission unit that transmits the resolution-converted display data to the first transmission terminal.

8. A transmission system comprising:
a first transmission terminal, which includes:
a communication unit that communicates with a second transmission terminal via a network;
a display control unit that displays information on a first display device, connected to the first transmission terminal;
a resolution acquisition unit that acquires a resolution, with which the first display device performs a display process;
a bandwidth status monitoring unit that monitors a communication status of communication between the first transmission terminal the second transmission terminal; and
a resolution transmission unit that sends first resolution information, which represents a resolution of the first display device, to an external input device; and
a program for causing the external input device to perform a process of sending display data to the first transmission terminal, the process including:
a display control step of displaying a region of a program component in a screen of a second display device, which is connectable to the external input device;
a bandwidth determination step of acquiring the communication status monitored by the bandwidth status monitoring unit and determining whether bandwidth for the communication between the first transmission terminal and the second transmission terminal is less than or equal to a predetermined threshold;
an acquisition region reception step of receiving a selection for selecting at least one of display data displayed in an entire region of the screen of the second display device or display data displayed in an active region in the screen, according to a result of determination in the bandwidth determination step, the active region being an object of a user's operation;
a display data acquisition step of acquiring the display data of the entire region of the screen or the display data of the active region, whichever is selected by the selection, which is received in the acquisition region reception step;
a resolution information reception step of receiving the first resolution information of the first display device, which is sent from the first transmission terminal;
a resolution conversion step of converting a resolution of the display data acquired in the display data acquisition step to produce resolution-converted display data, based on the first resolution information received in the resolution information reception step and second resolution information, which represents a resolution of the second display device; and
a display data transmission step of transmitting the resolution-converted display data to the first transmission terminal.

9. A non-transitory computer-readable storage medium storing a program for causing an information processing apparatus, which is communicably connectable to a first transmission terminal, which is communicably connected with a second transmission terminal via a network and to which a first display device is connected, to perform a process of sending display data to the first transmission terminal, when the program is installed in the information processing apparatus, the process comprising:

a display control step of displaying a region of a program component in a screen of a second display device, which is connectable to the information processing apparatus;

a bandwidth determination step of determining whether bandwidth for communication between the first transmission terminal and the second transmission terminal is less than or equal to a predetermined threshold;

an acquisition region reception step of receiving a selection for selecting at least one of display data displayed in an entire region of the screen of the second display device or display data displayed in an active region in the screen, according to a result of determination in the bandwidth determination step, the active region being an object of a user's operation;

a display data acquisition step of acquiring the display data of the entire region of the screen or the display data of the active region, whichever is selected by the selection, which is received in the acquisition region reception step;

a resolution information reception step of receiving the first resolution information of the first display device, which is sent from the first transmission terminal;

a resolution conversion step of converting a resolution of the display data to produce resolution-converted display data based on the received first resolution information and second resolution information, which represents a resolution of the second display device; and a display data transmission step of transmitting the resolution-converted display data to the first transmission terminal.

* * * * *